US011650311B2

(12) United States Patent
Ferla et al.

(10) Patent No.: US 11,650,311 B2
(45) Date of Patent: May 16, 2023

(54) ANTENNA AND GLIDE PATH ARRAY FOR SMALL FOOTPRINT AIRCRAFT PRECISION APPROACH AND LANDING SYSTEM

(71) Applicant: Thales USA, Inc., Arlington, VA (US)

(72) Inventors: Massimiliano Ferla, Credera (IT); David Carsenat, Brive-la-Gaillarde (FR); Andrea Cucurachi, Gorgonzola (IT); Nathan Deloffre, Cholet (FR); Paolo Lunardi, Varedo (IT); André Schüttpelz, Bad Liebenzell (DE); Stephen Rowson, Parkville, MO (US); Francesco Torriano, Novara (IT); Michael Theobald, Heusweiler (DE); Kevin McGahee, Shawnee, KS (US)

(73) Assignee: Thales USA, Inc., Arlington, VA (US)

( * ) Notice: Subject to any disclaimer, the term of this patent is extended or adjusted under 35 U.S.C. 154(b) by 0 days.

(21) Appl. No.: 17/776,629

(22) PCT Filed: Nov. 13, 2020

(86) PCT No.: PCT/US2020/060453
§ 371 (c)(1),
(2) Date: May 13, 2022

(87) PCT Pub. No.: WO2021/097238
PCT Pub. Date: May 20, 2021

(65) Prior Publication Data
US 2022/0413127 A1 Dec. 29, 2022

Related U.S. Application Data

(60) Provisional application No. 63/037,895, filed on Jun. 11, 2020, provisional application No. 62/936,065, filed on Nov. 15, 2019.

(51) Int. Cl.
*G01S 13/91* (2006.01)
*G01S 13/32* (2006.01)

(52) U.S. Cl.
CPC ............ *G01S 13/913* (2013.01); *G01S 13/32* (2013.01)

(58) Field of Classification Search
CPC .......... G01S 13/726; G01S 7/06; G01S 13/06; G01S 13/58; G01S 13/876; G01S 13/878; G01S 13/88
See application file for complete search history.

(56) References Cited

U.S. PATENT DOCUMENTS 2,448,016 A 8/1948 Busignies
4,866,450 A 9/1989 Chisholm
(Continued)

FOREIGN PATENT DOCUMENTS

RU 2429499 C2 9/2011

OTHER PUBLICATIONS

International Search Report and Written Opinion dated Feb. 5, 2021 for International Patent Application No. PCT/US2020/060453, 8 pages.

(Continued)

*Primary Examiner* — Timothy X Pham
(74) *Attorney, Agent, or Firm* — Sage Patent Group

(57) ABSTRACT

An instrument landing system (ILS) is described. The ILS comprises a plurality of antennas and a plurality of antenna radio units (ARUs). Each ARU of the plurality of ARUs operates to generate a modulated RF signal provided to a different one of the plurality of antennas for transmission. The ILS further comprises a central processing unit that operates to control the ARUs to adjust synchronization between the modulated RF signal provided by the ARUs to the plurality of antennas for transmission.

39 Claims, 30 Drawing Sheets

(56) References Cited

U.S. PATENT DOCUMENTS

| | | |
|---|---|---|
| 10,784,911 B2* | 9/2020 | Mizutani .................. H04B 1/30 |
| 2011/0130898 A1 | 6/2011 | Garrec et al. |
| 2017/0149148 A1* | 5/2017 | Mullin ................. H01Q 25/002 |
| 2018/0076906 A1* | 3/2018 | Naseef ................... G01R 27/28 |

OTHER PUBLICATIONS

First Examination Report dated Oct. 11, 2022 for Indian Patent Application No. 202217028647, 6 pages.

* cited by examiner

Traditional architecture:

PILS architecture:

ANTENNA AND GLIDE PATH ARRAY FOR SMALL FOOTPRINT AIRCRAFT PRECISION APPROACH AND LANDING SYSTEM

CROSS-REFERENCE TO RELATED APPLICATIONS

The present application is a 35 U.S.C § 371 national stage application for International Application No. PCT/US2020/060453, entitled "ANTENNA AND GLIDE PATH ARRAY FOR SMALL FOOTPRINT AIRCRAFT PRECISION APPROACH AND LANDING SYSTEM", filed on Nov. 13, 2020, which claims the benefit of and priority to U.S. Provisional Patent Application No. 62/936,065, filed Nov. 15, 2019, entitled "PORTABLE INSTRUMENT LANDING SYSTEM (PILS)," and which claims the benefit of and priority to U.S. Provisional Patent Application No. 63/037,895, filed Jun. 11, 2020, entitled "ANTENNA AND GLIDE PATH ARRAY FOR SMALL FOOTPRINT AIRCRAFT PRECISION APPROACH AND LANDING SYSTEM," the disclosures of which are hereby incorporated herein by reference in their entireties.

TECHNICAL FIELD

The present disclosure relates to instrument landing systems for aircraft. In particular, the present disclosure is related to a glide path and localizer arrays of an ILS.

BACKGROUND

There is a need for improved precision approach and landing systems that produce an Instrument Landing System (ILS) signal in space and meet additional requirements specific to various anticipated missions.

When implemented for the U.S. government, the ILS system should be installed and operate in a GPS-deprived environment, produce ILS localizer and glide path signals in space that are compliant with ICAO Annex 10 requirements for Category I ILS, and be capable of successfully completing a flight inspection in accordance with the U.S. Flight Inspection Manual, FAA Order 8200.1. There is also a need for the system to be transportable, such as capable of being transported on a single 463 L pallet via a wide variety of air, land and sea vehicles. There is also a need for the system setup to be capable of being accomplished by 2 people in 2 man-hours (up to 6 man-hours with bulky clothing) in worldwide austere locations.

SUMMARY

According to embodiments of the present disclosure, an instrument landing system (ILS) is described. The ILS comprises a plurality of antennas and a plurality of antenna radio units (ARUs). Each ARU of the plurality of ARUs operates to generate a modulated RF signal provided to a different one of the plurality of antennas for transmission. The ILS further comprises a central processing unit that operates to control the ARUs to adjust synchronization between the modulated RF signal provided by the ARUs to the plurality of antennas for transmission.

BRIEF DESCRIPTION OF THE DRAWINGS

Aspects of the present disclosure are illustrated by way of example and are not limited by the accompanying drawings. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Some embodiments of the present disclosure are directed to solving potential synchronization issues which may arise with ILS architectures. In fact, while in a traditional system a single transmitter generates the modulated RF signal which is then distributed to all the antennas through a passive network, in a distributed system according to some presently disclosed embodiments the signal irradiated by each antenna is generated by a dedicated active transmitter.

Figure 1:
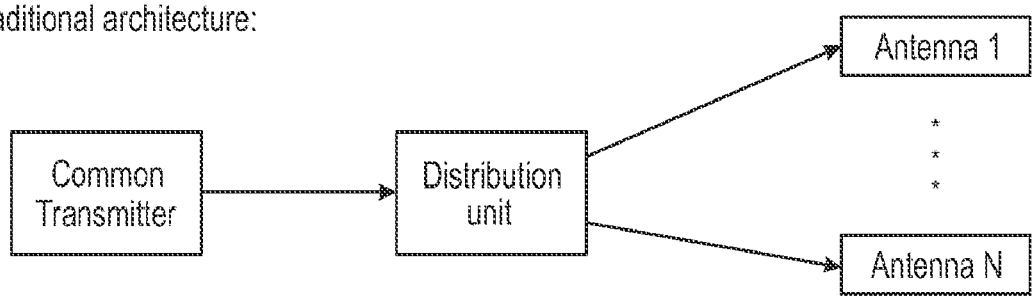
FIG. 1 illustrates a traditional ILS system architecture, in accordance with some embodiments.
Figure 2:
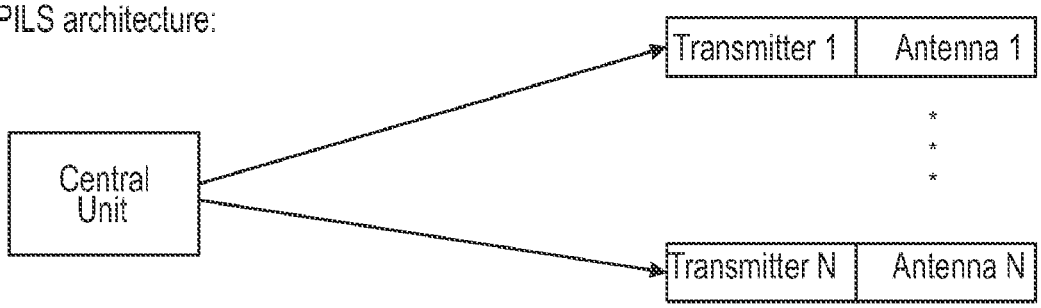
FIG. 2 illustrates a Portable Instrument Landing System architecture that is configured in accordance with some embodiments.

FIG. 1 illustrates a traditional ILS system architecture. FIG. 2 illustrates a Portable Instrument Landing System (PILS) architecture that is configured in accordance with some embodiments of the present disclosure.

Referring to FIG. 2, proper synchronization among the Transmitters (called "ARU", Antenna Radio Unit), coordinated by a common Central Unit (CU), is needed to guarantee the coherence of the composite signal in space. In some embodiments, the Central Unit comprises one of processing circuitry and/or a processor to perform the operations described herein. Additional examples and embodiments regarding hardware and/or software implementations of the central unit are also described herein below.

The issue is transversal to the Localizer and the Glide Path (in this document it is described for the GP, which is the most critical), and can be divided into the following three groups:

1) Synchronization of carrier frequency and phase (e.g., 330 MHz): all the antennas are operated to transmit the same carrier frequency and phase.

In the traditional system of FIG. 1, only one RF oscillator is present, and the RF phase equality among the antennas is guaranteed by the Distribution Unit tolerances and by a proper RF cables calibration.

In the PILS architecture of FIG. 2, instead, each ARU has its own local oscillator. The Central Unit must broadcast a reference oscillator to all the ARUs, so that they receive a common oscillator to which they lock their own RF local oscillator. Then, since each transmitter is able to correct whichever RF phase, the equality of the cables' RF phase is not needed but an adequate measurement of the different cable delays must be performed by the Central Unit.

2) Synchronization of the modulations (e.g., Morse, 90 Hz, 150 Hz, 1020 Hz, 8 kHz): all the antennas are operated to transmit the modulation signal with the same frequency and phase.

In the traditional system of FIG. 1, the modulation signals are generated by the common transmitter.

In the PILS architecture of FIG. 2, this issue is theoretically analogous to the previous two, with the simplification that the signals are slower (and not affected by the cable lengths) but the complication that they are many, so that they need to be multiplexed and de-multiplexed.

3) Synchronization of the Receiver (e.g., safety issue): a failure of any of the two previous issues has to be detected by the Central Unit.

In the traditional system of FIG. 1, this issue is almost absent, since there is basically one monitor.

In the PILS architecture of FIG. 2, instead, the Monitor of the Central Unit estimates the signal-in-space by processing the numerical values computed by the digital receivers housed in each ARU. These values are reliable only if the synchronization circuits don't fail; therefore, the synchronization circuits used by each ARU transmitter should be independent of the synchronization circuits used by the ARU receiver.

In the PILS architecture of various embodiments herein, the TX section and the RX section of each ARU can operate as independent units, therefore N is twice the number of the antennas (and of the ARU).

Corresponding embodiments are directed to an ILS that includes a plurality of antennas, a plurality of ARUs each of which operates to generate a modulated RF signal provided to a different one of the plurality of antennas for transmission. The ILS further includes a central unit that operates to control the ARUs to adjust synchronization between the modulated RF signal provided by the ARUs to the plurality of antennas for transmission.

In one embodiment, the central unit operates to control the ARUs to adjust synchronization of carrier frequency and phase between the modulated RF signal provided by the ARUs to the plurality of antennas for transmission. As will be explained in more detail below, it can be particularly advantageous for the central unit to operate to control the ARUs to adjust synchronization of carrier phase spread to have not more than a threshold RF deviation, such as, but not limited to, a 1° RF deviation, between the modulated RF signals provided by the ARUs to the plurality of antennas for transmission, in accordance with one embodiment.

In another embodiment, each of the ARUs is directly connected to provide one of the modulated RF signals to only one of the plurality of antennas for transmission. Each of the ARUs can include a local RF oscillator circuit that operates to phase lock to a reference oscillator signal provided by the central unit. The central unit can be connected through a plurality of cables each to different ones of the ARUs to provide signals through the cables for the ARUs to generate the modulated RF signals, and the central unit can operate to measure cable signaling delays between the central unit and each of the ARUs, and to adjust synchronization between the modulated RF signal provided by the ARUs to the plurality of antennas for transmission based on the measurements of the cable signaling delays. The cable signaling delays may be measured based on comparing phasing between the reference oscillator signal and signals of each of the local RF oscillator circuits.

In another embodiment, each of the ARUs includes a transmitter circuit, transmitter synchronization circuit, receiver circuit, and a receiver synchronization circuit. The transmitter circuit is operative to transmit a modulated RF signal. The transmitter synchronization circuit is operative to control synchronization of the modulated RF signal transmitted by the transmitter circuit. The receiver circuit is operative to receive a modulated RF signal. The receiver synchronization circuit is operative to control synchronization of the modulated RF signal received by the receiver circuit. In a further embodiment, the central unit is operative to adjust synchronization of carrier frequency and phase between the transmitter circuits within each of the ARUs.

Concept Development

A description of PILS concept development (also referred to as "new system") is now provided below in accordance with some embodiments.

The ARU can be operative to generate signals according to the following mathematical description.

Figure 3:
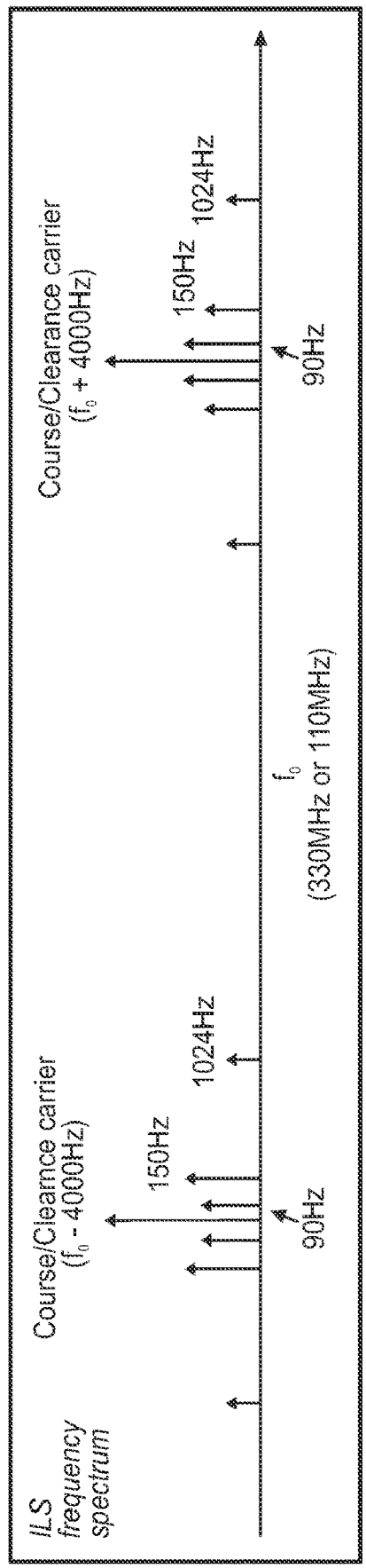
FIG. 3 illustrates two carriers in ideal signal space, in accordance with some embodiments.

The ideal signal in space (V) is composed of two carriers (CRS and CLR, such as shown in FIG. 3) shifted about +4 kHz and −4 kHz ($f_s$) from the center frequency f0 (330 MHz), each amplitude modulated at 80% by two continuous tones at 90 Hz and 150 Hz with a difference of modulation DDM dependent on the receiver elevation angle:

$$V(t,\theta)=V(0)*\cos[2\pi(f_0-f_s)t*1+(0.4-DDM(0)/2)*\cos(2\pi*90*t)+(0.4+DDM(\theta)/2)*\cos(2\pi*150*t)]+$$
(clearance, centered at $f_0+f_s$)

FIG. 3 illustrates two carriers (CRS and CLR) in ideal signal space in accordance with some embodiments. For the Localizer system only, each carrier is amplitude modulated also by a 1020 Hz tone keyed by the Morse code (whose impulses have duration of fraction of seconds):

$$ID(t)=\cos(2\pi*1024*t)*\text{Morse}(t)$$

This signal in space $V_{ARU-i}$ is achieved by feeding each antenna (i) with similar signals which differs for the RF amplitude, the RF phase $\psi_i$ and the tone modulation depths and phase $\psi_i^{sbo}$, and have in common other characteristics like carrier frequency, modulation frequency and the Morse code:

$$V_{ARU-i}(t)=V_i*\cos[2\pi(f_0-f_s)t+\psi_i]*[1+(0.4+A_i)*\cos(2\pi*f_{90}*t+\psi_i^{sbo})\pm(0.4+A_i)*\cos(2\pi*f_{150}*t+\psi_i^{sbo})]+(+\text{clearance, centered at } f_0+f_s)$$

Basically, while the coefficients with the index i change for each antenna and therefore for each ARU ($V_i$, $\psi_i$, $A_i$, $\psi_i^{sbo}$ for both CRS and CLR), the synchronization consist into guarantee that all the common frequencies are as much as possible identical each other and start as much as possible at the same instant (phase), in accordance with some embodiments.

TABLE 1

Allowed Tolerance Periods

| | Nominal Frequency | Allowed Tolerance (period) |
|---|---|---|
| carrier frequency | $f_0$ = 330 MHz (or 110 MHz) | $\Delta t_0$ = 8 ps (or 24 ps) |
| half of course-clearance shift | $f_S$ = 4 KHz | $\Delta t_s$ = 0.7 us |
| identification tone | $f_{1024}$ = 1024 Hz | $\Delta t_{1024}$ = 3 us |
| navigation tone | $f_{90}$ = 90 Hz | $\Delta t_{90}$ = 30 us |
| navigation tone | $f_{150}$ = 150 Hz | $\Delta t_{150}$ = 20 us |
| morse code typical rate | $f_{morse}$ = 1 Hz | $\Delta t_{morse}$ = 3 ms |

In one embodiment, for the new glide path system to guarantee a stable descent angle, the allowable static phase spread of the radio frequency carriers must be lower than 1°. This requirement is the result of the simulations performed on the new imageless GP array which have shown that 1° RF deviation between two antenna transmitters can produce a DDM deviation of about 0.5%, corresponding to 0.02° of glide path angle deviation, which is acceptable. Since 0.03° is the typical GP angle noise experienced with the current system in the real environment, in the design study of the new system a conservative target of 0.02° has been identified because of the ideal environment of the simulation systems. On the other hand, in the current imaging system even 5° of RF phase deviation at the antennas don't affect the GP angle.

Therefore, looking at the above Table 1, this requirement limit is translated into allowable time tolerance. Just for comparison and reference, also 1° for the other frequencies is indicated.

With reference to Table 1, it is evident that the first item (carrier synchronization) requires special care with respect to the other items (modulation synchronization). The Bps requirement is a challenging target (especially due to the cable length more than 50 m); it must be guaranteed over a medium and long term (otherwise it would produce an unstable descent angle), while over a short term (ms range) this requirement could be conservative. The very short term phase deviation (high frequency jitter) shouldn't care since the signals are amplitude modulated.

Solution Description

Various further embodiments are now described in the context of how the PILS system may be implemented.

Signal description and introduction of solution options.

Each ARU Transmitter is an autonomous Software Defined Radio, able to generate a modulated radio frequency signal at a programmable carrier frequency and programmable configuration values (e.g., at least one of RF power, RF phase, modulation depths, and phases). The frequency, waveforms and stability requirements of the VOR signal are very close to those of ILS, therefore it can be relatively low cost and low complexity to implement a rudimentary ILS 4-antennas localizer system by using a DVOR physical platform, producing a localizer signal in space. Therefore, the frequency and phase accuracy of the SDR is proven, while only the synchronization among the different ARU has been studied.

The solutions presented in the following paragraphs are focused to a system design independent from cable lengths and on field calibrations.

Star distribution of common synchronization signal

In some embodiments, each ARU will have the same average radio frequency if each local oscillator (a deterministic fractional multiplication of the carrier frequency) is locked to a common TCXO broadcast by the Central Unit.

Figure 4:
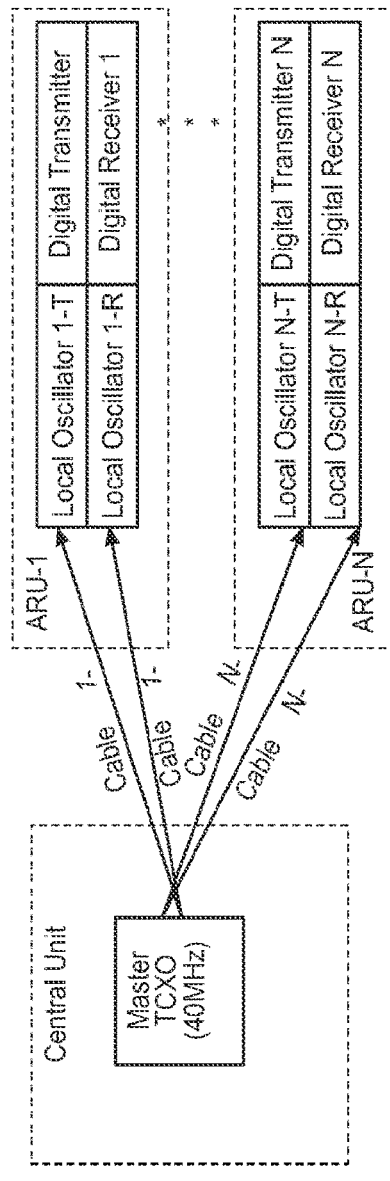
FIG. 4 illustrates an example architecture configured in accordance with some embodiments.

FIG. 4 illustrates an example architecture configured in accordance with some embodiments. The TCXO may be a signal generated by a temperature compensated crystal oscillator.

Thus, in one embodiment, each of the ARUs includes a local RF oscillator circuit that operates to output a deterministic fractional multiplication of a carrier frequency that is locked to a common TCXO broadcast by the central unit.

Figure 5:
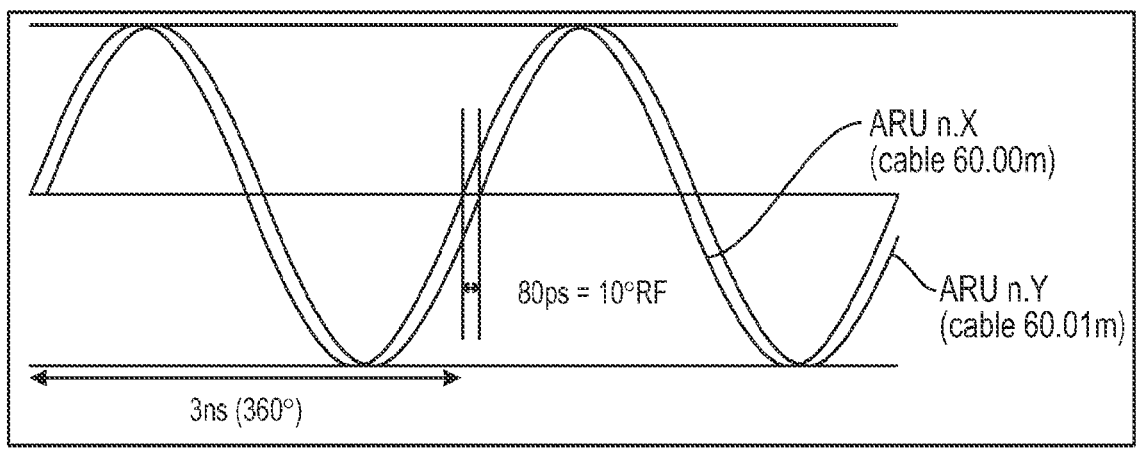
FIG. 5 illustrates a depiction when two cables differ by 1 cm, in accordance with some embodiments.

Referring to FIG. 4, the architecture may guarantee the carrier frequency synchronization but not the RF phase synchronization, because the requirement of 10 ps can only be achieved if the 20 cables have exactly the same length with accuracy of 1 mm over a total length of 60 m or 80 m (considering the two versions of the horizontal GP under investigation). FIG. 5 shows what happens in an instance the two cables differ by only 1 cm (which isn't acceptable to meet our 1° phase shift limit).

However, some embodiments enable measurement of the RF offset of each cable, so the digital transmitter associated to that cable can operate to subtract this value to the nominal RF phase at the antenna port (needed to form the array pattern), so that the signals at the antennas would be in phase.

The measurement of the cables delay is demanded to the Central Unit. The absolute value of the cable delay (and of the Transmitter) is not needed, since only the difference among all the cables (and among the ARUs) is determinant for the phased array beam forming. After having discarded other solutions like cable length measurement at the installation setup or implementing a continuous measurement, a solution is provided based on a time division multiplexing.

The local RF oscillator of the ARU is driven by an internal TCXO (see FIGS. 6 and 8) which is controlled by a phase locked loop (PLL) locked to the synchronization signal broadcasted by the central unit (CU) and generated by its internal TCXO.

Periodically (e.g. every second) the CU stops the TCXO transmission to one ARU only for a very short time slot (e.g. a few milliseconds), during which the local ARU TCXO is frozen (PLL freezes the hold state). During this time slot (while the signal generated by that ARU should be sufficiently stable, as demonstrated later), the CU can measure the phase difference between its TCXO and the ARU TXCO signal sent back over the same cable.

Accordingly, in one embodiment each of the ARUs includes a local RF oscillator circuit that is driven by a TCXO, internal to each of the ARUs, which is controlled by a PLL locked to a synchronization signal broadcasted by the central unit from a TCXO internal to the central unit. Periodically the central unit operates to stop the TCXO of one ARU for a defined time slot duration during which the TCXO of the one ARU is frozen in a hold state, and while the TCXO of the one ARU is frozen the central unit operates to measure phase difference between the TCXO internal to the central unit and a signal from the TCXO internal to the one ARU sent through a cable to the central unit.

Figure 6:
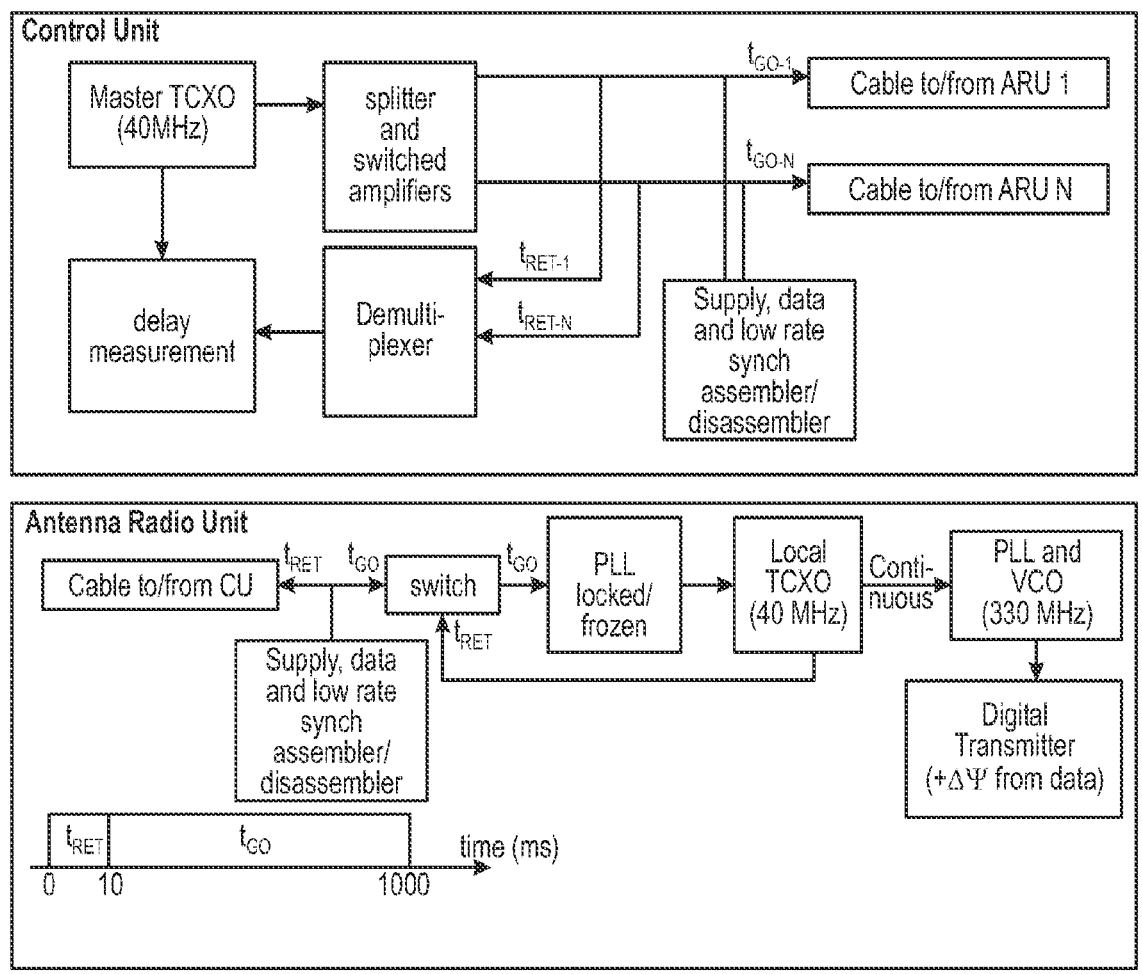
FIG. 6 illustrates an example block diagram with associated operations for implementing a system in accordance with some embodiments.

FIG. 6 illustrates an example block diagram with associated circuits and operations for implementing this system in accordance with some embodiments. In the system of FIG. 6 the circuit and operations include, during the "too" time interval (about 990 ms every second) the local TCXO of the ARU is locked to the master TCXO of the CU. The local frequency is controlled. During the "$t_{RET}$" time interval (about 10 ms every second) the local TCXO of each ARU is frozen, and the CU measures the local ARU delayed (two times) by the cable. The local frequency is free running Every second, the CU updates each ARU with the new measured phase delay 4/2, together with the other configuration values (power, modulation index). The low rate synchronisms (modulation tones, ID, and so on) are broadcast on the same cables (as shown later). In FIG. 6, the "Control Unit" (CU) can correspond to the "central unit" described elsewhere herein.

Figure 7:
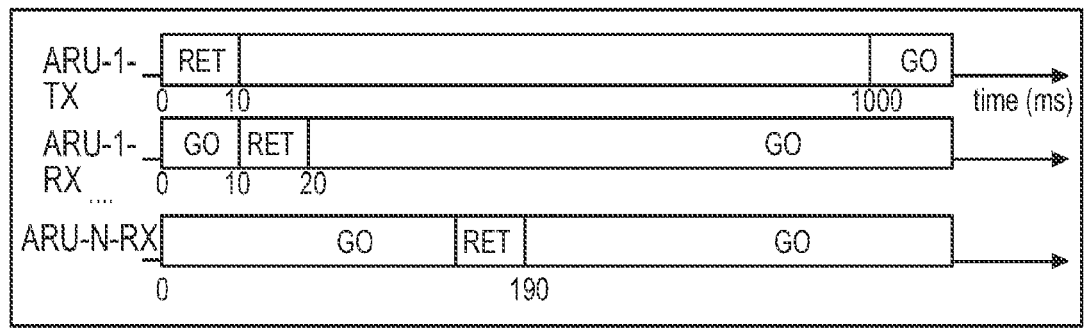
FIG. 7 illustrates a timing diagram, in accordance with some embodiments.

In case 10 (TX)+10 (RX) ARUs need to be synchronized, a possible time schedule could be as shown by the timing diagram of FIG. 7.

The determination of the most suitable time slot duration is fundamental for the integrity of the signal in space, and it is the result of a trade-off between a large value, needed to the CU to perform accurate and stable phase measurement, and a small value, needed to avoid an excessive wandering of the frozen local TCXO.

Unfortunately, while the long term frequency stability is specified for the commercially available TCXOs (typically 1 ppm/year, which is already a very good value), the short term deviation (ppm/s) is generally specified for more precise atomic TCXO (0.002 ppm/s), which cannot be used for their cost (1000$) and power consumption (5 W).

A rough evaluation of the short term deviation has been performed through experimentation by mixing the frequencies produced by two typical identical TCXO and measuring the deviation with time of the beat frequency. A rough estimation of the TCXO short term stability is about 1 Hz at 330 MHz. Unfortunately, despite the stability is very good (3e-9), it is not enough to let the TCXO free run for 1 s. In fact, to be conservative, 1 Hz within is would produce a phase shift equal to 360°, which is far from our 1° target. Since $\Delta\psi=2\pi\Delta f\,t$, a free-run slot of 10 ms would produce 3.6° but could reasonably suppose that within 10 ms the frequency deviation is much less than 1 Hz (value measured after 1 s). On the other hand, the 10 ms time slot contains several thousands of 40 MHz oscillations, which allows the CU a stable and accurate measurement of the phase shift (with about 10 ps, i.e. 0.1°, accuracy).

Phase Synchronization Loop Based on Multiple Carriers

In some embodiments each ARU will implement a precise phase synchronization scheme of its internal clock using a distributed phase synchronization loop based on different tones transmitted over the connection coaxial cable. This approach is working properly and is very accurate if the propagation velocity in the medium is the same for the different frequencies selected (the cable shall be almost not dispersive).

In accordance with some implementation embodiments, two frequencies transmitted toward ARU are named $f_1$ and $f_2$ and chosen such as they add up to a desired frequency $f_{op}$. In the ARU the two frequencies $f_1$ and $f_2$ are mixed together to obtain the operating frequency fop which is divided by two and sent back in the same cable to the CU. The required frequency separation and selectivity in ARU as well as in CU can be practically guaranteed using inexpensive filters (surface acoustic wave (SAW) or LC) avoiding directional couplers.

The CU receives back the $f_{op}/2$ tone and compares in phase this signal with the generated fop signal correcting properly the phase of one of the two tones transmitted to the ARU ($f_2$), implementing thus a distributed PLL architecture.

Accordingly, in one embodiment each of the ARUs includes a local RF oscillator circuit. The central unit provides each ARU two frequency signals through cables each of which respectively connects the central unit to a different one of the ARUs. The central unit also combines the two frequency signals to provide an operating frequency signal at the central unit. Each of the ARUs mixes the two frequency signals together to obtain the operating frequency signal which is then divided by two to generate return signals that are provided back to the control unit through the respective cable. For each of the ARUs, the control unit receives the return signals from the ARU and compares phase of the return signals from the ARU to the operating frequency signal at the central unit and adjusts synchronization of the ARU based on the phase comparison.

Figure 8:
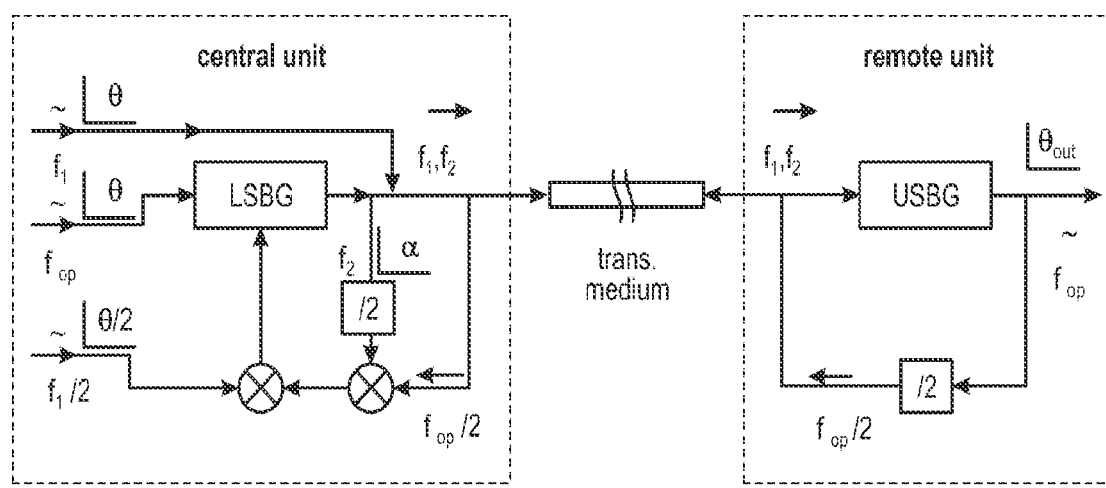
FIG. 8 illustrates an example operation of the architecture, in accordance with some embodiments.

FIG. 8 shows example operation of the architecture described above. USBG and LSBG are respectively an upper or lower side band generator (balanced mixers and filtering). In the CU there are other two mixers to properly generate the phase controlled tone $f_2$ which is closing the loop together with the feedback tone $f_{op}/2$. This architecture can be synthetized in an equivalent way using an FPGA or another RF digital solution.

This approach has been verified to be accurate with phase error less than a 1 degree even for microwave implementation, compensating intrinsically any temperature variation related to cables (i.e. length, velocity factor).

It can be shown that in steady state the phase offsets of the cables are compensating, and the system is insensitive to cable lengths and only an error is generated if the cables are dispersive. In some implementations the frequencies are in hundred megahertz range and the overall bandwidth used by the three tones is limited too in that range, so the dispersion is negligible.

Figure 9:
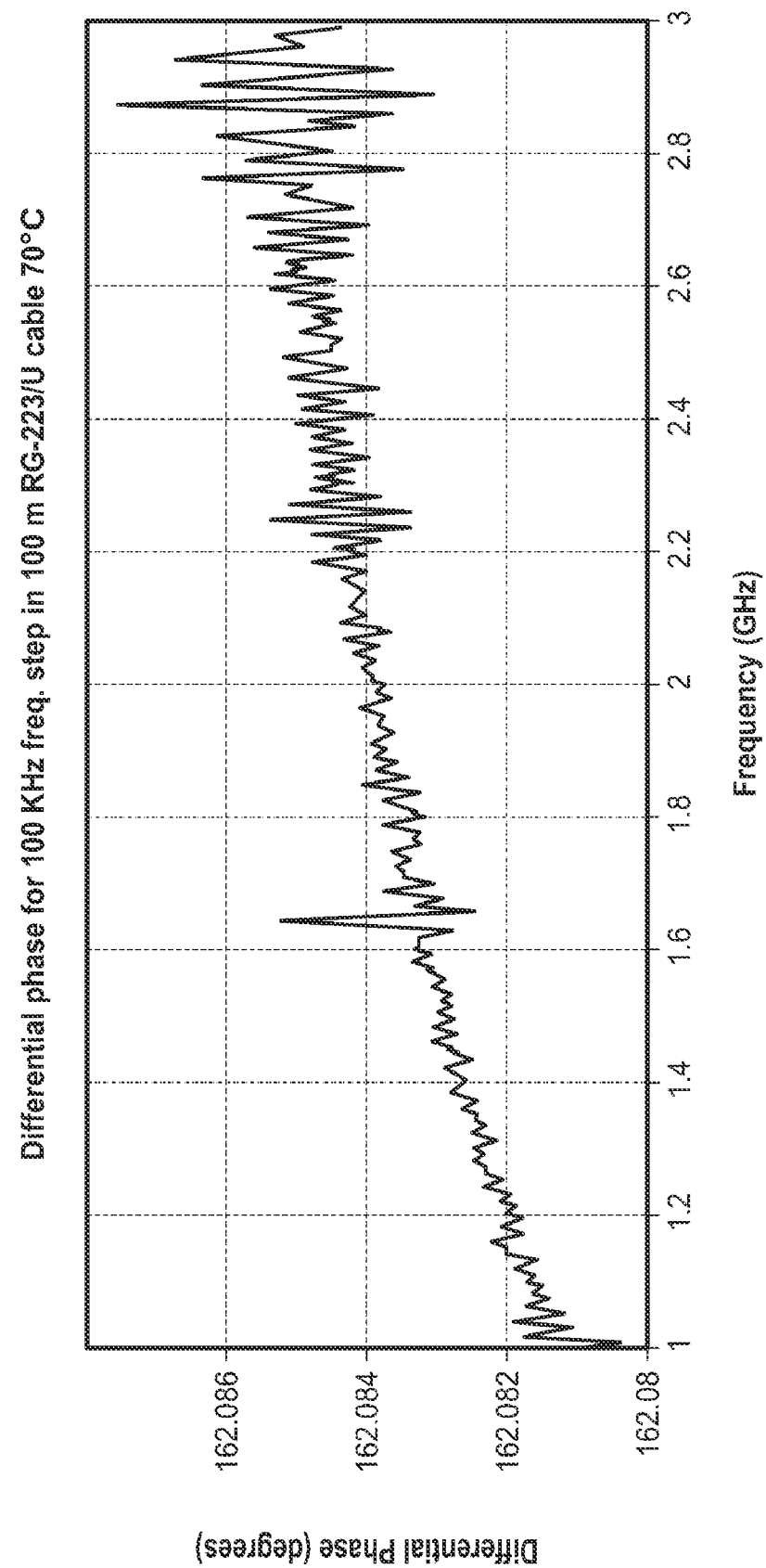
FIG. 9 illustrates an example measurement that shows a typical behavior of a common cable, in accordance with some embodiments.

FIG. 9 illustrates an example measurement that shows a typical behavior of a common cable like RG223. The differential phase error related to cable dispersion is in the range of some thousands of degree below 1 gHz. This is the magnitude of error contribution due to dispersion which may occur when operating around 330 mHz.

Synchronization of the Modulation

Once the carrier frequencies are synchronized using one of the two example approaches, in each ARU the modulation frequency can be easily generated as a fractional ratio of the carrier frequency with a very high resolution. Being the ratio a deterministic value, the equality of all the modulation frequencies is guaranteed.

Just as an example, if the carrier frequency is 332 MHz (with 1000 Hz tolerance), the modulation tones can be generated in this way:

$f_{90}$=332.000.000 (±1000)/$2^{40}$*298.061=90.0002 Hz (±0.002) Hz (requirement is 0.01 Hz)

$f_{150}$=332.000.000 (±1000)/$2^{40}$*496.768=150.0002 Hz (±0.003) Hz (requirement is 0.01 Hz)

$f_{1024}$=332.000.000 (±1000)/$2^{32}$*13.247=1023.99 Hz (±0.02) Hz (requirement is 0.1 Hz)

$f_S$=332.000.000 (±1000)/$2^{24}$*203=4017 Hz (±0.1) Hz (requirement is 50 Hz)

Figure 10:
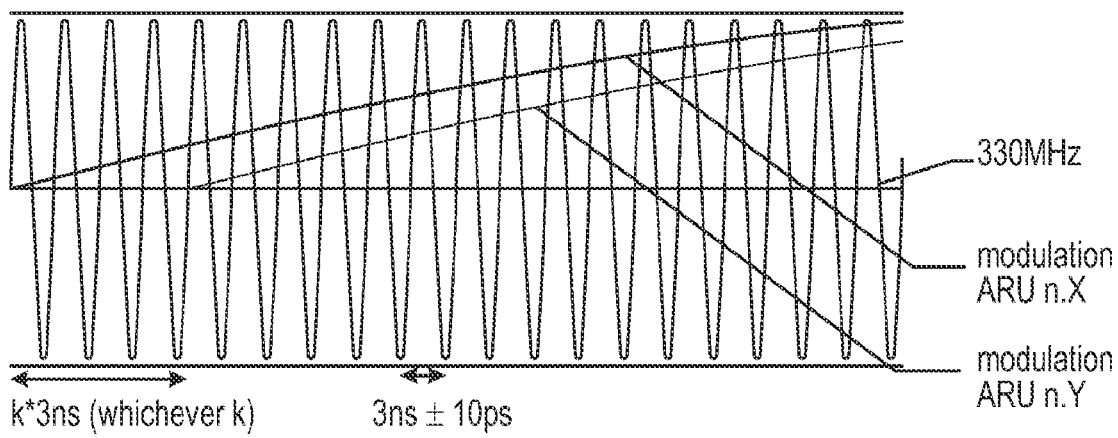
FIG. 10 illustrates an example operation of synchronization of the modulation, in accordance with some embodiments.

As far as the modulating frequencies are concerned, the synchronization is not an issue. Instead, since the low frequency is achieved with a division of a much higher frequency, their phase is an issue, because it must be prevented that in each ARU the low frequency starts with a whichever period of the radio frequency. FIG. 10 is a graph illustrating an example operation of synchronization of the modulation.

Because of the low accuracy required to synchronize the ARUs in the modulation time domain (about 1 µs), the cable delays are negligible, and a common modulation synchronism can be broadcast by the CU to all the ARUs without any need of the return from each cable.

Figure 11:
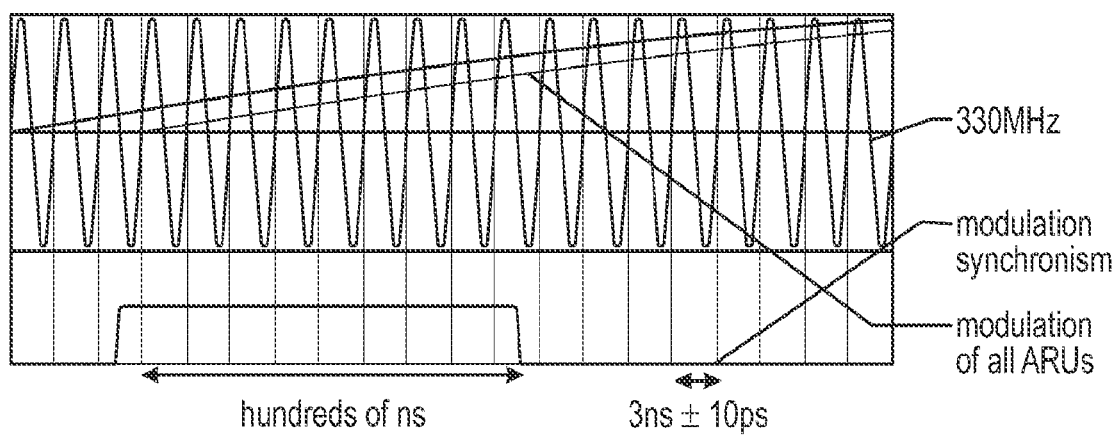
FIG. 11 illustrates a graph that shows modulation synchronism, in accordance with some embodiments.

The Direct Digital Synthesizer (DDS) in the ARU will generate the modulation frequency as a division of the radio frequency using the synchronization impulse from the CU as a trigger. FIG. 11 is a graph illustrating modulation synchronism.

The modulation synchronism can be physically sent to the ARU together with the configuration data, whose first rough estimation is about 100 kb/s, but can be increased to 1 Mb/s for this purpose.

Transmission of Synchronization Signals

According to some embodiments, synchronization signals to remote ARUs are transmitted over fiber or copper cables. In one embodiment, the synchronization signals can be distributed as an electrical signal over a copper wire. In some embodiments, a single cable per connection from the CU to the ARU and from ARU back to the CU is used. In some implementations, the main ILS signal is transmitted over a fiber connection together with the synchronization signal in the forward path. In the reverse path, the synchronization signal is sent separately. With this architecture, the ARUs are simplified because they will not need to synthesize the main ILS signal internally. The ARU or CU can adjust phase of the main signal according to the synchronization loop.

In some embodiments, the cables comprise optical fibers. In order to reduce size and weight for the interconnections optical principles can be used basically to interconnect CU and ARU by optical fibers according to some embodiments. Especially for the interconnection of subarrays a single or multiple fibers attached to a single ruggedized interconnector plug can be used. The central unit, in some embodiments, operates to control the ARUs to adjust synchronization between the modulated RF signal provided by the ARUs to the plurality of antennas for transmission using optical synchronization signals transmitted over the optical fiber cables.

In some embodiments, the transmission of synchronization data over fiber or copper cables using multiple carriers. In this embodiment, one of the carriers of the multiple carrier is used for the return path. The return path can be over the same media (for fiber using as example different modes or wavelengths) or using a separate media of the same length of the forward path (i.e. for fiber means another one of the same multiple cable).

Each frequency of the multiple carrier electrical signal is mapped to a certain wavelength of the optical synchronization signal. The synchronization signal will then remain as a time continuous signal. The optical synchronization signal can be sent over a single optical fiber to interconnect the subarrays. The distribution to each ARU can be performed by an interconnector box which splits the optical signal for distribution via short fibers to interconnect to each ARU. The optical synchronization signal can be converted back to the electrical signal and the interconnection at the connector box is performed by equal length short electric interconnector cables.

In some embodiments, the transmission of the synchronization signals over fiber or copper cables using time multiplexing and sending back phase alignment data over the same media. In some embodiments, the time multiplexing synchronization scheme can be applied by modulation of the intensity of the light. The principle of the connections between the CU and ARU is one of similar or identical to the examples described above.

The usage of a Phase Locked Loop (PLL) optical implementation for the architecture is also described above. In some embodiments, an alternative consists in the use of optical PLL's in the synchronization loop such that the synchronization is achieved in the optical domain. This implementation will increase the overall synchronization accuracy since with the faster optical synchronization phase noise and jitter will be at frequencies above those of the electrical synchronization.

Star Distribution of Common Synchronization Signal

A test has been performed to evaluate the possibility to freeze the local TCXOs of the ARU for a small time interval, during which the Control Unit can measure the TCXO delay returned by the ARU by using the same cable used for the common TCXO transmission.

Figure 12:
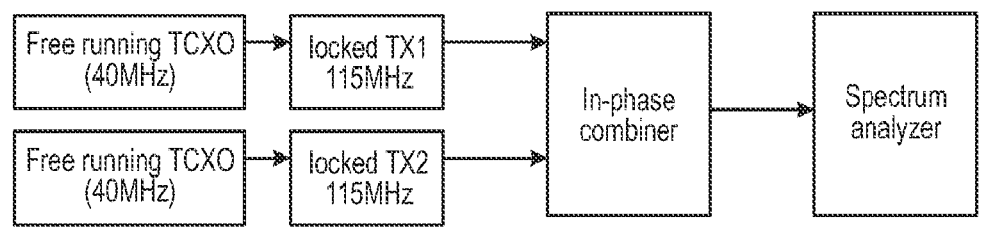
FIG. 12 illustrates two DVOR transmitters configured in accordance with some embodiments.

Test bench: two DVOR transmitters (SDR at 115 MHz), each locked to its own free running TCXO (40 MHz); the frequency stability declared by the manufactured if of the order of magnitude of 0.1±1 ppm (i.e. more than 30 Hz at the GP frequency), depending on the supply voltage, the load, the temperature, the aging. FIG. 12 illustrates two DVOR transmitters configured according to some embodiments.

The measurement results show that the two carriers (at 115 MHz) move each other by at least 0.1 Hz, which corresponds to 0.3 Hz at 330 MHz (GP frequency). This frequency offset produces a phase shift of some tens of degree in a small fraction of second, which isn't acceptable The conclusion is that if the transmitters are implemented with the same TCXO, they cannot be left unlocked, not even for a small fraction of seconds, but the only viable option is to freeze the local TCXO for a few millisecond; during this interval the TCXO wanderings are reasonable lower, and the receiver demodulator could be insensitive to the signal in space variation, since the modulation tones are 90 HZ and 150 Hz.

Discussion and Assessment

The results of the study of various embodiments disclosed herein show that the phase synchronization of the remote units is feasible using both approaches (common signal or multiple carriers) satisfying a 1 degree phase alignment target.

For the modulation synchronization is possible in both cases to use a low frequency impulse to properly align modulating signals and eventually transmit two way configuration data. It would be possible to implement the solution using a single cable to combine and transmit high frequency phase synchronization, low frequency impulses and data as well as power to remote ARU.

Key differences provided by various embodiments disclosed herein can include:

Star distribution of common synchronization signal
1) Cable lengths are measured periodically and compensated in the ARU transmitting proper data
2) Simpler hardware (HW) implementation
3) TCXO need to be frozen during cable measurements
4) The system can be scaled up adding ARU units but considering the time multiplexing polling constraints Phase synchronization loop based on multiple carriers
1) Insensitive to cable lengths and temperature variations
2) Requires some filtering to separate the carriers and generally more complex HW implementation
3) Real time control of locking and no need to freeze TXCO
4) The system can be scaled up replicating the point to point architecture.

Derived requirements in various embodiments are now described. Some embodiments are related to the following requirements based on the unique customer requirements for this study:

a) The glide path system shall be a non-imaging type, according to some embodiments.

Conventional imaging type glide path systems require a large flat area in front of the glide path antenna in order to produce a proper signal in space. Thus, an imaging system could not meet the requirement for installation in "austere" locations.

b) The glide path system shall use a horizontal antenna array or a vertical antenna array on a short mast.

A conventional glide path antenna array is mounted on a tall (up to 60 feet) and heavy tower, which is incompatible with the transportability and installation requirements.

c) Each antenna in the localizer and glide path arrays shall be driven by a separate Antenna Radio Unit (ARU), which is a "software-defined" transmitter and receiver. The receiver is used for monitoring.

A conventional localizer or glide path system has a single transmitter connected to the antennas through a hardware distribution unit. The use of a small ARU for each antenna simplifies packaging and installation, and provides much greater flexibility in design and tuning, since each antenna's signal amplitude and phase can be precisely set via software.

Some additional embodiments of concept developments, assessment approaches, and applied methods are now discussed below.

The bulk of the development effort has been concentrated on the glide path antenna system, since it is a completely new design. Various configurations have been considered, analyzing signal in space performance capability within the constraints of packaging and setup time requirements.

Some embodiments for approaches for concept derivation are discussed below.

Glide Path

In some embodiments, the glide path system requires a radically different approach to the antenna array design. For each array configuration studied, simulations have been performed to evaluate performance of the signal in space. Capabilities of the simulations include:

a) Plot of Difference in Depth of Modulation (DDM) as function of elevation angle over a range of azimuth angles. (Note: DDM is the basic signal characteristic that enables the aircraft ILS receiver to measure the vertical deviation of the aircraft position from the desired glide path. For a typical 3° glide path, DDM is zero at 3°, increases as the aircraft descends below the glide path, and decreases as the aircraft climbs above the glide path.)

b) Plot of DDM as a function of azimuth angle over a range of elevation angles.

c) Plot of DDM as a function of distance from the glide path antenna array over a range of elevation and azimuth angles.

d) Plot of CSB and SBO power and phase under the conditions described above for DDM. (Note: CSB [carrier plus sideband] and SBO [sideband only] are two components of the signal in space, that when combined produce DDM.)

e) Effect of antenna mechanical displacement on DDM.

f) Effect of ARU power and phase errors on DDM.

g) Effect of ground reflections, including from rough and sloping ground.

h) Effect of RF coupling between antennas in an array.

i) Radiation patterns and other characteristics of individual antennas.

The plots of DDM indicate the signal in space glide path angle and width, which are key parameters that were compared to the ICAO Annex 10 and FAA Order 8200.1 limits.

Localizer

In some embodiments, the localizer antenna array can be based on a standard 8-element array which may be different from some existing arrays in the mechanical support system (modified for easier packaging and installation) and the individual antenna element design (modified to decrease size and weight). Another difference is the use of a separate ARU for each of the 8 elements. This provides a vast improvement in set-up tine, since precise phase adjustments can be made via software, rather than the conventional method of coaxial cable trimming. Simulations have been performed to evaluate the performance of the candidate elements in terms of radiation pattern, gain, front-back ratio, etc.

Localizer antenna arrays in common usage vary in size from 8 elements up to 32 elements, the more elements the wider the array. The localizer beam width is inversely proportional to the aperture size. Localizers with wider apertures are less susceptible to distortion from multipath reflections that cause bends in the course. For example, the 32-element array is used for Category III localizers at airports where very large aircraft (e.g. Airbus A380) taxiing near the runway can cause bends in the approach course to exceed CAT III limits.

The 8-element configuration was chosen for this application as the result of a trade-off between performance requirements (CAT I) and the packaging and setup time requirements.

Approach for concept analysis.

The landing system concepts developed for this study have been analyzed with respect to diverse requirements. Many combinations of specific requirements require tradeoffs, e.g. a stable signal in space requires strong, rigid antenna mounting structures, but packaging and setup requirements require that they be as small and light weight as possible.

Some embodiments of a glide path antenna array are described below.

Designing a glide path antenna array to meet all the requirements of this program is challenging. Two types of arrays have been analyzed: a horizontal array mounted a meter or two above the ground, and a vertical array mounted on a 6-meter high mast.

A glide path system signal in space has two components: carrier plus sideband (CSB) and sideband only (SBO). The CSB signal is a carrier 80% amplitude modulated by two tones at 90 Hz and 150 Hz with the same amplitude, while SBO is a signal with suppressed carrier amplitude modulated by two tones at 90 Hz and 150 Hz with the same amplitude and opposite phase to each other with respect to the CSB tones. If $\vec{V}_{csb}$ and $\vec{V}_{sbo}$ are the total CSB and SBO modulating phasors received at any point of space (whose combination depends on the position of the receiver with respect to each transmit antenna), DDM at that point can be calculated as:

$$DDM(\%) = 80 * \frac{|\vec{V}_{SBO}|}{|\vec{V}_{CSB}|} \cos\left[\psi(\vec{V}_{CSB}) - \psi(\vec{V}_{SBO})\right]$$

To produce a suitable glide path signal in space we need to select the appropriate CSB and SBO amplitude and phase at each antenna element to produce DDM of zero on the glide path. This is typically done by achieving a null in SBO amplitude at the desired glide path angle, usually 3°. This approach can be used herein for the horizontal array. However, it can also be done by adjusting phases to make the cosine function zero (i.e. CSB and SBO phase in quadrature), and this was the approach taken for the non-imaging vertical array.

Figure 13:
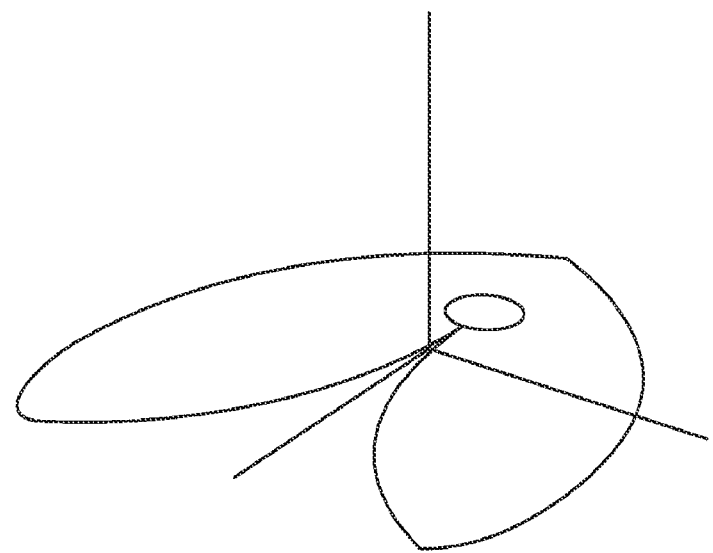
FIG. 13 illustrates a Vivaldi antenna configured in accordance with some embodiments.
Figure 14:
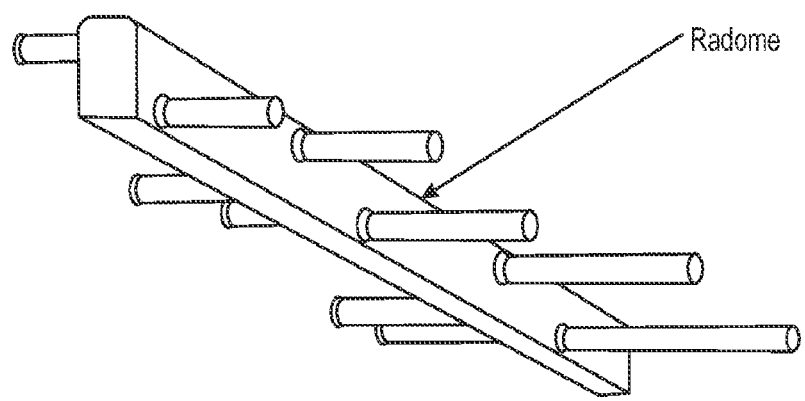
FIG. 14 illustrates a log periodic dipole (LPD) antenna configured in accordance with some embodiments.

Two types of antenna elements have been considered for the glide path array: a log periodic dipole (LPD) and the Vivaldi antenna, a tapered slot antenna that is essentially a flat plate. The Vivaldi units can be stacked very compactly for shipment, although the LPD has better directivity, which eases transmitter power requirements. FIG. 13 illustrates an example Vivaldi antenna, which is 0.75 m by 0.75 m, and has a gain of 5.2 dBi (plus array factor). FIG. 14 also illustrates an example LPD antenna which may be 0.74 m long and have a gain of 9 dBi (plus array factor).

In some embodiments, the central unit operates to synthesize a Depth of Modulation, DDM, signal and/or a Sum Depth of Modulation, SDM, as received by an airborne aircraft based on measured RF parameters received from one or more of the individual ARUs. In this embodiment, the central unit operates to determine whether the synthesized DDM signal and/or SDM signal one of meets or exceeds a predetermined threshold based on a comparison of the DDM signal and/or SDM signal to one or more configured RF parameters of the individual ARUs. In some embodiments, the central unit operates to cease operation of the plurality of ARUs in response to a determination that the synthesized DDM signal and/or SDM signal one of meets or exceeds a predetermined threshold. In some other embodiments, the central unit operates to continue operation of the plurality of ARUs in response to a determination that the synthesized DDM and/or SDM signal does not meet or exceed a predetermined threshold.

For monitoring in the central unit, the field as received by an airborne user is synthesized based on the measured RF parameters from the individual ARU's Rx and forwarded to the central unit. The executive monitor in the CPM synthesizes the resulting DDM and compares the signal against configured values. This approach allows a quick estimation of the signal-in-space in any desired position (azimuth, elevation, and near field too) and whichever is their quantity. For example, monitoring can be performed for any range of values of the monitor input signals at any position and still the DDM as experienced by an airborne user can be synthesized. In contrast, in a standard ILS a few fixed positions can be estimated only. Upon detection of a disagreement which exceeds the pre-defined threshold a notification is send from the LOC CPM which triggers all LOC TX/RX ARU's to cease.

In some embodiments, each ARU of the plurality of ARUs operate to receive the modulated RF signal provided to an antenna of the plurality of antennas associated with the ARU and determine whether the modulated RF signal one of meets or exceeds a predetermined threshold based on a comparison of the modulated RF signal to one or more signal parameters of the ARU. In some embodiments, each ARU of the plurality of ARUs further operate to transmit a notification to the central unit including an indication that the modulated RF signal one of meets or exceeds a predetermined threshold based on a determination that the modulated RF signal one of meets or exceeds a predetermined threshold. In this embodiment, the central unit operates to determine whether to continue operation of one or more of the plurality of ARUs based on the notification.

Alternatively, to the monitoring of the signal in the central unit individual monitoring of the individual RF parameters can be performed directly within the ARU. In this case the relation between the validity of DDM received at the aircraft position is ensured through the per ARU individual monitor thresholds. Each (TX/RX) ARU receive own RF signal and compares signal parameters against configured values. Upon detection a notification is send to the central unit which has additional logic to decide whether further or all ARU's to cease.

In some embodiments, a monitor ARU that operates to receive RF signals radiated by the plurality of antennas. In this embodiment, the monitor ARU further operates to determine whether the RF signals radiated by the plurality of antennas is aligned with an expected DDM signal and/or SDM signal to be received by an airborne aircraft from the ILS system. In some embodiments, the monitor ARU further operates to initiate ceasing radiation of the RF signals by the plurality of antennas in response to a determination that the RF signals radiated by the plurality of antennas is not aligned with an expected DDM signal and/or SDM signal to be received by an airborne aircraft from the ILS system. In some other embodiments, the monitor ARU further operates to initiate re-calibrating the radiation of the RF signals by the plurality of antennas in response to a determination that the RF signals radiated by the plurality of antennas deviate within a pre-defined threshold from previous RF signals radiated during a calibration process of the ILS system.

Additional ARU can be installed and configured as receive only (RX only) dedicated for field monitoring of the radiated signal in terms of DDM. In a typical use the field monitor ceases the radiated signal upon detection of a misalignment. In addition, the field monitor can be used for condition monitoring, i.e. detect signal changes which are not critical for a user but deviate from the previous calibration state. In these cases, the field monitor can be used to re-calibrate the signal by means self-contained to the system without needing a flight check-aircraft. In this regard the different ARU's can be commanded by the central unit to radiate a signal alone or in groups of multiple ARU's in order to bring the signal as close to a minimum failure condition as possible. This can be done by a search algorithm, searching the minimum deviation to a desired DDM by cycling and adjusting through the different parameter values per ARU.

Although ceasing operation of all ARUs are described above, it should be understood that in some situations ceasing operations of one or more ARUs and continuing operation of remaining ARUs is possible. For example, if the resulting total field is still within tolerance, operation of the remaining ARUs is possible until the effected ARUs are corrected. In this situation, another set of parameters addressing the loss of the effected ARU or ARUs is loaded to bring the resulting total field within tolerance.

In some embodiments, the field monitor can be a mobile mast carrying a receive antenna and a signal measurement receiver connected to the central unit. This set-up can be used just for calibration and removed after signal calibration.

Horizontal Glide Path Array.

Figure 15:
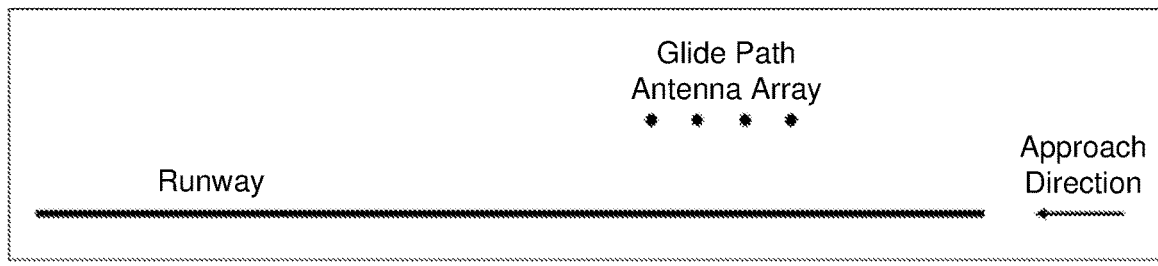
FIG. 15 illustrates a four-element horizontal glide path antenna array configuration, in accordance with some embodiments.

The first array analyzed was a non-imaging array configured as a conventional null reference imaging array, including 2 antennas mounted on a tower, laid flat on the ground, with the null reference images transformed to physical antennas, resulting in a 4-element linear horizontal array. FIG. 15 shows an aerial schematic view of this array and the runway (not to scale).

FIG. 15 illustrates a four-element horizontal glide path antenna array configuration according to some embodiments.

Figure 16:
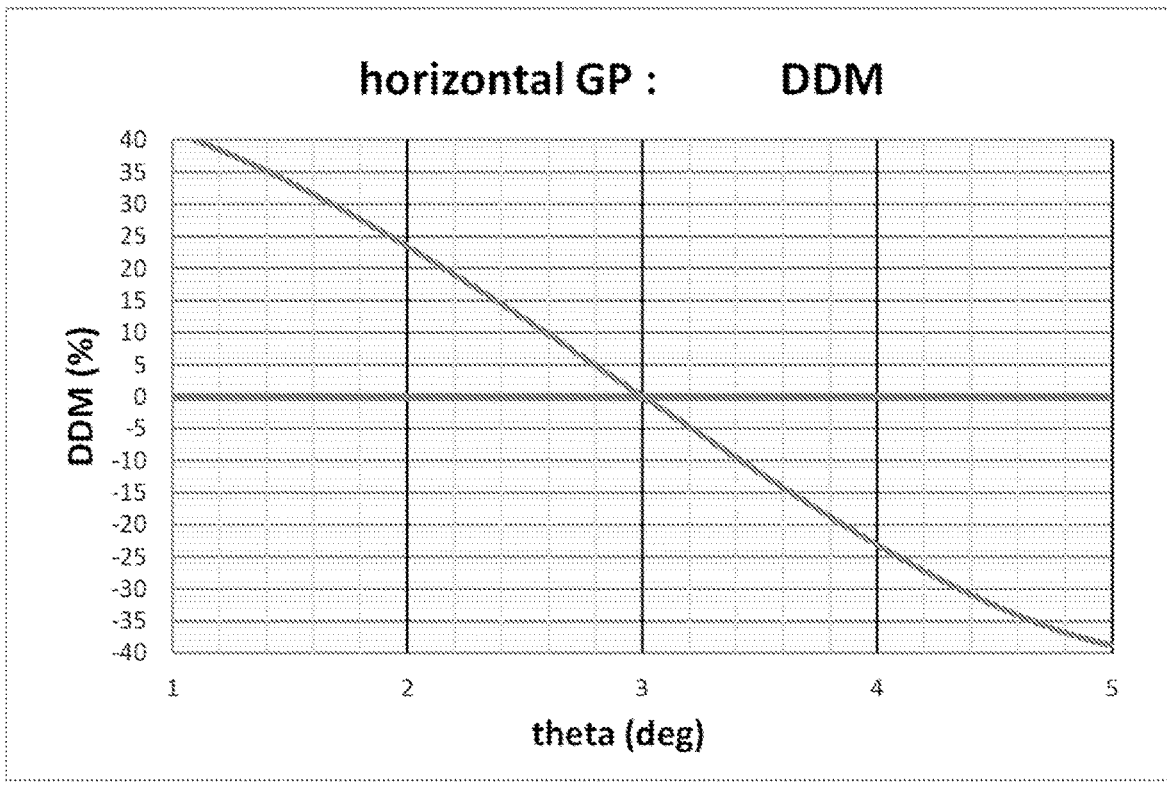
FIG. 16 illustrates a DDM vs. elevation angle for a four-element horizontal array, in accordance with some embodiments.

The spacing between elements for this array was expanded greatly from the spacing of a vertical null reference array in order to reduce sensitivity of the signal in space to antenna position tolerances. The array aperture (parallel to the runway) was about 160 meters. This array produced an excellent DDM curve vs. elevation angle, as illustrated in FIG. 16. The curve shown is for a system with a typical 3° glide path angle, although the angle can be set anywhere within the range of 2.5° to 3.5° by adjusting SBO signal phase.

FIG. 16 illustrates DDM vs. elevation angle for four element horizontal array, according to some embodiments. Note that DDM is zero at 3° elevation, is increasingly positive (fly-up indication) at lower elevation angles and negative (fly-down indication) at higher elevation angles.

Figure 17:
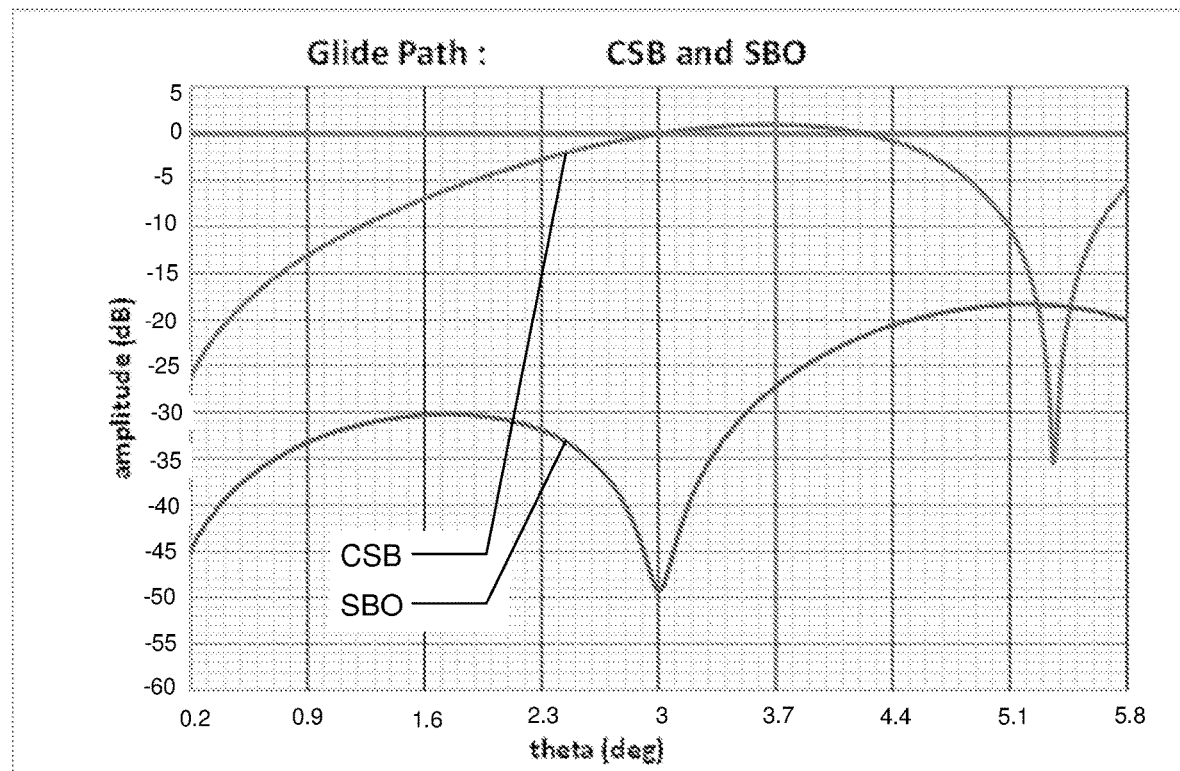
FIG. 17 illustrates a CSB and SBO power plot vs. elevation angle for a horizontal array, in accordance with some embodiments.
Figure 18:
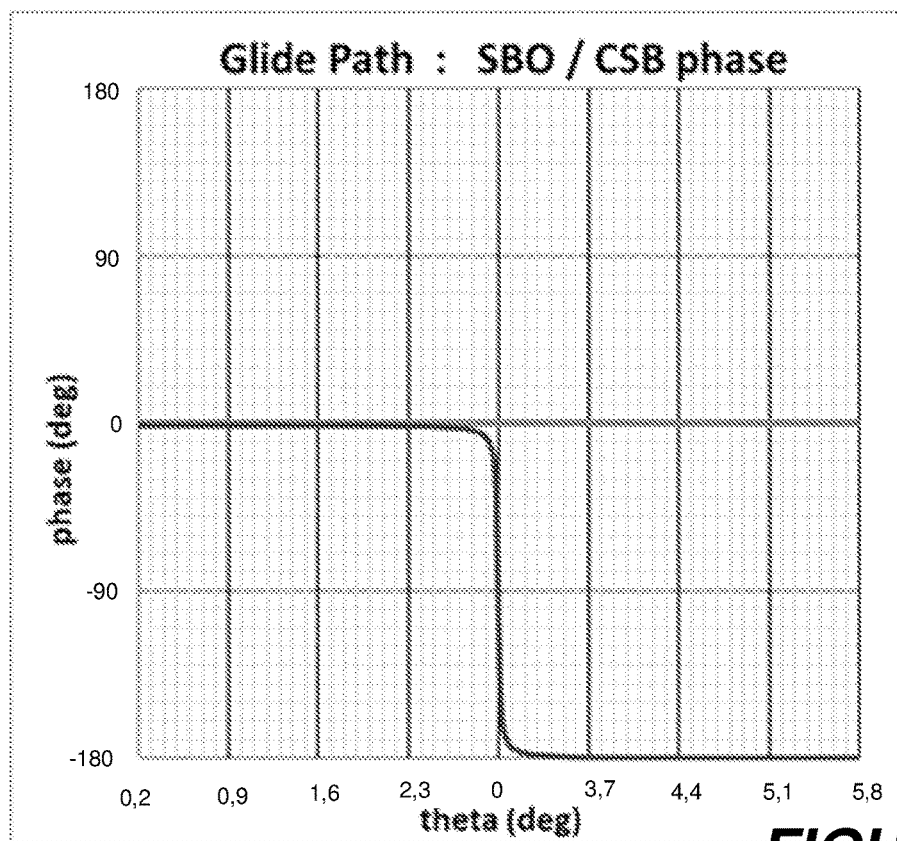
FIG. 18 illustrates a CSB and SBO phase vs. elevation angle, in accordance with some embodiments.

FIG. 17 shows the CSB and SBO power vs. elevation angle. Note the null in SBO at 3°. FIG. 18 shows CSB and SBO phase as a function of elevation angle. Note that SBO phase is −90° (in quadrature with CSB phase) at 3° elevation angle.

With the 4-element array SBO (carrier sideband only) signals drive the outer pair of antennas and CSB (carrier plus sideband) drives the inner pair. Further analysis showed the same DDM curve could be obtained if the inner pair were removed and the outer pair driven by both CSB and SBO. The resulting 2-element array is illustrated in FIG. 19.

Thus, in some embodiments, the plurality of antennas comprises a glide path array of antennas and a localizer array of antennas, and each antenna of the localizer array and each antenna of the localizer array is driven by a different one of the ARUs. Each of the ARUs can be software defined radios operative to generate a modulated radio frequency signal at a programmable carrier frequency and programmable configuration values. The programmable configuration values can include at least one of RF power, RF phase, modulation depths, and phases. The glide path array of antennas can include at least four antenna elements arranged spaced apart horizontally to provide at least a four element horizontal array. In some embodiments, the glide path array of antennas has 10 antenna elements arranged spaced apart horizontally to provide a 10 element horizontal array. When the glide path array of antennas has four element horizontal array, in a further embodiment the outer pair of antennas of the glide path array are driven with carrier sideband only (SBO) signals, and the inner pair of antennas of the glide path array are driven with carrier plus sideband (CSB) signals.

Figure 19:
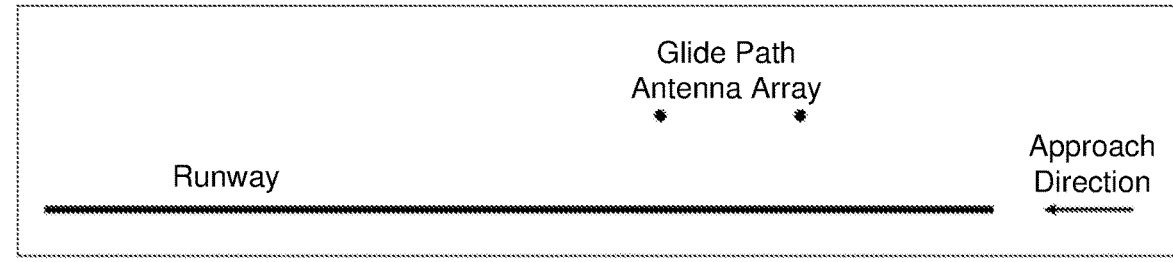
FIG. 19 illustrates a two-element horizontal glide path antenna array configuration, in accordance with some embodiments.

FIG. 19 illustrates an embodiment of a two-element horizontal glide path antenna array configuration. If one examines the DDM behavior over a range of azimuth angles with respect to the array axis, it becomes evident that the range over which a proper signal is produced may be too small for a practical glide path system. A linear glide path array, with 2, 4 or any number of antenna elements, produces a signal in space for which the glide path angle is constant on a conical surface surrounding the array axis.

Figure 20:
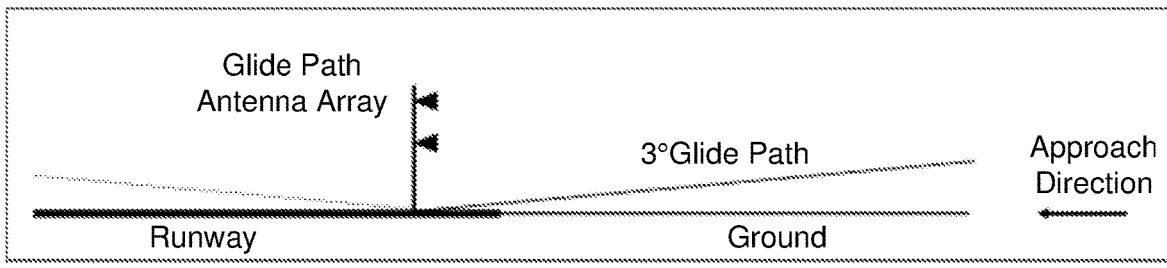
FIG. 20 illustrates a side view of an embodiment for a conventional null reference array with a cross-section of the cone, in accordance with some embodiments.

FIG. 20 illustrates a side view of an embodiment for a conventional null reference array with a cross-section of the cone. In some embodiments of this array the cone is very shallow and extends all the way around the antenna tower. A null reference imaging array has a theoretical 360° azimuth coverage, limited only by the azimuthal radiation pattern of the antenna elements.

Figure 21:
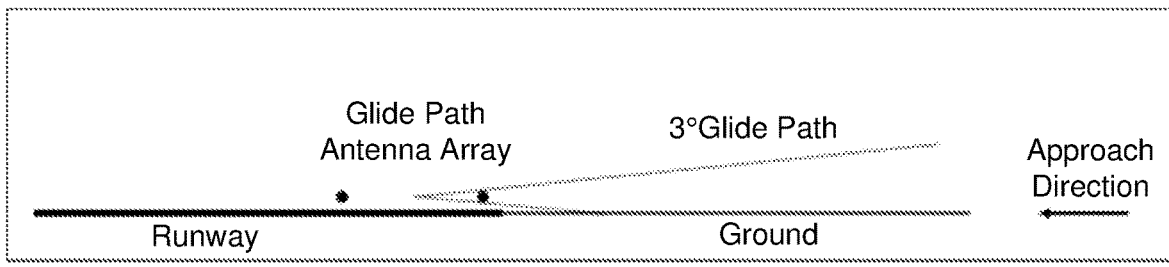
FIG. 21 illustrates a side view of a horizontal array glide path surface cross-section, in accordance with some embodiments.
Figure 22:
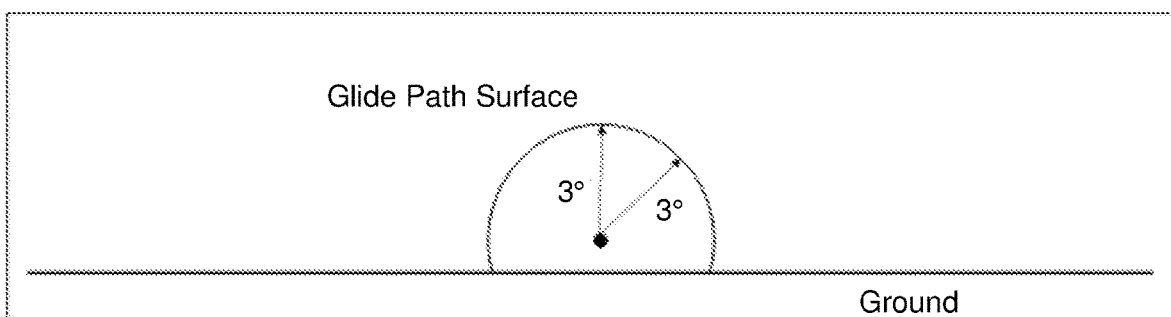
FIG. 22 illustrates a cross-section of the cone when viewed from an aircraft on the approach path, in accordance with some embodiments.

FIG. 21 illustrates a side view of an embodiment of a horizontal array. In this case the glide path surface is a very deep cone. And covers a small azimuth angle range. FIG. 22 illustrates an embodiment of a cross-section of the cone when viewed from an aircraft on the approach path.

In some embodiments, the glide path cross-section is an arc with a radius of 3° surrounding the array axis. It is noted that the radius is in units of degrees, not linear distance. FIG. 22 could also be interpreted as showing distance to the glide path surface at a given distance along the runway centerline from the antenna array. An aircraft directly above the extended array axis will see zero DDM when on a glide path of 3°. However, an aircraft at 3° elevation to the right or left of the array axis will see an erroneous negative DDM (fly-down). If the aircraft is 3° to the side of the runway centerline it will see a severe fly-down indication, equivalent to being 3° above the glide path.

Figure 23:
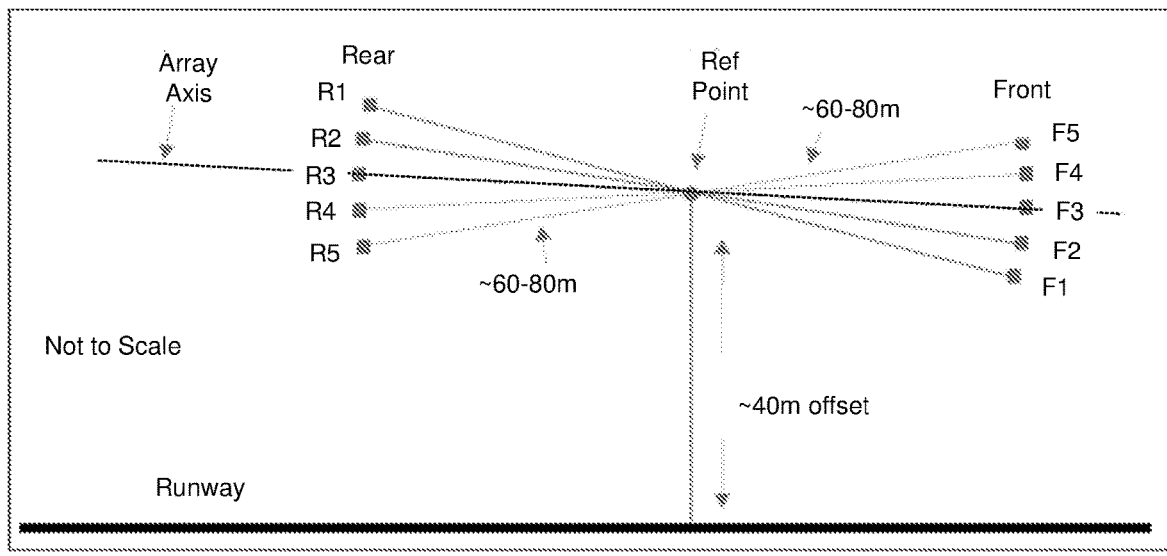
FIG. 23 illustrates a ten-element horizontal glide path antenna array configuration, in accordance with some embodiments.

A way to broaden azimuth coverage is to add antennas on both sides of the array axis. For example, FIG. 23 illustrates an embodiment of a ten-element horizontal glide path antenna array configuration.

This array comprises 5 pairs of antennas, with a central pair aligned with the array axis (not necessarily parallel to the runway), 2 pairs aligned approximately 2.25° either side of the array axis, and 2 pairs aligned approximately 5° either side of the axis. This results in 2 arcs of antennas spaced 120 m to 160 m apart. The precise separation distance has been determined to not be critical. Closer spacing of the two antenna arcs allows more precise phase synchronization among ARUs but increases sensitivity of the signal in space to antenna position errors. The optimum spacing has not yet been determined, but we expect it to be at the lower end of this range. Spacing is not a function of glide path angle or carrier frequency. The spacing can be the same for all installations.

In one embodiment, the 10 element horizontal array includes 5 pairs of antennas with a central pair aligned with an array axis, with 2 pairs of antennas aligned about 2.25° on opposite sides of the array axis, and with 2 pairs aligned approximately 5° on opposite sides of the array axis, wherein antennas of each pair are spaced apart between about 120 meters to about 160 meters.

Figure 24:
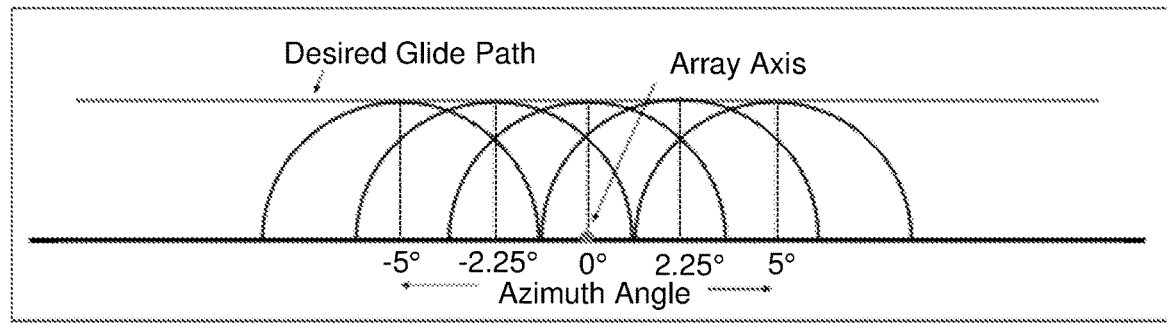
FIG. 24 illustrates cross-sections of an individual pair's glide path, in accordance with some embodiments.

Cross-sections of the individual antenna pairs' glide path surfaces are illustrated in FIG. 24. FIG. 24 illustrates an embodiment of an individual pair glide path cross-section. The radiated signals from the 5 pairs combine in a complex way, not a simple addition of power. If the CSB and SBO powers and phases for each antenna are properly chosen, a nearly flat glide path angle over an azimuth range of ±6° can be obtained.

Figure 25:
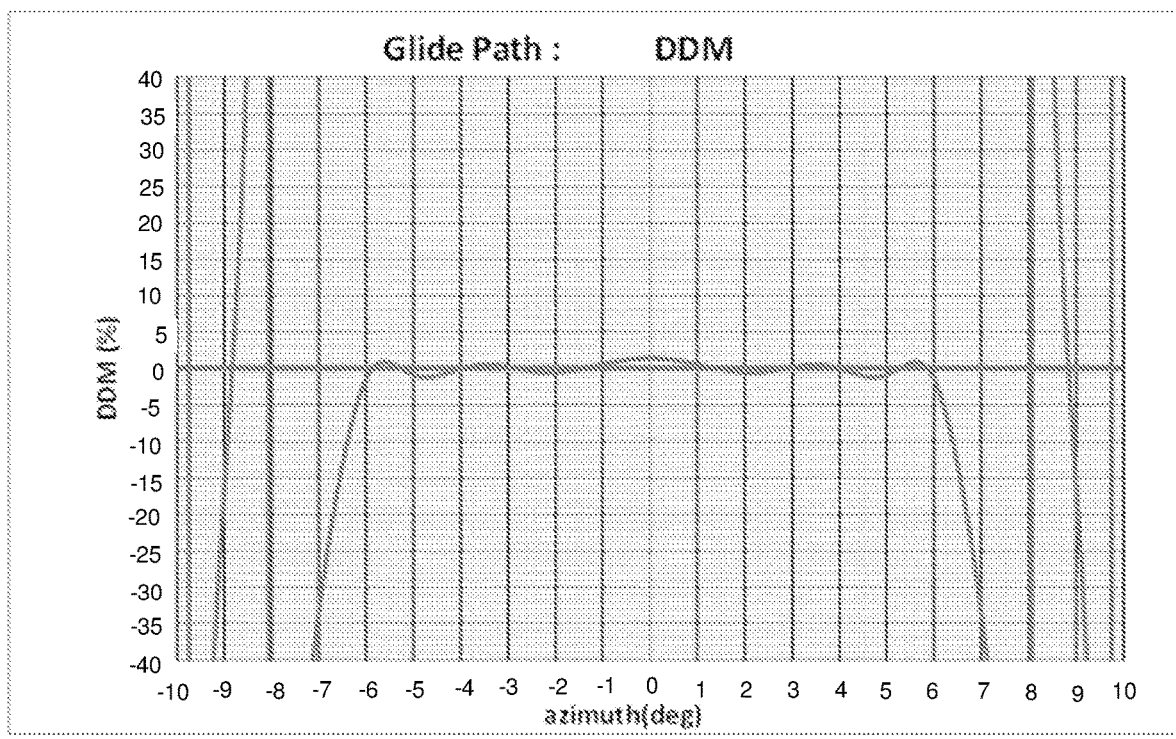
FIG. 25 illustrates a DDM at 3° elevation angle as a function of azimuth angle for an array, in accordance with some embodiments.

FIG. 25 illustrates an embodiment of a DDM at 3° elevation angle as a function of azimuth angle for this array. This indicates the glide path angle is very near 3° over an azimuth range of ±6° and lowers rapidly outside that range.

In one embodiment, the ARUs operate to drive the antennas using CSB and SBO powers and phases for each antenna that are controlled to provide a nearly flat glide path angle over an azimuth range of ±6°.

Figure 26:
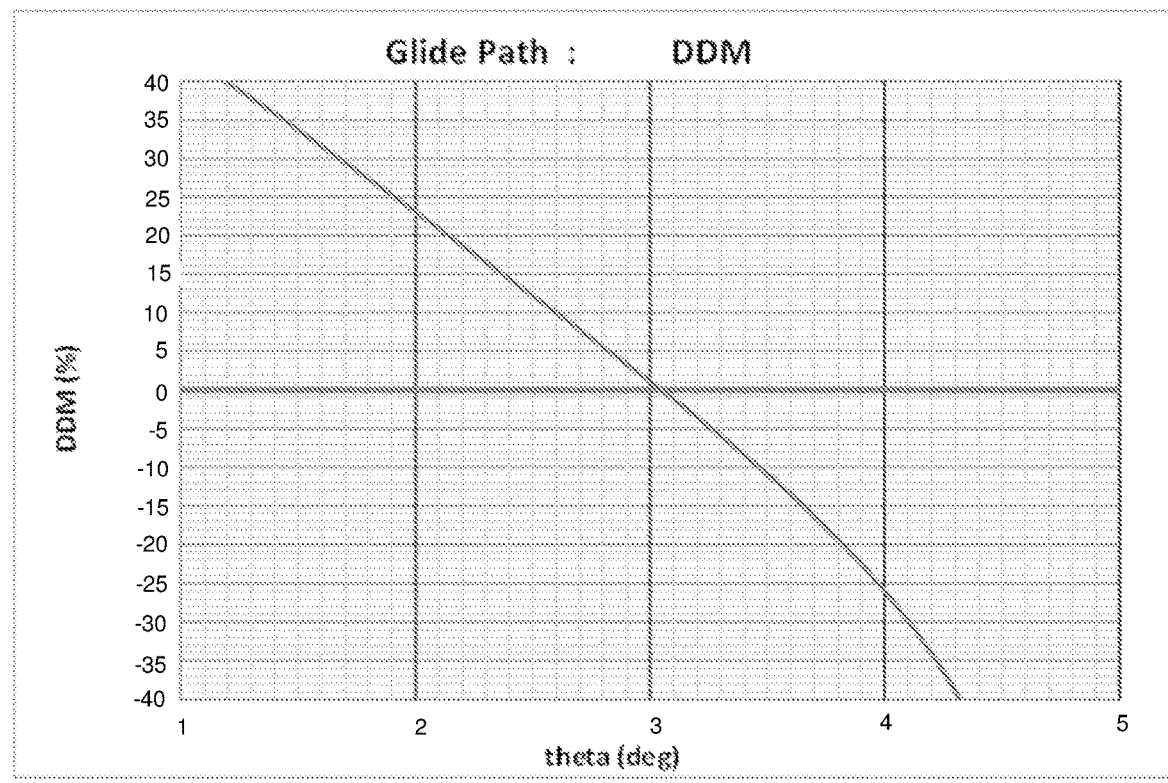
FIG. 26 illustrates a ten-element horizontal glide path array DDM vs. elevation angle, in accordance with some embodiments.

FIG. 26 illustrates an embodiment of a ten-element horizontal glide path array DDM vs. elevation angle. The DDM curves over elevation and azimuth for this array are suitable for a Category I glide path system, with one exception. The sharp decrease in DDM (i.e. in the fly-down direction) at azimuth angles outside ±6° may be unacceptable for safety reasons. A safer solution is to make the DDM curve indicate fly-up at azimuth angles outside the coverage range. This can be accomplished by adding a suitable clearance signal.

The clearance signal (CLR) is a separate carrier signal, offset 5 kHz in frequency, that is modulated with a fixed prevalence of 150 Hz only with respect to 90 Hz, which produces a pure fixed positive (i.e. fly-up) DDM signal. The radiation pattern of the clearance signal is shaped such that its power is less than that of the path CSB signal for azimuth angles inside ±6° and greater than the path CSB signal for azimuth angle outside that range. The aircraft glide path receiver, through the "capture effect" will lock on to either the path signal or clearance signal, whichever is greater, resulting in a combined DDM curve that has fly-up tails outside the azimuth coverage range.

Thus, in one embodiment the ARUs operate to drive the antennas with clearance signal (CLR) that is a separate carrier signal, offset 5 kHz in frequency that is modulated with 150 Hz only, which produces a pure fly-up signal, and where the central unit operates to individually adjust the CLR of each of the ARUs. The radiation pattern of the clearance signal (CLR) can be shaped under control of the central unit so the CLR power is less than that of glide path course signal transmitted by the antennas of the glide path array for azimuth angles inside±6° and greater than the glide path course signal for azimuth angle outside that range.

Figure 27:
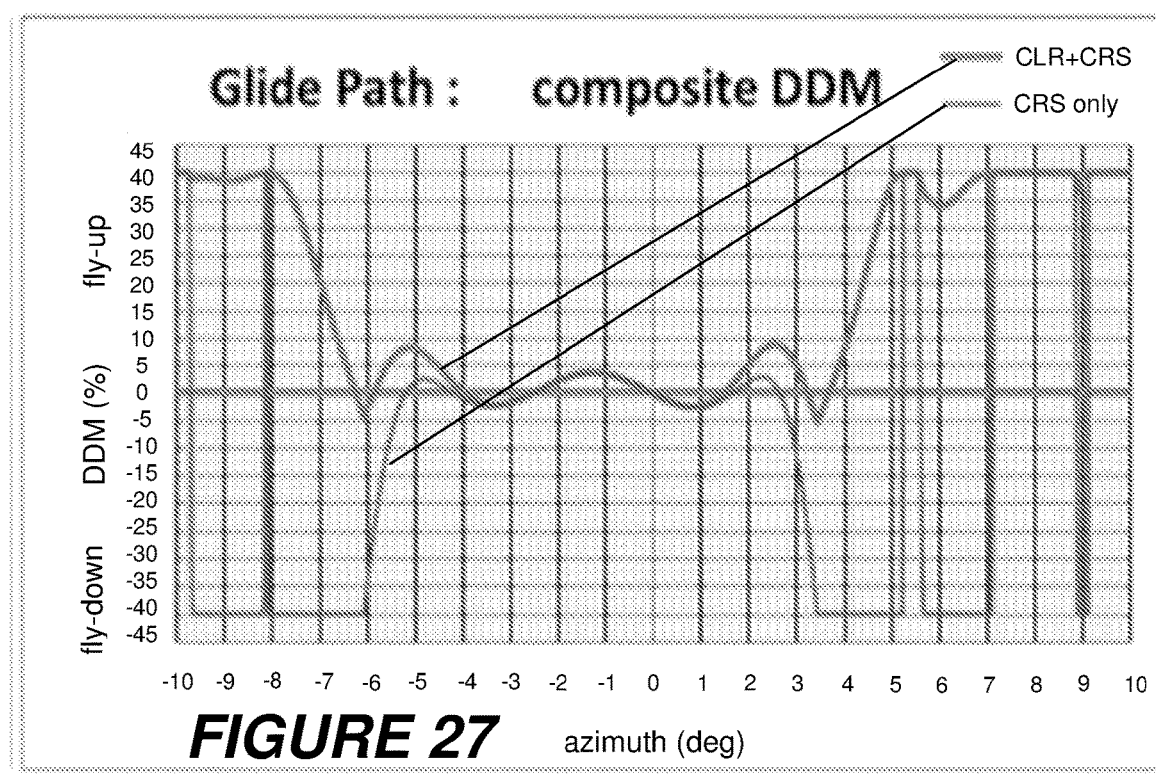
FIG. 27 illustrates a DDM with clearance vs. azimuth angle, in accordance with some embodiments.

One option for transmitting the clearance signal would be to use a separate antenna array, but in order to minimize the number of antennas the 5 antennas in the front portion of the existing array may be used. FIG. 27 illustrates an embodiment of a DDM with clearance vs. azimuth angle. Azimuth degrees are reference to the extended runway centerline in this plot, with the glide path array offset, so the pattern is not symmetrical.

The front path antennas are not spaced ideally for producing the clearance pattern, so some compromises in the DDM pattern were necessary. Both the path and clearance signal parameters, as well as antenna spacing, must be adjusted to obtain a reasonable composite DDM azimuth curve, in some embodiments. Note that the azimuth coverage range is somewhat reduced compared to the range without clearance, and the DDM variation inside the coverage range is somewhat greater. The optimization of the combined path/clearance signal to produce maximum azimuth range with maximum flatness within the azimuth range is ongoing.

Figure 28:
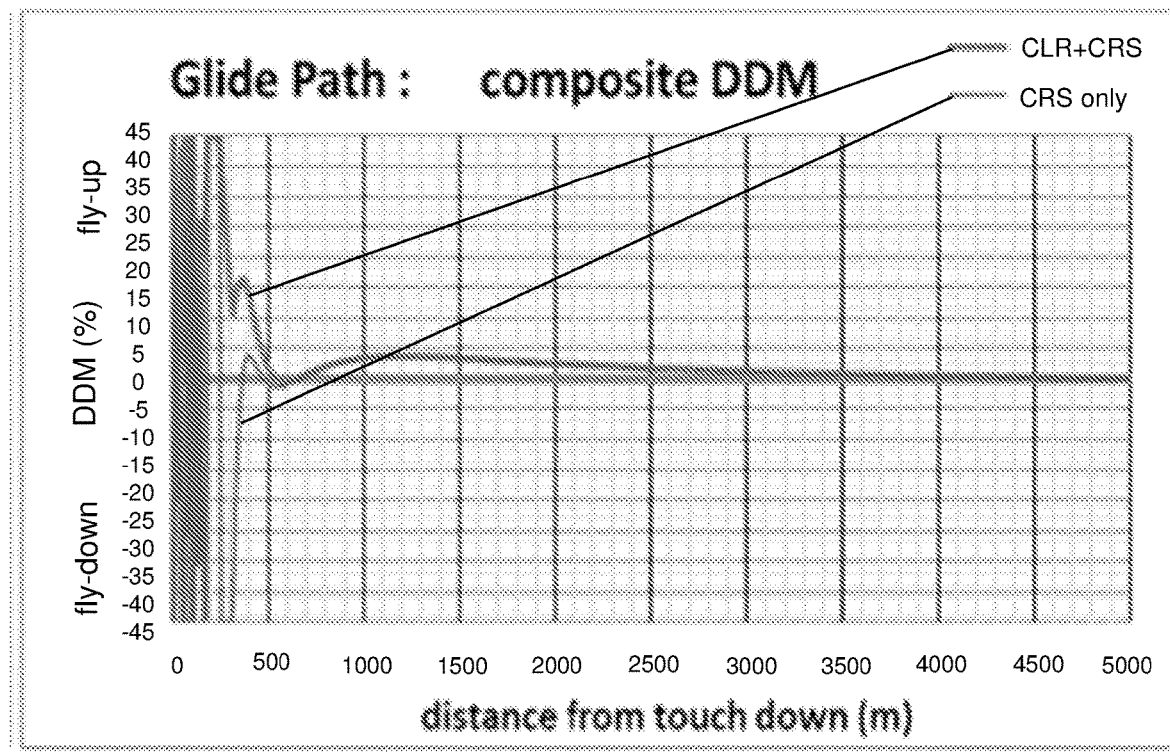
FIG. 28 illustrates a DDM with clearance vs. distance from touchdown, in accordance with some embodiments.

FIG. 28 illustrates a graph of DDM with clearance vs. distance from touchdown. The graph is based on an aircraft on runway centerline with an offset glide path array. Note that with the clearance signal present the DDM moves in the fly-up direction within 500 meters of the touchdown point. This is well past the Category I decision height, so has no effect on normal operation. However, it covers the fly-down characteristic at about 400 meters of the DDM without clearance, which would be a potential hazard.

Figure 29:
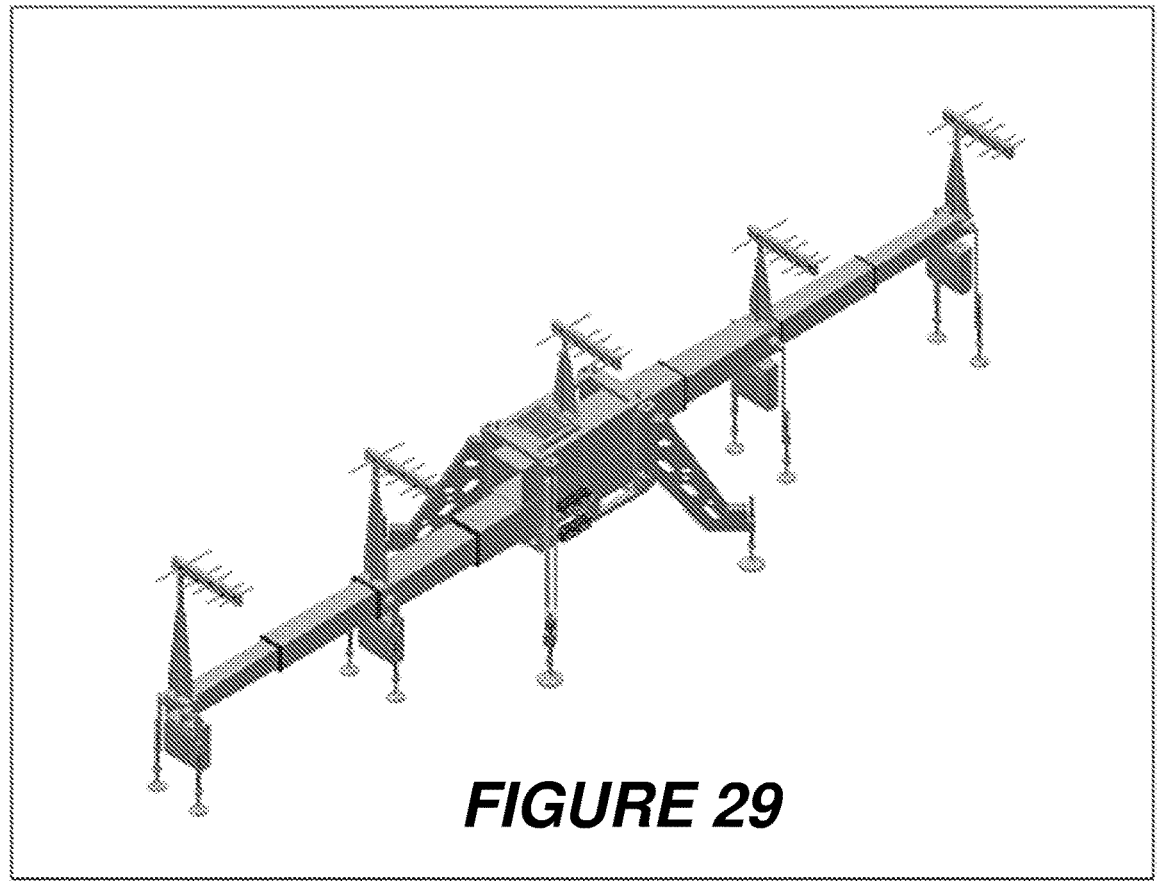
FIG. 29 illustrates a horizontal array mounting structure, in accordance with some embodiments.

The physical implementation of the horizontal array slightly alters the arrangement shown in FIG. 23 such that the arcs are replaced by a linear row of antennas. Simulations show that this configuration can produce a signal in space equivalent to that of the arcs. Making the front and rear subarrays linear enables the antennas on a subarray to be mounted on a single, telescoping structure, as shown in FIG. 29. FIG. 29 illustrates a horizontal array mounting structure in accordance with one embodiment. The structure is shown with LDP antennas.

Vertical Non-Imaging Array.

Figure 30:
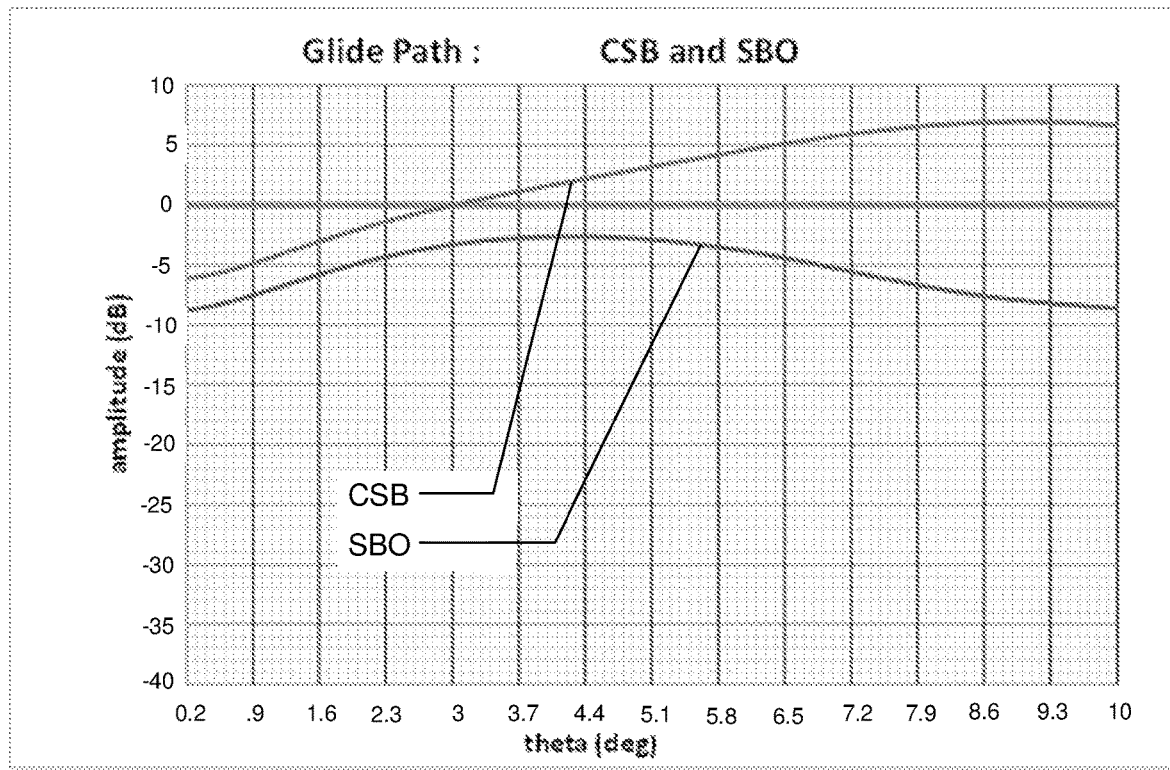
FIG. 30 illustrates a CSB and SBO power plotted vs. elevation angle for a vertical imageless array, in accordance with some embodiments.

An alternative to the horizontal glide path array is a vertical non-imaging array. Our approach for this development was a departure from the usual methodology of placing an SBO null at the desired glide path elevation angle. Instead, zero DDM at the glide path angle was produced by adjusting phases to make the cosine function zero at the glide path angle (i.e. SBO in quadrature with respect to CSB), and this was the approach taken for the non-imaging vertical array. FIG. 30 shows the CSB and SBO power plotted vs. elevation angle for the vertical imageless array. Compare to FIG. 17 for a horizontal array.

Figure 31:
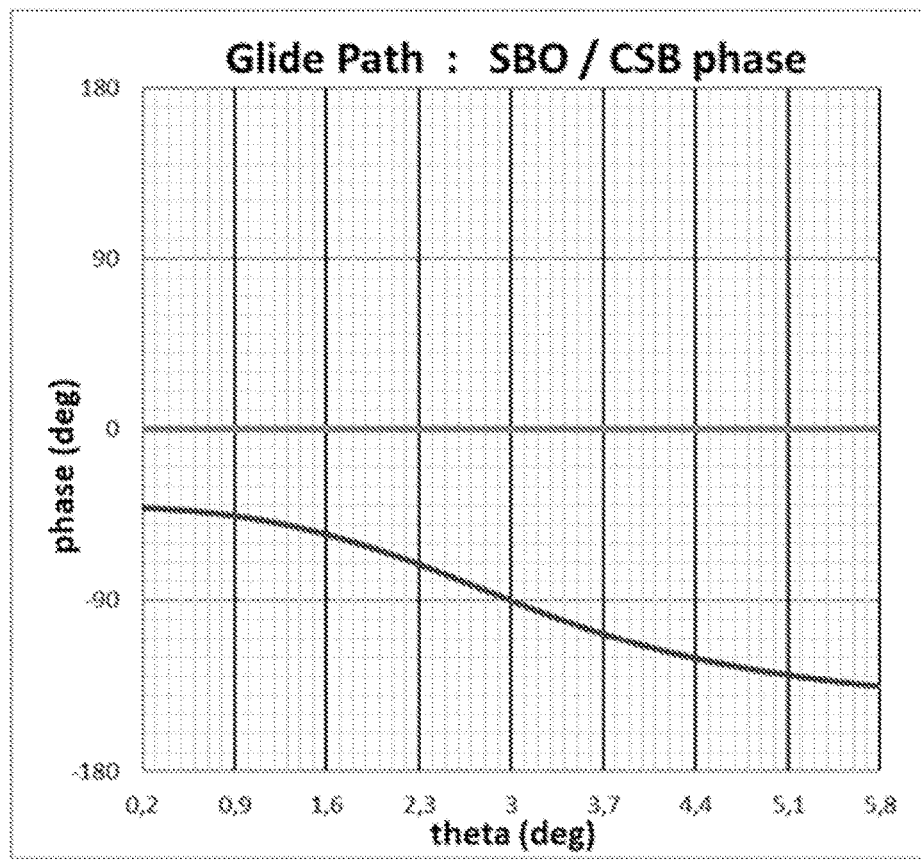
FIG. 31 illustrates a CSB and SBO phase plotted vs. elevation angle for a vertical imageless array, in accordance with some embodiments.

FIG. 31 shows the CSB and SBO phase plotted vs. elevation angle for the vertical imageless array. Compare to FIG. 18 for a horizontal array. Note that for both the horizontal and vertical arrays SBO phase is in quadrature with CSB at the glide path angle.

Figure 32:
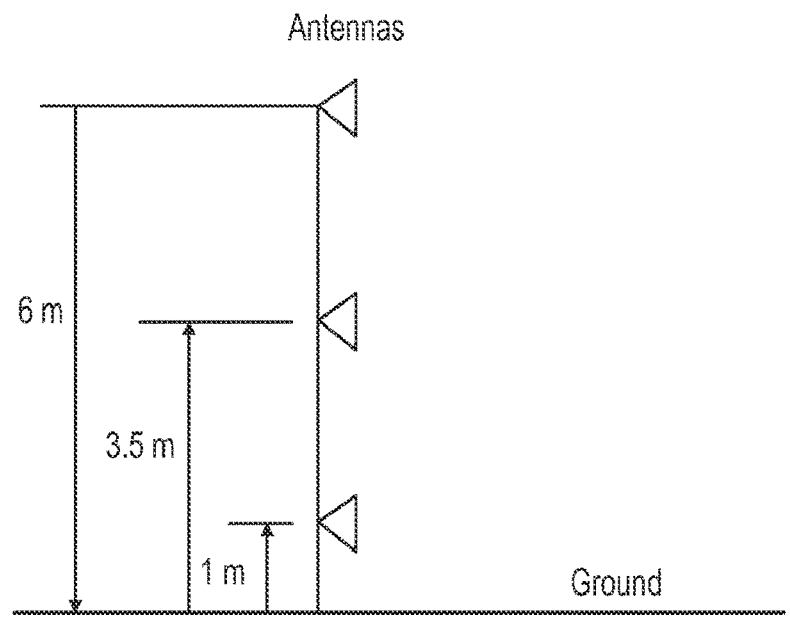
FIG. 32 illustrates a non-imaging vertical glide path array configuration, in accordance with some embodiments.

The vertical array, as shown in FIG. 32, includes of 3 antennas mounted on a mast, spaced at heights of 1 m, 3.5 m, and 6 m, in accordance with some embodiments. The center antenna must be mounted halfway between the top and bottom antennas in order to produce a proper glide path signal. The overall spacing was chosen as a trade-off between the need for a relatively short antenna mast (per packaging and setup time requirements) and sensitivity of the signal in space to antenna position tolerances. Placing the bottom antenna lower than 1 m results in undesirable near-field effects.

Although the vertical array resembles a Type M conventional glide path imaging array, it is completely different, being shorter, producing a signal in space without imaging and using the technique that sets a quadrature phase difference between CSB and SBO on the glide path.

Figure 33:
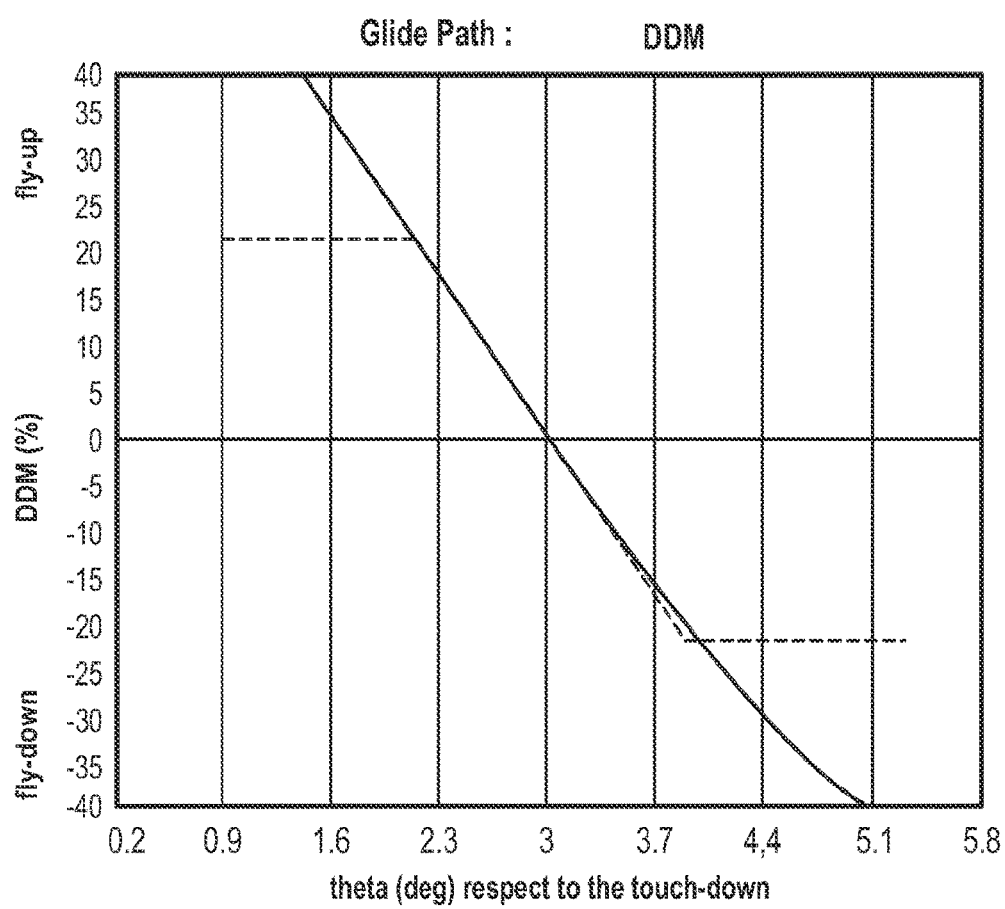
FIG. 33 illustrates a non-imaging vertical glide path array DDM vs. elevation angle, in accordance with some embodiments.
Figure 34:
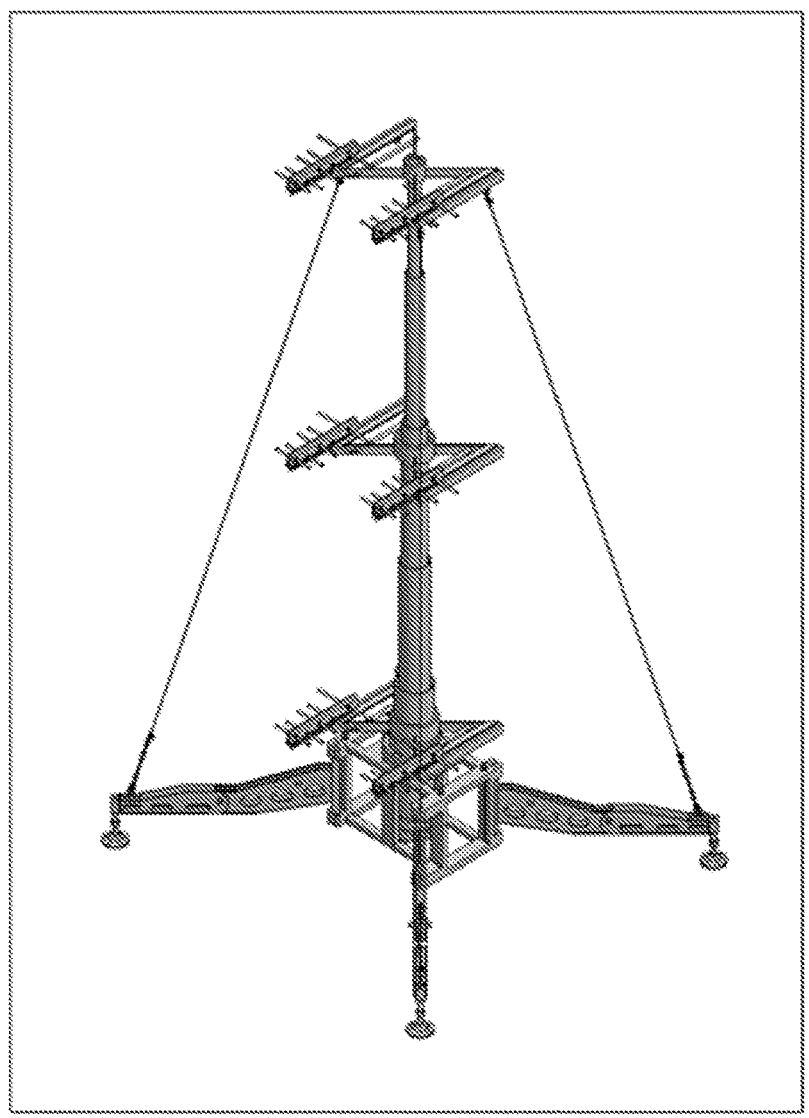
FIG. 34 illustrates a vertical array mounting structure, in accordance with some embodiments.

FIG. 33 illustrates an embodiment of a non-imaging vertical glide path array DDM vs. elevation angle. The dashed line indicates ICAO Annex 10 limits on DDM. Note that DDM is zero at 3° elevation although the SBO amplitude in FIG. 27 does not have a null at that point. The physical implementation of the vertical array is shown in FIG. 34. More specifically, FIG. 34 illustrates a vertical array mounting structure in accordance with some embodiments. The mast telescopes for compact packaging and quick setup and is secured with guy wires for rigidity in high winds. It is shown with dualized LPD antennas. The need for doubling antennas in some embodiments is explained herein below with regards to the Power Budget.

An embodiment of the localizer is described below.

The localizer antenna array may be based on a standard 8-element, single frequency (i.e. no clearance signal) array configuration, which is in use for Category I approaches all over the world. For some embodiments the normal LPD antenna elements are being replaced with dual dipole elements, which are significantly smaller and lighter than the LPDs. The dual dipole elements can measure 0.68 m by 1.36 m, with a gain of 4.9 dBi (plus array factor) according to one embodiment. The dual dipoles are slightly less directive than the LPDs; this has a small but insignificant effect on the DDM pattern, and also slightly increases the transmitter power requirement. The antenna mounting system has been modified to enable it to be packed into a smaller volume and erected more quickly.

Figure 35:
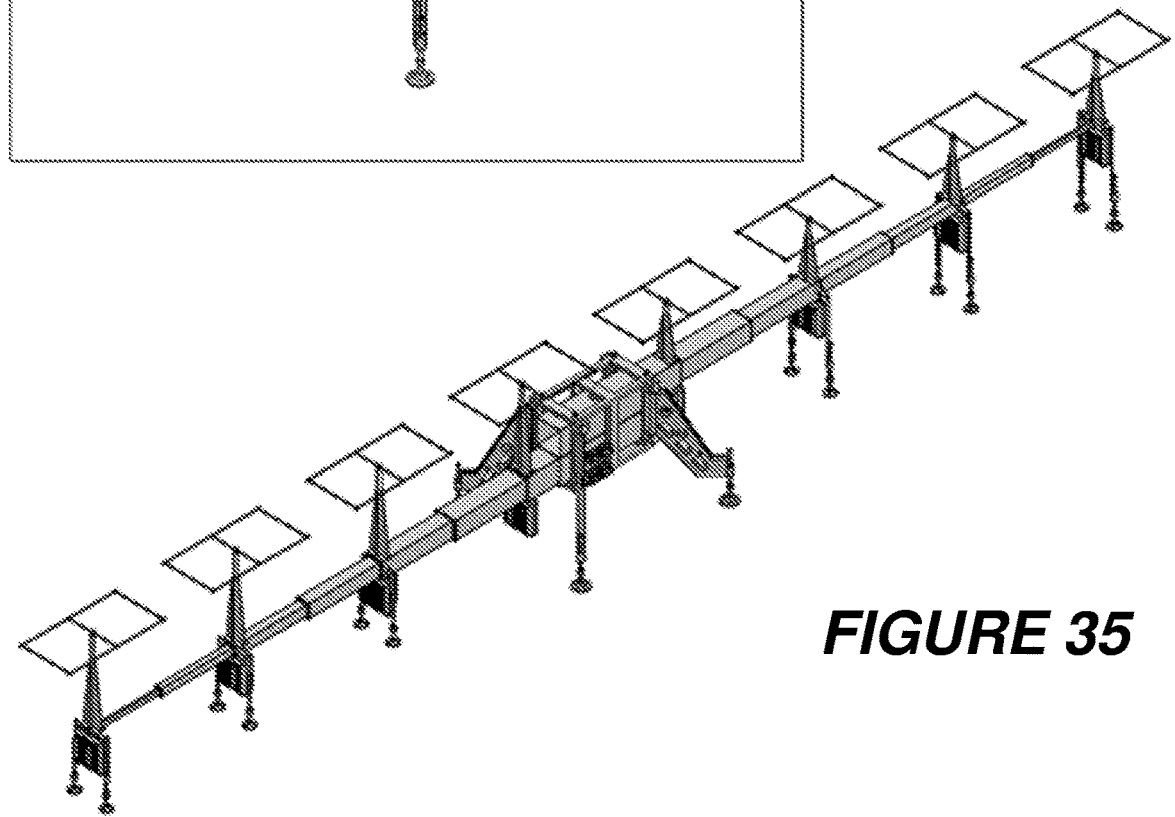
FIG. 35 illustrates a localizer array antenna with elements and support structure, in accordance with some embodiments.

FIG. 35 shows a mechanical design for the localizer array antenna elements and support structure in accordance with some embodiments. The support structure telescopes into a compact unit for shipment. The antenna elements are dual dipoles. The three connecting rods between the dipoles are nonconducting elements used to provide mechanical rigidity. The dual dipole antennas are slightly less directive than the LPD antennas.

An 8-element array may be selected as the result of a trade-off. Localizer arrays in common use range in size from 8 elements up to 32 elements. The more elements, the wider the array aperture, and the wider the aperture the narrower the localizer beam. Narrow-beam localizers are less susceptible to signal degradation from multi-path reflections off structures to the side of the approach path. In these embodiments, the wider beam may be preferred because of the 8-element array's relatively small size and because the ILS only needs to support Category I approaches.

The localizer signal is formed analogously to the glide path signal, except with a different modulation level and designed to produce zero DDM at an azimuth angle of zero, per the following equation:

$$DDM(\%) = 40 * \frac{|\vec{V}_{SBO}|}{|\vec{V}_{CSB}|} \cos\left[\psi(\vec{V}_{CSB}) - \psi(\vec{V}_{SBO})\right]$$

Figure 36:
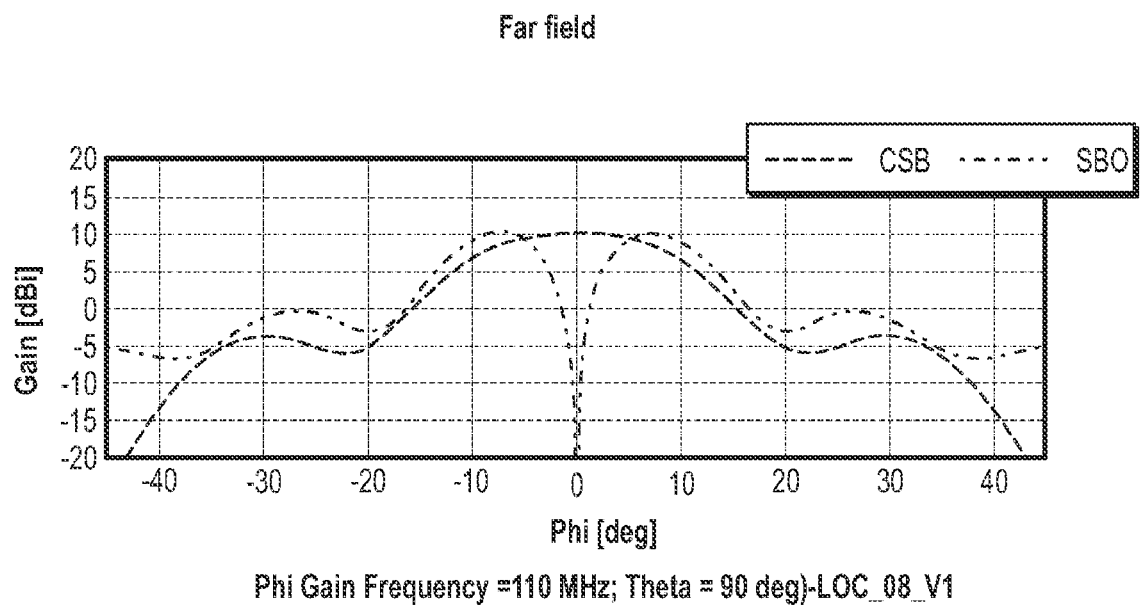
FIG. 36 illustrates a localizer CSB and SBO gain vs. azimuth angle, in accordance with some embodiments.
Figure 37:
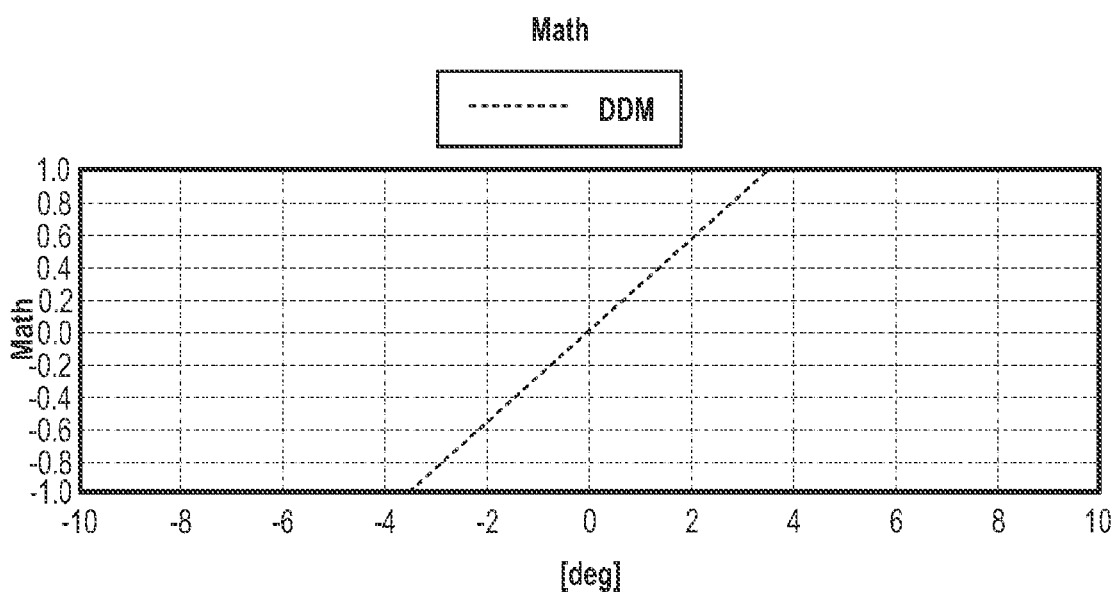
FIG. 37 illustrates a localizer DDM vs. azimuth angle, in accordance with some embodiments.

FIGS. 36 and 37 show the CSB/SBO power vs. azimuth angle and DDM vs. azimuth angle. These plots were produced by FEKO simulations.

Error and/or error sensitivity for some embodiments described above are now described.

The plots illustrated in the figures above may be from simulations of "theoretically perfect" systems. However, there are a number of error sources inherent in real systems, so simulations may be run to estimate the effects of known errors on the signal in space. The error sources identified are essentially random, and their magnitude varies in time. Each error source may be assumed to have a long-term component (i.e. a component that does not change significantly during the few minutes of an approach) and a short-term component that does vary significantly during an approach.

There may be different limits for long- and short-term variation in the signal in space glide path angle. ICAO Annex 10 and the Natural Disasters section of FAA Order 8200.1 have "adjust and maintain" limits on glide path angle, which is a long-term requirement. Short-term variation in the glide path angle, typically caused by multipath reflections in conventional imaging glide path systems, is referred to as "structure" or "bends" and also has Annex 10 and 8200.1 limits. Annex 10 limits bends in units of DDM with a 95% probability. 8200.1 uses units of microamperes (μA), which refers to the aircraft receiver output that is proportional to DDM.

Table 2 summarizes the long- and short-term glide path error limits in the two requirements documents. All limits in Table 2 have been converted to units of degrees. Note that the 8200.1 limits are somewhat looser; it may be assumed that these are the applicable limits for this program. Table 2 shows Annex 10 and 8200.1 glide path error limits.

TABLE 2

| Glide Path Error Limits | | |
|---|---|---|
| Requirement Source | Adjust and Maintain Limits (long-term) | Structure Limits (short-term) |
| ICAO Annex 10 | ±0.225° | ±0.14° |
| FAA Order 8200.1 | ±0.5° | ±0.21° |

Error sources analyzed may include:
Antenna position errors. These errors include installation tolerances as well dynamic movement of antenna elements in strong winds. The errors only include longitudinal position errors. Simulations have shown much less sensitivity to lateral and height position errors.
Transmitter power variation. These are primarily long-term (i.e. over time scales longer than a single approach) effects from temperature and aging.
Transmitter phase variation. A phase shift common to all signals at all antennas has no effect, but because each antenna is driven by a separate transmitter, the transmitters must be synchronized within a tolerance of 10 picoseconds. This tolerance results in a small amount of long- and short-term phase difference between antennas.

Monte Carlo simulations were run to determine the effect on glide path angle by errors in antenna position, amplitude and phase. Thirty simulations were run for each error source individually, and a further set of simulations was run with all error sources in place. Errors were simulated as random values with a uniform probability distribution over a given range. The plots referenced below for Monte Carlo simulation results show glide path elevation angle after application of an error on the vertical axis, and sample number on the horizontal axis. Each dot represents the results of one simulation with a random error. Some of the plots show a slight bias in the glide path angle data. This is the result of the array being analyzed having a slight (a few hundredths of a degree) glide path angle offset and is not a consequence of the sensitivity errors.

Some horizontal glide path array sensitivities are discussed below.

Some long-term errors may include:
Antenna Position: Position in the longitudinal direction (parallel to runway) was varied±5 mm. This was assumed to be the installation tolerance, after tuning corrections. A procedure is described further below for tuning out initial longitudinal errors between the two subarrays of up to 20 cm.
Power Variation: Power to each antenna was varied individually by ±0.2 dB. CSB and SBO power were assumed to be correlated, so were varied by the same amount.
Phase Variation: Phase to each antenna was varied individually by ±2°. CSB and SBO phase were assumed to be correlated, so were varied by the same amount.

Figure 38:
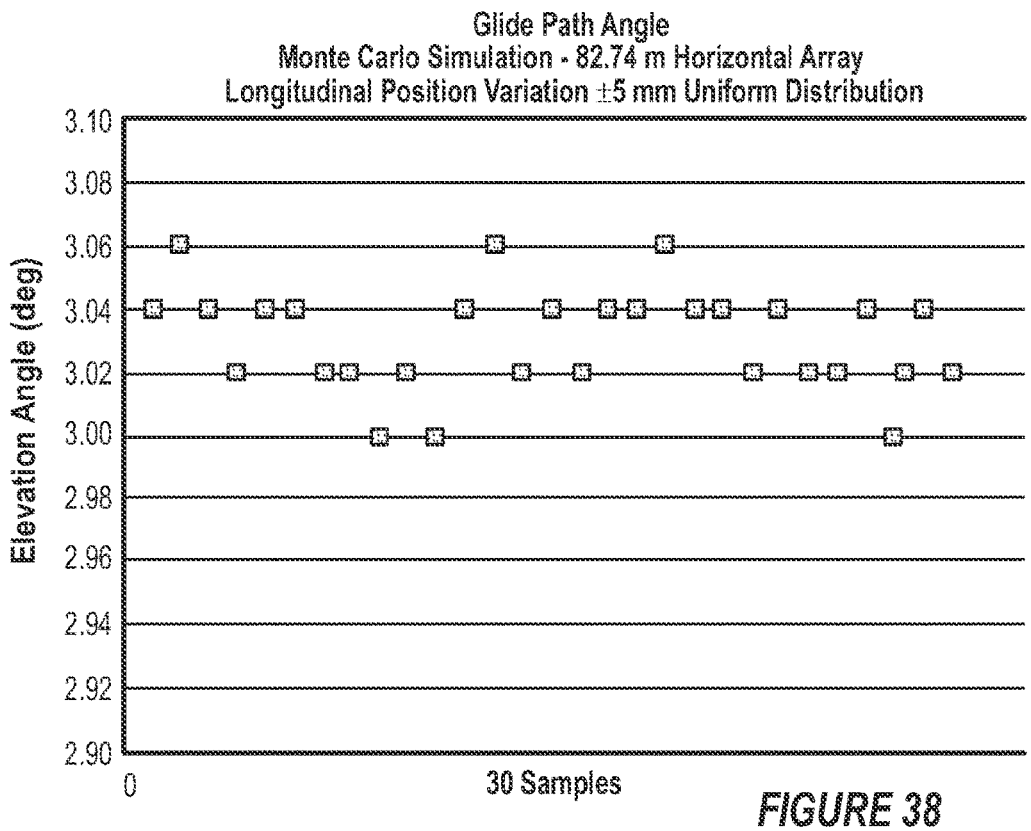
FIG. 38 illustrates horizontal array long-term antenna position error effects, in accordance with some embodiments.
Figure 39:
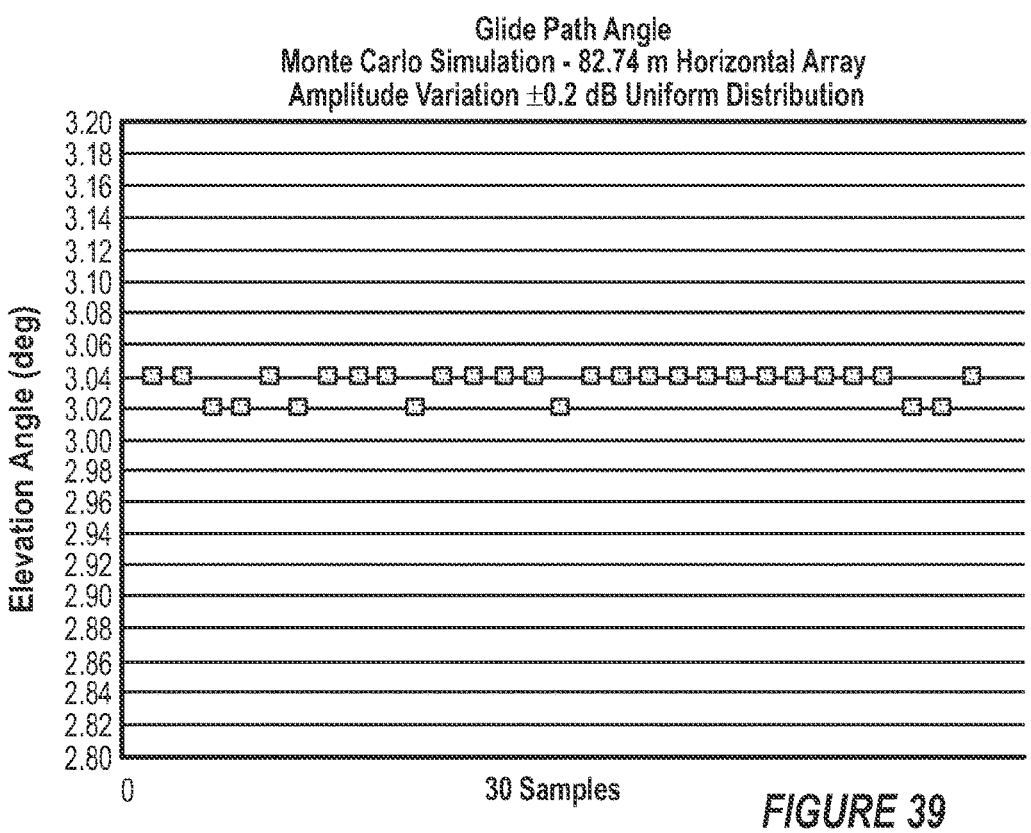
FIG. 39 illustrates horizontal array long-term amplitude error effects, in accordance with some embodiments.
Figure 40:
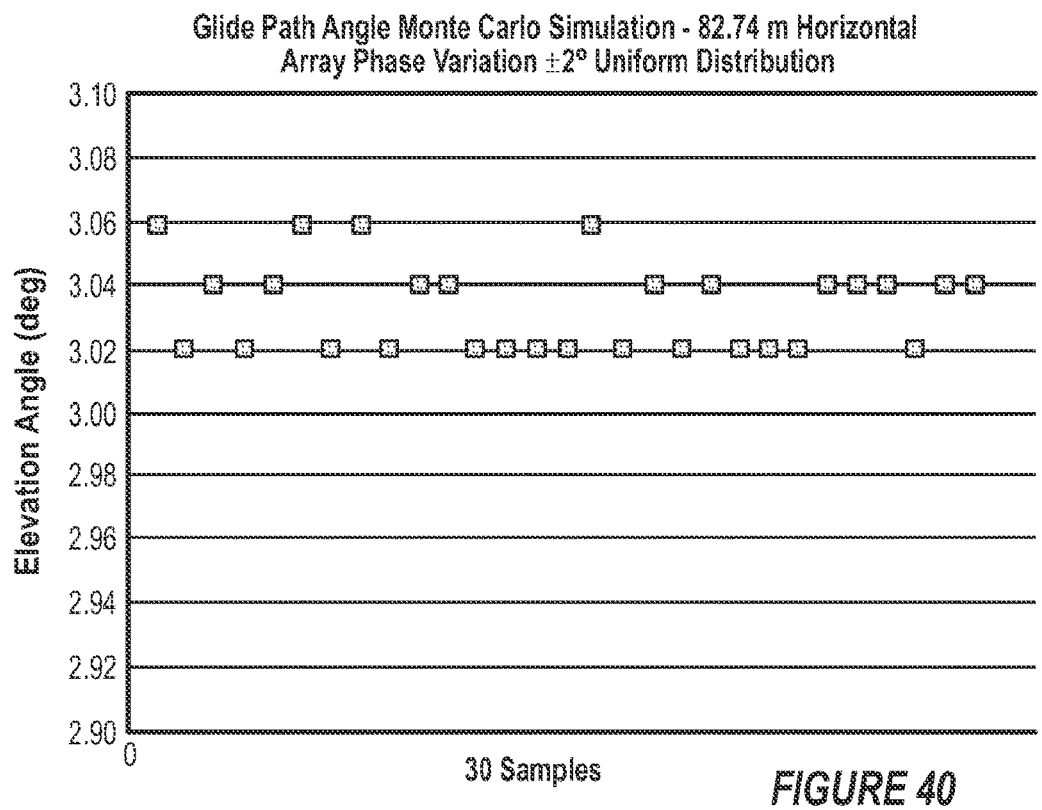
FIG. 40 illustrates horizontal array long-term phase error effects, in accordance with some embodiments.
Figure 41:
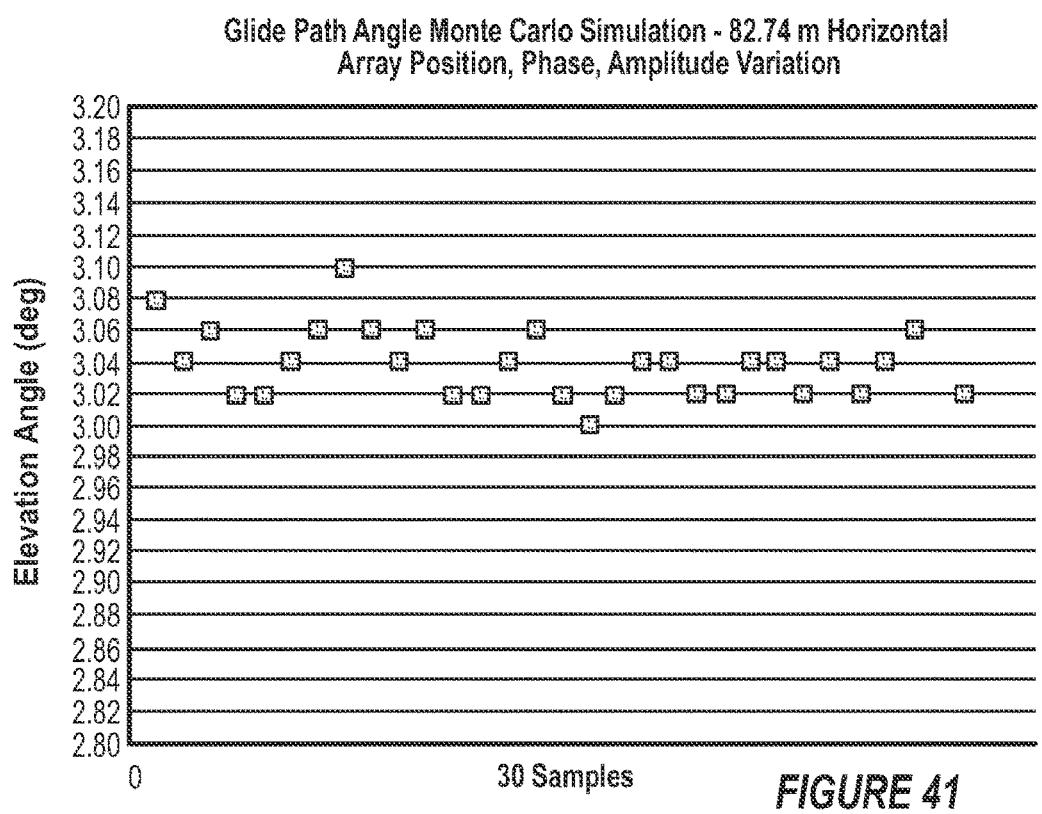
FIG. 41 illustrates horizontal array combined long-term error effects, in accordance with some embodiments.

FIG. 38 illustrates horizontal array long-term antenna position error effects, according to some embodiments. FIG. 39 illustrates horizontal array long-term amplitude error effects, according to some embodiments. FIG. 40 illustrates horizontal array long-term phase error effects, according to some embodiments. FIG. 41 illustrates a horizontal array combined long-term error effects, according to some embodiments.

Sensitivity to Short-Term Effects.
Some short-term errors may include:
Antenna Position: Position in the longitudinal direction (parallel to runway) was varied±5 mm. This was assumed to be the dynamic variation from wind.
Power Variation: Power to each antenna was varied individually±0.1 dB. CSB and SBO power were assumed to be correlated, so were varied by the same amount.
Phase Variation: Phase to each antenna was varied individually±1°. CSB and SBO phase were assumed to be correlated, so were varied by the same amount.

Figure 42:
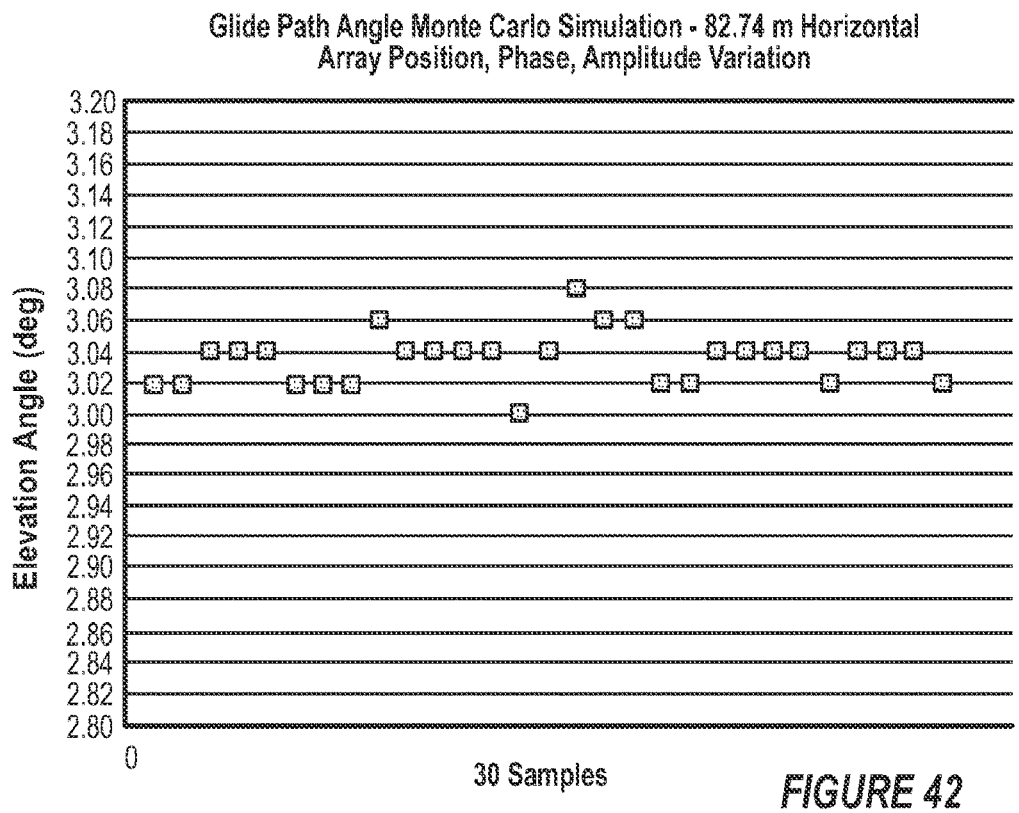
FIG. 42 illustrates horizontal array combined short-term error effects, in accordance with some embodiments.

FIG. 42 shows the short-term Monte Carlo results for a horizontal array with combined short-term error effects. It shows slightly less variation in glide path angle compared to the long-term results.

Some vertical glide path array sensitivities are discussed below.

Some long-term errors may include:
Antenna Position: Position in the longitudinal direction (parallel to runway) was varied±5 mm. This was assumed to be the installation tolerance, after tuning corrections.
Power Variation: Power to each antenna was varied individually±0.2 dB. CSB and SBO power were assumed to be correlated, so were varied by the same amount.

Phase Variation: Phase to each antenna was varied individually±2°. CSB and SBO phase were assumed to be correlated, so were varied by the same amount.

Figure 43:
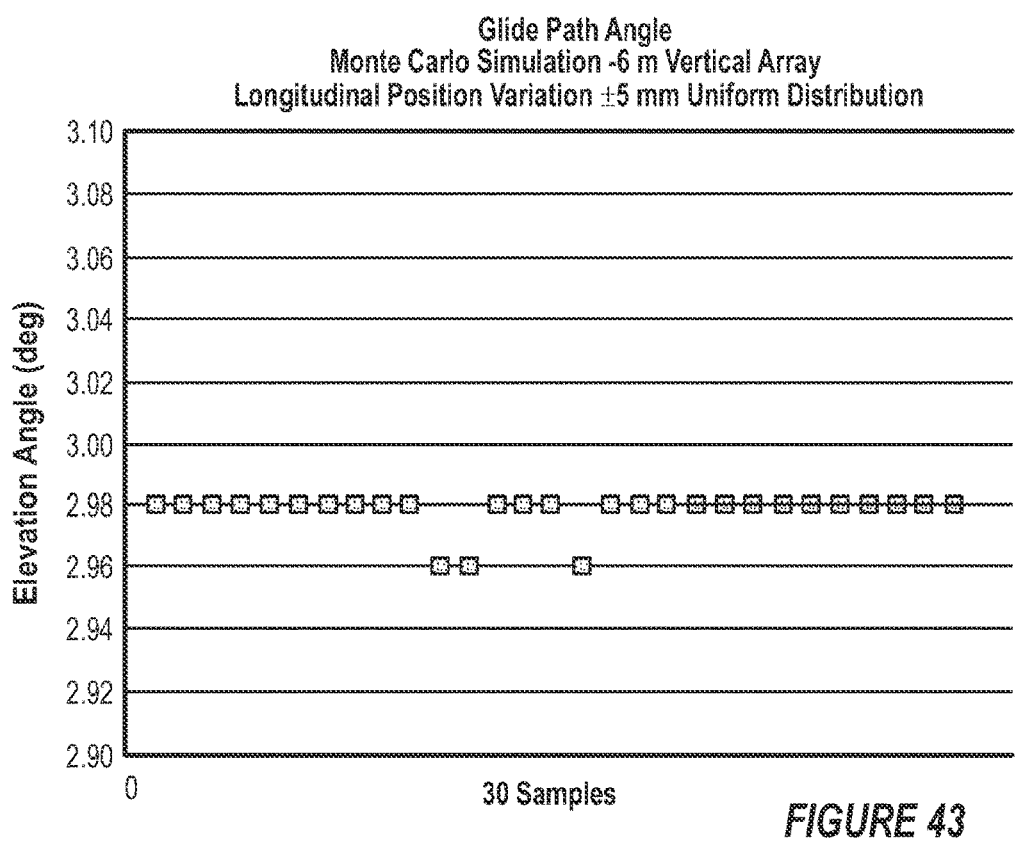
FIG. 43 illustrates vertical array antenna long-term position error effects, in accordance with some embodiments.
Figure 44:
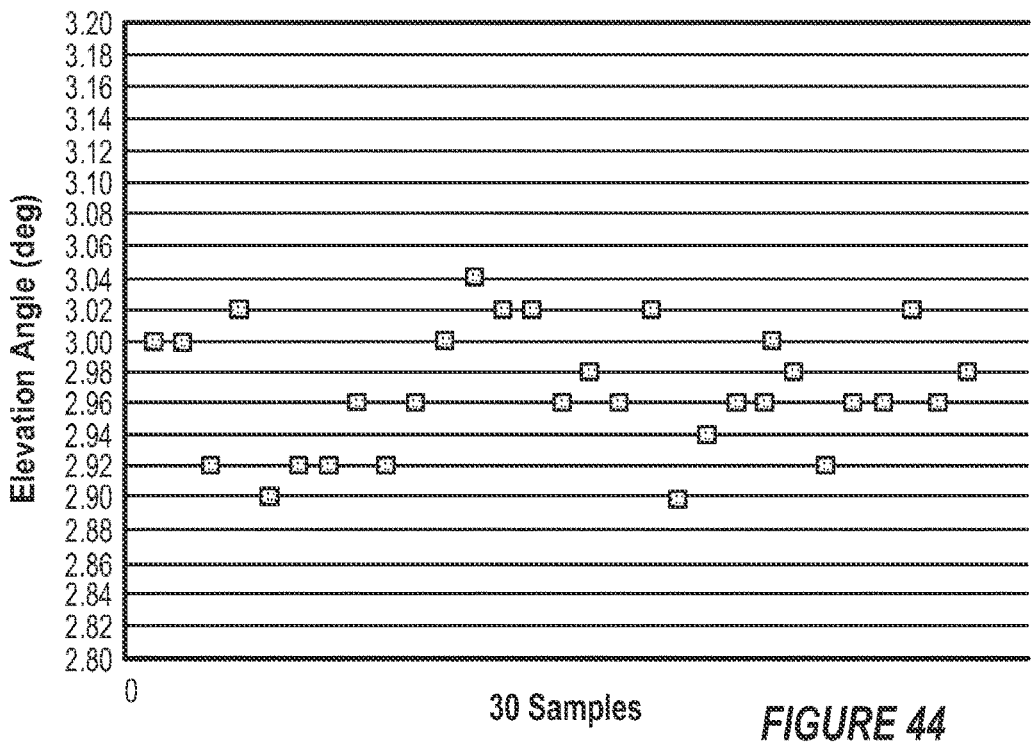
FIG. 44 illustrates vertical array long-term amplitude error effects, in accordance with some embodiments.
Figure 45:
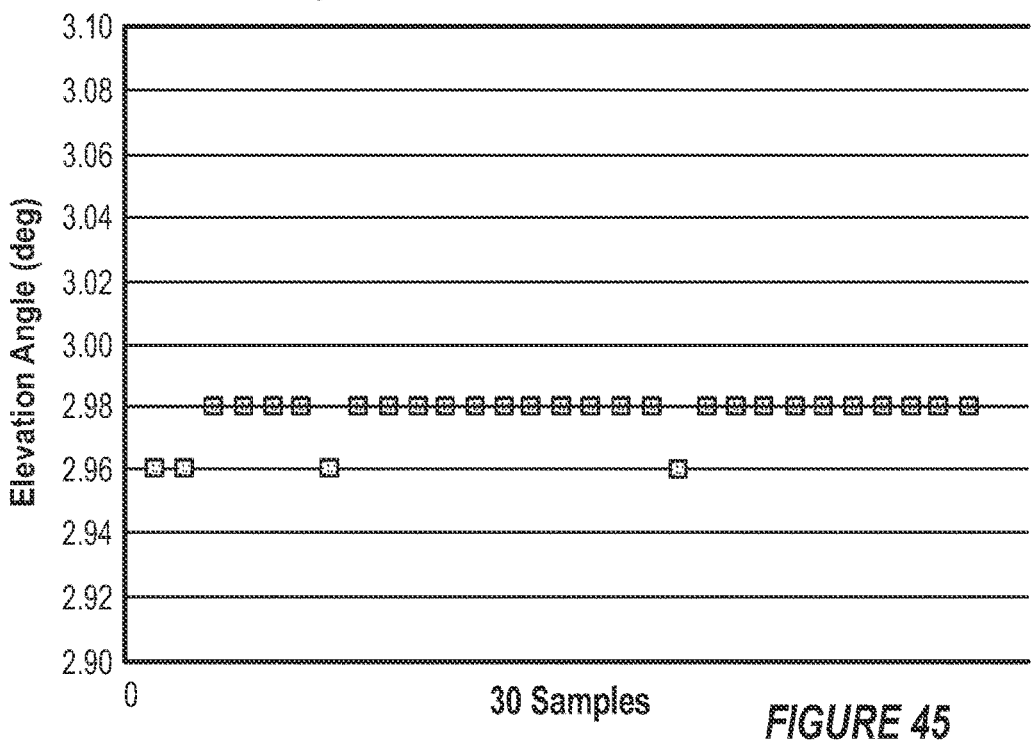
FIG. 45 illustrates vertical array long-term phase error effects, in accordance with some embodiments.
Figure 46:
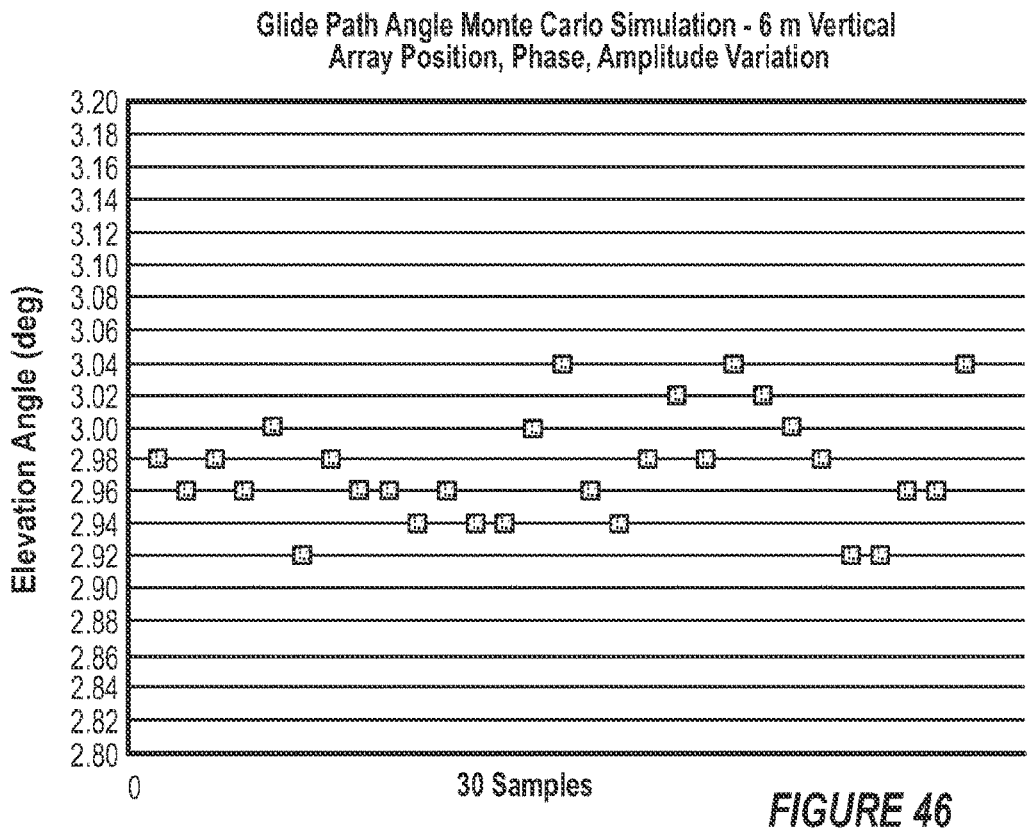
FIG. 46 illustrates vertical array long-term combined error effects, in accordance with some embodiments.

FIG. 43 illustrates vertical array antenna long-term position error effects, according to some embodiments. FIG. 44 illustrates vertical array long-term amplitude error effects, according to some embodiments. FIG. 45 illustrates vertical array long-term phase error effects, according to some embodiments. FIG. 46 illustrates vertical array long-term combined error effects, according to some embodiments.

Sensitivity to Short-Term Effects.

Some short-term errors may include:

Antenna Position: Position in the longitudinal direction (parallel to runway) was varied±1.5 cm for the top antenna, 0.75 cm for the middle, and 0.38 cm for the bottom. The three positions were random but correlated, to simulate a mast bent by wind.

Power Variation: Power to each antenna was varied individually±0.1 dB. CSB and SBO power were assumed to be correlated, so were varied by the same amount.

Phase Variation: Phase to each antenna was varied individually±1°. CSB and SBO phase were assumed to be correlated, so were varied by the same amount.

Figure 47:
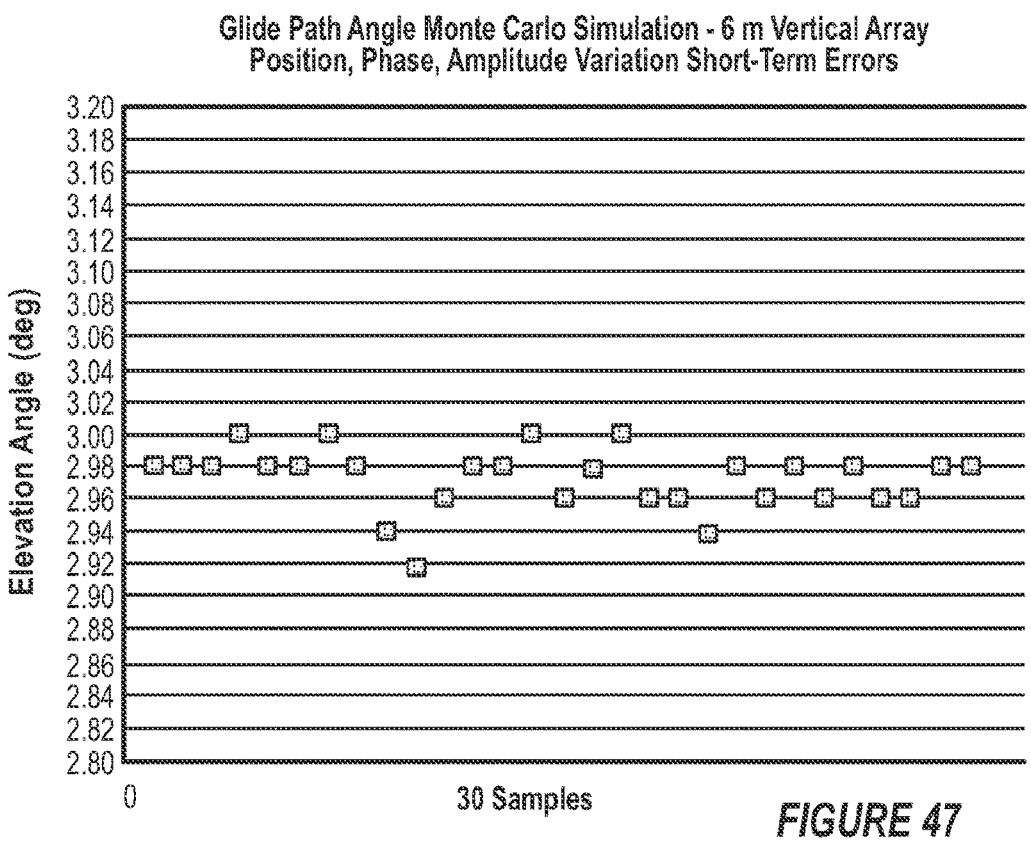
FIG. 47 illustrates vertical array short-term combined error effects, in accordance with some embodiments.

FIG. 47 illustrates vertical array short-term combined error effects, according to some embodiments.

Terrain Effects

The horizontal and vertical glide path antenna arrays being analyzed for this program are both non-imaging arrays. Unlike an imaging array, they do not depend on reflection from the ground to produce a proper signal in space. However, they are not totally immune to effects from ground reflections.

The simulation results shown above thus far also include effects of reflections from the ground, but the ground may be assumed to be a perfectly flat, uniform surface. Reflections from this surface have minimal effect on the signal in space, mostly affecting only radiated power levels at low elevation angles. Rough ground in front of the antennas can affect the reflections, possibly altering the signal in space.

Accurately modeling the effects of ground roughness on the signal in space for these glide path arrays is difficult and complex. The results shown here are preliminary and may be shown to be unduly pessimistic as the simulation models are refined.

Simulations may be run to determine the effect of terrain roughness on DDM. In order to simplify the calculations a sinusoidal height for the ground in two dimensions may be taken, modified by a random process.

The ground elevation may be calculated by:

$$Z\text{ ground} = H \cdot \sin\left(2 \cdot \pi \cdot \frac{l}{CL} + g\right)$$

Where:
Zground: Ground elevation.
H: maximum terrain elevation
l: distance from antenna array
CL: coherence length
g: random parameter which allows simulating a different ground for each antenna element.

Terrain effects on horizontal array are discussed below.

Figure 48:
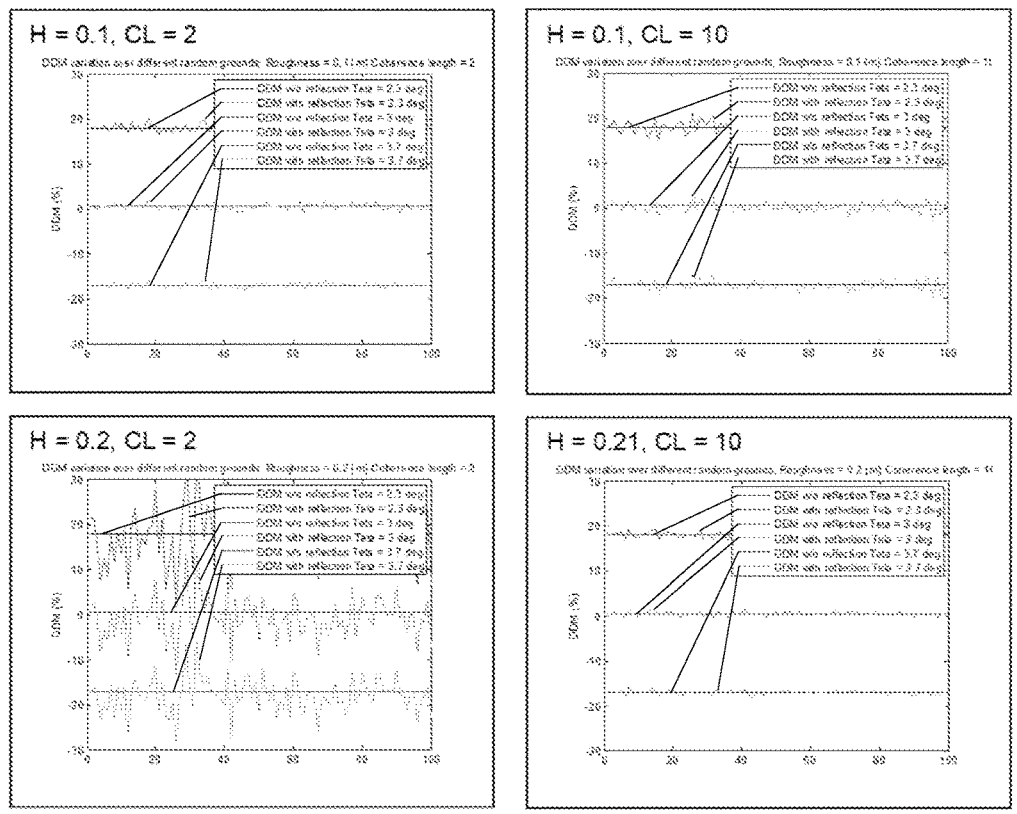
FIG. 48 illustrates horizontal array effects from ground roughness, in accordance with some embodiments.

FIG. 48 illustrates horizontal array effects from ground roughness, according to some embodiments. DDM at 3° elevation (glide path angle) and 2.3° and 3.7° (edges of glide path sector) are shown in FIG. 38 for various values of H (terrain peak height, measure of roughness) in meters and CL (coherence length, measure of distance between peaks) in meters. One hundred samples from the simulation are shown for each case. Note that the largest DDM deviations occurred with greater roughness height and smaller coherence length.

Terrain effects on vertical array are discussed below.

Figure 49:
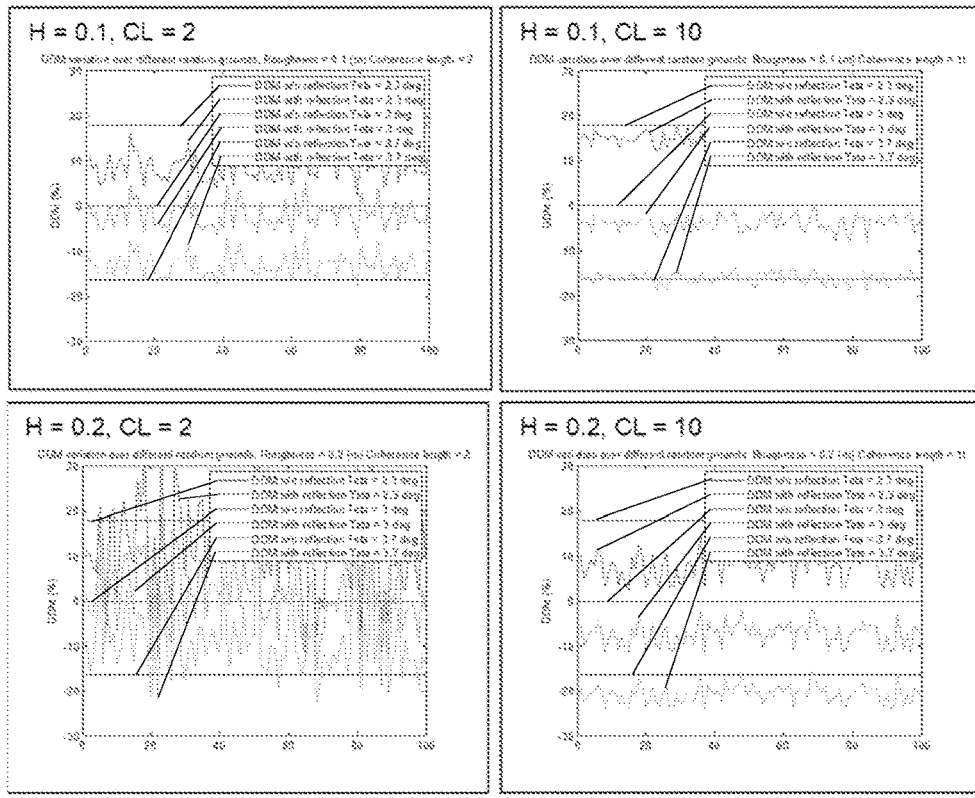
FIG. 49 illustrates vertical array effects from ground roughness, in accordance with some embodiments.

FIG. 49 illustrates vertical array effects from ground roughness, according to some embodiments. The vertical array is more sensitive to ground roughness than the horizontal array. Roughness affects path width as well as glide path angle.

Power Budget

Discussed below is analysis of the transmitter power required to meet the glide path coverage requirements with the horizontal and vertical arrays.

The analysis assumes one transmitter per antenna. This means that for the localizer array (8 antennas) and horizontal glide path array (10 antennas) the total power requirement is spread over a fairly large number of transmitters. The analysis indicates that some of the antennas in the vertical array would need to be replaced by two or more antennas placed side by side in order to increase directivity. In this case each antenna would still be driven by a separate transmitter resulting in less required power per transmitter. The number of antennas needed depends on the directivity of the antenna type selected (Vivaldi, LDP, etc.). The power budget analysis assumed a distance coverage requirement of 10 nm (T) or 20 nm (O).

Assessment of the Horizontal Glide Path Array

Signal in space. This array is capable of producing a signal in space with glide path angle settings between 2.5° and 3.5° with proper width (DDM elevation slope). The azimuth coverage range is slightly more than ±5° when clearance is included. Although less than that of a vertical array, the azimuth coverage is sufficient to allow the array to pass flight check per the 8200.1 limits, which measures azimuth range at ICAO Annex "Point A" (4 nm from threshold) on the approach.

Sensitivities. FAA Order 8299.1 specifies a glide path angle tolerance of ±0.5° of desired or commissioned angle. The glide path angle spread shown in FIG. 41 is well within this tolerance, even allowing for a modest increase that would appear with hundreds of simulations. Because of the large distance (120 m-160 m) between the two subarrays, maintaining tight synchronization is challenging for this array. We have devised a tuning procedure using a drone that can electronically correct for longitudinal position errors up to 20 cm. The sensitivity to short-term errors that cause bends in the approach path was shown to be slightly less than the long-term sensitivity. DDM short-term variation is well within the FAA Order 8200.1 structure limits of ±0.21° (±45 μA).

Packaging: Packing 10 antennas and their supporting structures within a small volume is challenging. Several antenna types (LPD, dipole, Vivaldi) are under consideration, trading off size vs. electrical performance Each 5-element subarray (front and rear) is mounted on a single telescoping structure.

Installation: A reference point is established to the side of the runway opposite the touchdown point. The location for each subarray is marked relative to the reference point using a "total station" surveying device, which is essentially a combined digital theodolite and laser rangefinder capable of arc second angle accuracy and millimeter level range accuracy. The physical layout is the same regardless of assigned frequency and glide path angle, which are adjusted electronically. The distance between subarrays is not critical, but the subarrays must be perpendicular to the runway with centimeter accuracy.

Figure 50:
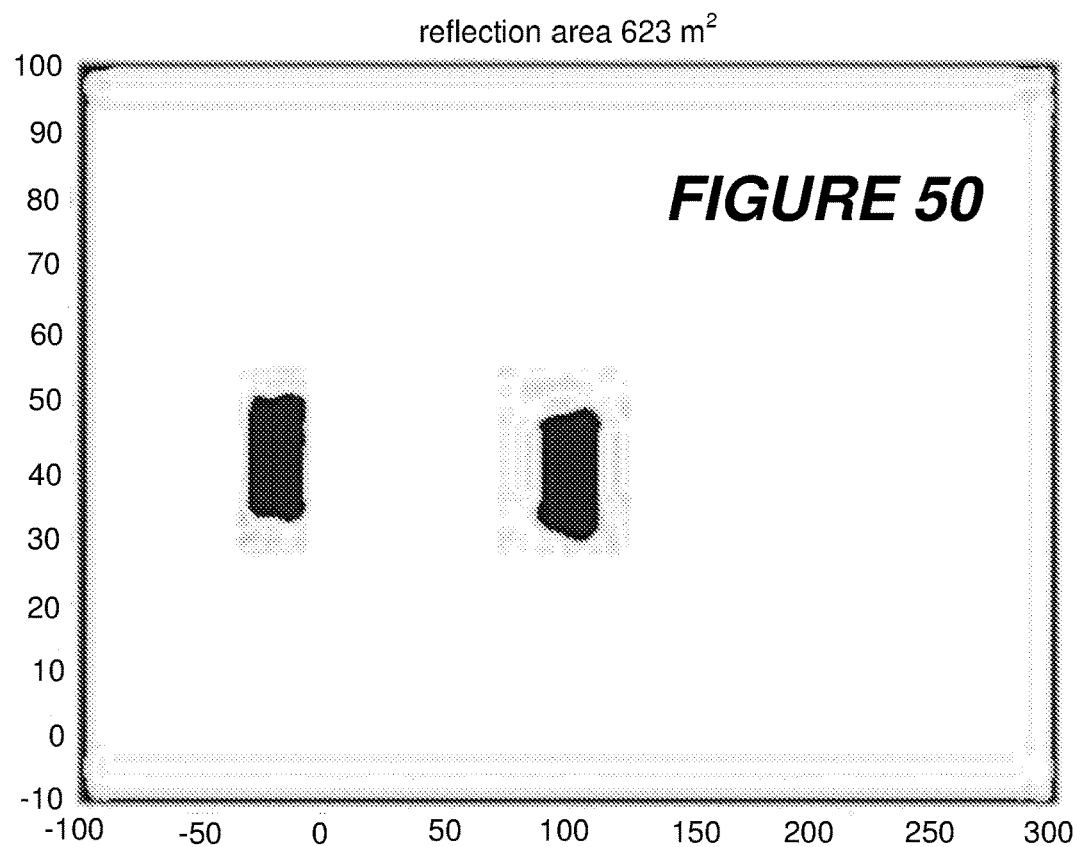
FIG. 50 illustrates reflection areas for a horizontal array, in accordance with some embodiments.

Rough ground performance Preliminary simulations show the signal in space for this array to be mildly affected by ground roughness, except for the case of H=0.2 m, CL=2 m. Further work is needed to assess how realistic these results are. FIG. 50 shows the reflection areas for the horizontal array. Ground within these areas needs to be reasonably smooth. It is difficult to quantify "reasonably" at this time. Ground reflections outside these areas do not affect the signal in space within the overall approach volume of space defined by the localizer and glide slope sector boundaries. The horizontal axis in the figure is longitudinal distance in meters from the antenna array; the vertical axis is lateral distance from the runway centerline. Antenna offset was assumed to be 40 meters.

Power budget: This array requires more transmitter power than a conventional Null Reference imaging glide path array, but with the same power still produces a signal in space that meets the coverage requirements.

Assessment of the Vertical Array

Signal in space. This array is capable of producing a signal in space with glide path angle settings between 2.5° and 3.5° with proper width (DDM elevation slope). The azimuth range is limited only by the radiation pattern of the antenna elements, so is theoretically 360° with omnidirectional antennas.

Sensitivities. FAA Order 8299.1 specifies a glide path angle tolerance of ±0.5° of desired or commissioned angle. The long-term glide path angle spread shown in FIG. 46 is well within this tolerance, even allowing for a modest increase that would appear with hundreds of simulations. This array's sensitivity to short-term antenna position, power and phase variations, shown in FIG. 47, is comfortably within requirements, even when allowing up to 1.5 cm movement in the top antenna from mast bending in strong winds.

Packaging: This array lends itself to compact packaging, including a collapsible mast plus only three antenna elements (although some antennas may be doubled, but still mounted on the single mast).

Installation: Only one component of this array (the mast) needs to be placed accurately on the site. The height of the three antennas needs to be controlled within 1 cm tolerances. The physical layout is the same regardless of assigned frequency and glide path angle, which are adjusted electronically via the ARUs.

Figure 51:
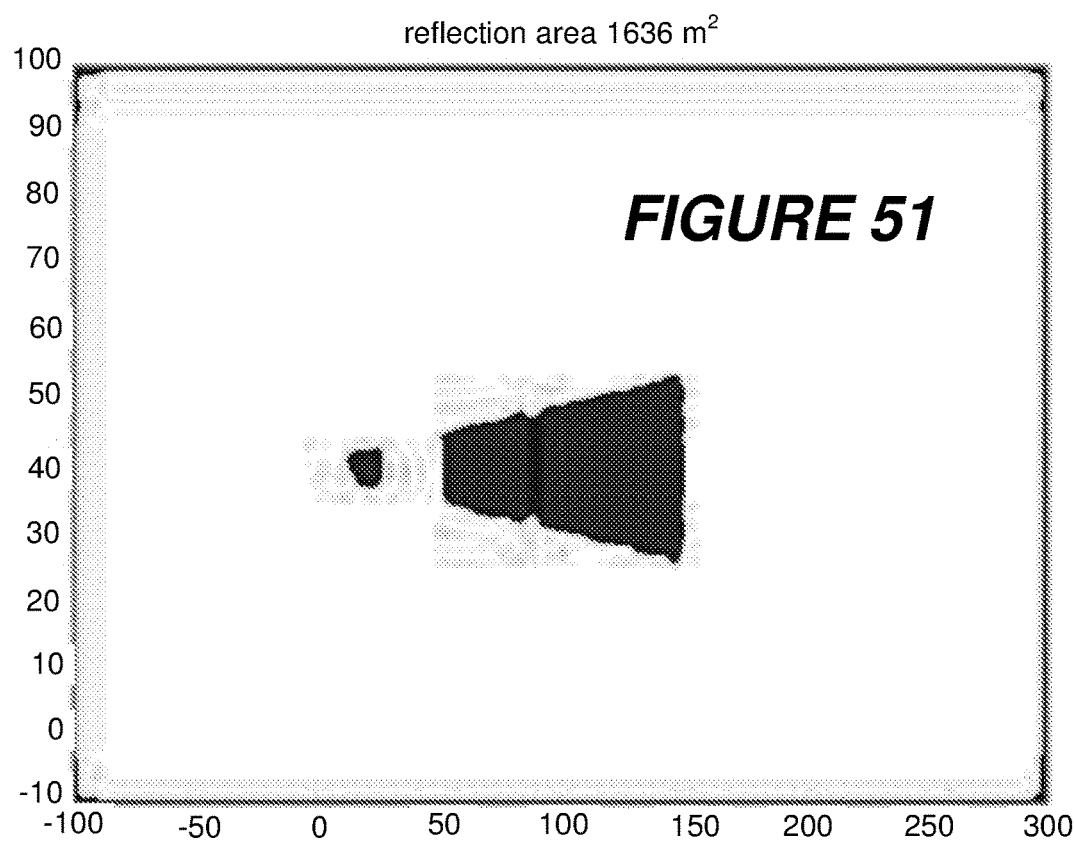
FIG. 51 illustrates reflection areas for a vertical array, in accordance with some embodiments.

Rough ground performance Preliminary simulations show the signal in space for this array to be mildly affected by ground roughness, except for the case of H=0.2 m, CL=2 m. Further work is needed to assess how realistic these results are. FIG. 51 shows the reflection area for the vertical array. Ground within this area needs to be reasonably smooth. It is difficult to quantify "reasonably" at this time. Ground reflections outside this area does not affect the signal in space within the overall approach volume of space defined by the localizer and glide slope sector boundaries. The horizontal axis in the figure is longitudinal distance in meters from the antenna array; the vertical axis is lateral distance from the runway centerline. Antenna offset was assumed to be 40 meters.

Power budget: The power budget analysis showed that in order to avoid large and heavy ARUs it may be necessary to mount 2 or more antennas side by side on the mast to increase the array's directivity. In this case, each antenna will be driven by a separate transmitter.

Comparison

Table 3 shows a comparison of horizontal and vertical glide path array characteristics, according to some embodiments. Table 3 shows the relative strength of the horizontal and vertical glide path arrays, "+" indicating better performance, "−" indicating worse performance, and "0" indicating equal performance with the other array.

TABLE 3

Comparison of Horizontal and Vertical Glide Path Array Characteristics

| Performance Factor | Horizontal GP Array | Vertical GP Array | Comments |
|---|---|---|---|
| Long-Term Signal-in-Space Stability | 0 | 0 | Both arrays meet requirements with reasonable tolerances imposed on antenna position, transmitter power and phase stability. |
| Short-Term Signal-in-Space Stability | 0 | 0 | Both arrays meet requirements with reasonable tolerances imposed on antenna position, transmitter power and phase stability. |
| Azimuth Coverage | − | + | Horizontal array does not meet Annex 10 azimuth coverage requirement, but meets 8200.1 azimuth coverage requirement for horizontal arrays. |
| Compact Packaging | − | + | 2 horizontal 5-element subarrays vs. single 3+ element vertical array |
| Short Setup Time | − | + | 2 horizontal 5-element subarrays vs. single 3+ element vertical array |
| Performance in Rough Ground Environment | + | − | Results are preliminary. |
| Power Budget | + | − | Comparison depends on number of elements for vertical array. |
| Reliability | 0 | 0 | Both array types expected to support compliant reliability numbers. |
| Lateral Multipath | + | 1 | Vertical array beam width depends on antenna element type chosen. |

Tradeoff Examples

Table 4 shows localizer and glide path antenna array tradeoffs, according to some embodiments.

TABLE 4

Localizer and Glide Path Antenna Array Tradeoffs

| Tradeoffs | Comments |
| --- | --- |
| Localizer aperture vs. multipath degradation of signal | Larger aperture (more antenna elements) provides narrower beam that reduces multipath interference potential. The 8-element localizer array was considered a reasonable compromise for this application. |
| Horizontal array number of antenna elements vs. azimuth coverage range | Increased azimuth coverage requires more antennas spread over larger lateral distance. The 10-element array was the smallest found to provide adequate azimuth coverage. |
| Transmitter power vs. number of antennas | Since there is one transmitter per antenna, having more antennas generally implies less power per transmitter is required. Placing two GP antenna elements side by side increases directivity, reducing transmitter power requirement. |
| Antenna height vs. transmitter power requirement | Raising localizer or GP antennas reduces the transmitter power requirement but increases the size and complexity of mechanical mounts needed to ensure position stability. |
| GP array type vs. azimuth coverage | Horizontal arrays have limited azimuth range, vertical arrays have azimuth range limited only by antenna element beam width. |

Conclusions.

The localizer 8-element array provides an ICAO Annex 10 signal in space. A telescoping support structure has been designed that collapses into a compact volume for shipment and can be quickly installed. Tuning can be accomplished entirely electronically (no cable trimming or antenna position adjustment) with the support of a drone making signal-in-space measurements. The drone can also perform some critical flight check measurements.

The horizontal glide path array provides an ICAO Annex 10 compliant signal in space with the exception of azimuth coverage. However, its azimuth coverage is sufficient to pass FAA Order 8200.1 flight check requirements. Two telescoping support structures collapse into a compact volume for shipment and can be quickly installed. Tuning can be accomplished entirely electronically (no cable trimming or antenna position adjustment) with the support of a drone making signal-in-space measurements. The drone can also perform some critical flight check measurements.

The vertical glide path antenna provides an ICAO Annex 10 compliant signal in space, including the azimuth coverage requirement. A telescoping mast hat collapses into a compact volume for shipment and can be quickly erected. Tuning can be accomplished entirely electronically (no cable trimming or antenna position adjustment) with the support of a drone making signal-in-space measurements. Some antennas may need to be doubled or tripled to achieve sufficient power margin, depending on the antenna element type chosen.

Coverage and Power Budget

Derived requirements in various embodiments are now described. Some embodiments are related to an analysis of the estimation of the ARU transmit power needed to achieve the required coverage of the Localizer and Glide Path systems.

The coverage depends also on the array geometry and on the antenna elements, which are new for GP and LOC.

Figure 52:
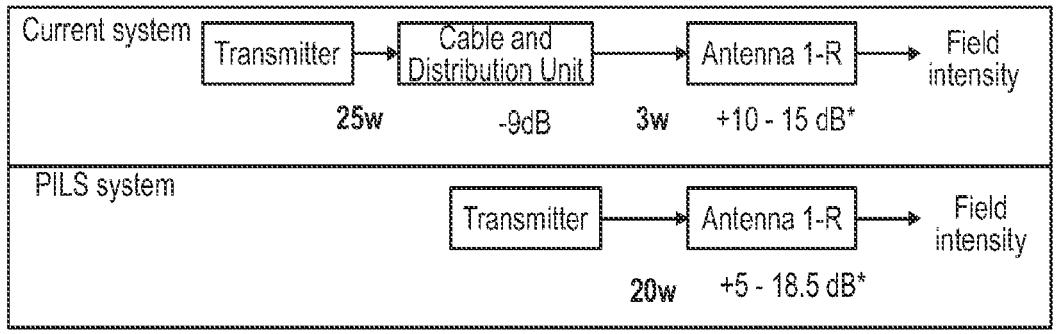
FIG. 52 illustrates a traditional and PILS localizer system achieving equivalent field intensity, in accordance with some embodiments.

The analysis is performed with two approaches:
a) a practical comparison with the current systems
b) a theoretical comparison with the requirements.
Localizer Approach 1: Practical comparison with the current system The transmitter power of the ARU connected to the central antennas (1R and 1 L) is calculated to achieve the same field intensity as with the current system at maximum power. FIG. 52 shows the configuration of the current system and the PILS system. In this figure the azimuthal array gain (about 9.5 dB) is not considered because the two arrays are the same.

Receiver at azimuth=0°, distance 46000, altitude 600 m (elevation 0.75°):

Current system: 8 LPD antennas, hANT=3 m:
element gain=+10 dB
elevation gain=20*log 2*sin($2\pi/\lambda$*hANT*))sin (0.75°)=−15 dB PILS system: 8 H-Dipole antennas, hANT=2 m:
element gain=+5 dB
elevation gain=20*log 2*sin($2\pi/\lambda$*hANT*))sin (0.75°)=−18.5 dB When the H-dipole elements (G=5 dB) are used in place of the LPD element (G=10 dB) and they are lowered to 2 m respect to the typical 3 m height (3.5 dB more elevation loss), the total antenna gain of the PILS system is 8.5 dB lower than the traditional system above the extended centerline.

If the PILS system must guarantee the same field intensity as the traditional system (where the maximum carrier power at the central antennas is 3 W), the maximum carrier power of the ARUs connected to the central antennas (1R and 1 L) must be 8.5 dB higher, i.e. about 20 W, which isn't acceptable.

One advantage of the PILS system should be the compactness and weight of the ARUs, which cannot be achieved with such a transmitted power. Therefore, it is important to estimate the real margin of the current system to search a possible reduction of the overall transmitter power with the new antennas.

Approach 2: Theoretical comparison with the current system

The value of the field intensity is calculated, when the ARU transmit power at the central antennas is 20 W, to evaluate the theoretical margin respect to the ICAO coverage requirements.

Requirements: power density=−114 dBW/m² in two significant points:
a. At distance=46000 m (25 NM), altitude=600 m (i.e. θ=0.75°), azimuth=0°
b. At distance=31000 m (17 NM), altitude=600 m (i.e. elevation=1.1°), azimuth=35°

Calculation:

Power density=TX POWER−FREE SPACE LOSS+ANTENNA GAIN where

TX POWER=20 W=+13 dBW

FREE SPACE LOSS=10*log ($4\pi R^2$) depends on the distance R:
a. at R=46000 m loss is +104 dB/m²
b. at R=31000 m loss is +100.5 dB/m²

ANTENNA GAIN=element gain+array gain+elevation gain element gain mainly depends on the receiver azimuth D:
a. at D=0° gain is +5 dB
b. at D=35° gain is +1 dB array gain mainly depends on the receiver azimuth D:
  a. at D=0° gain is +9.5 dB
  b. at D=35° gain is −3.5 dB
elevation gain depends on the receiver elevation θ:
  ($20*\log([2*\sin(2\pi/\lambda*h_{ANT}*\sin\theta)))$
  a. at θ=0.75° gain is −18.5 dB
  b. at θ=1.1° gain is −15 dB
Definitely:
  a. At distance=46000 m (25 NM), altitude=600 m (i.e. θ=0.75°), azimuth=0°
    Power density=+13 dBW−104 dB/m²+5+9.5-18.5 dB=−95 dBW/m²
  b. At distance=31000 m (17 NM), altitude=600 m (i.e. elevation=1.1°), azimuth=35°
    Power density=+13 dBW−100.5 dB/m²+1-3.5-15 dB=−105 dBW/m²

Figure 53:
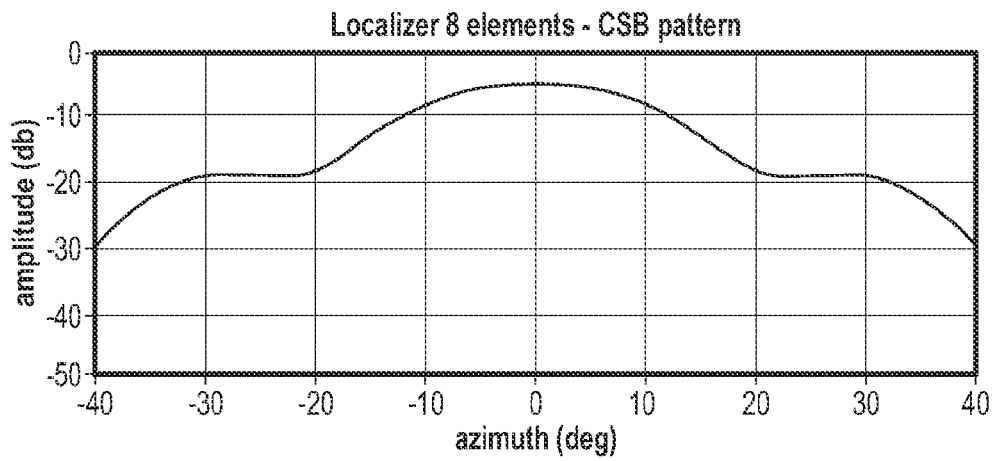
FIG. 53 is a graph for a CSB pattern of a localizer with 8 elements, illustrating change in amplitude with respect to the azimuth angle, in accordance with some embodiments.

FIG. 53 is a graph for a CSB pattern of a localizer with 8 elements, illustrating change in amplitude with respect to the azimuth angle. With 20 W transmitter power, the margin respect to the requirement is about 20 dB at 25 NM within the course sector, while it is about 10 dB at 17 NM at the clearance edge.

If the margin is reduced to 10 dB at the course sector, and to 0 dB at the clearance edge (which could be mitigated by slightly modifying the array pattern), the carrier power required at the central antennas could be reduced to 2 W, which is a more reasonable value.

Glide Path (Horizontal Version)

Approach 1: Practical comparison with the traditional system

Figure 54:
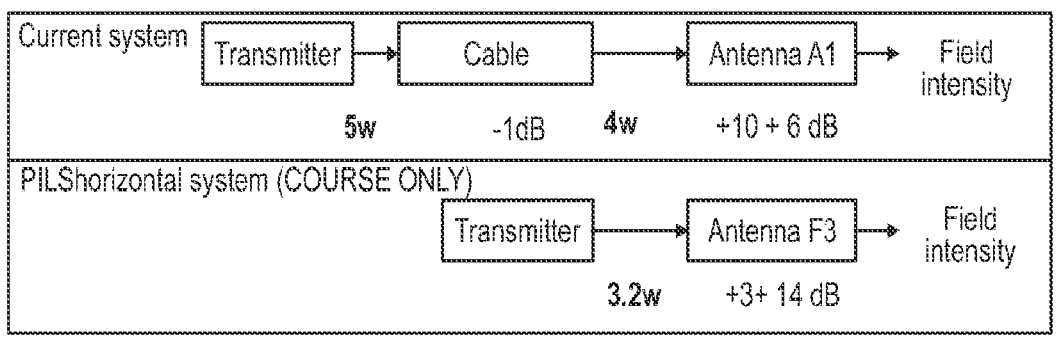
FIG. 54 shows the configuration of the traditional system and the PILS horizontal system in accordance with some embodiments.

The transmitter power of the ARU connected to the central antennas (F3 and R3) is calculated to achieve the same field intensity as with the current system at maximum power. FIG. 54 shows the configuration of the traditional system and the PILS horizontal system.

Receiver at elevation=3°, distance 18500 m (10 NM), azimuth=0°:
  Traditional (Null-reference) system: 2 vertical Kathrein antennas (CSB antenna h=4.3 m):
    element gain=+10 dB
    array gain (due to the image only)=+6 dB
  PILS system: 10 horizontal Vivaldi antennas (with h=1.5 m):
    element gain=+3 dB
    array gain=+14 dB If the horizontal array is chosen (G=14 dB instead of 6 dB of the vertical array) and the Vivaldi elements are used (G=3 dB instead of 10 dB of the Kathrein elements), the total antenna gain of the PILS system is 1 dB higher at the typical elevation angle (3°).

If the PILS system must guarantee the same field intensity as the traditional system (where the maximum carrier power at the CSB antenna is 4 W), the maximum carrier power of the ARUs connected to the central antennas (F3 and R3) must be 1 dB lower, i.e. about 3.2 W, which isn't acceptable.

In fact, also the clearance power must be considered to cover the azimuth range, which requires twice the total transmitter power (6.5 W), that is too much if we want to design light ARUs (it must be considered that, since for the GP the total amplitude modulation is 80%, the peak power is almost four times the carrier power). Therefore, it's important to estimate the real margin of the traditional system to search a possible reduction of the overall transmitter power with the new antennas.

Approach 2: Theoretical comparison with the requirements

The value of the field intensity is calculated, when the ARU transmit power at the central antennas is 3.2 W, to evaluate the theoretical margin respect to the ICAO coverage requirements.

Requirements: power density=−95 dBW/m² in two significant points:
  a. at distance=18500 m (10 NM), elevation=3°
  b. at distance=18500 m (10 NM), elevation=0.9°
Calculation:
  Power density=TX POWER−FREE SPACE LOSS+ELEMENT GAIN+ARRAY GAIN where
    TX POWER=3.2 W=+5 dBW
    FREE SPACE LOSS=$10*\log(4\pi R^2)$=96.3 dB/m² at distance=18500 m
    ELEMENT GAIN=+3 dB (Vivaldi, uniform in the whole angular sector of the glide path)
    ARRAY GAIN depends on the receiver elevation θ:
      a. at θ=3° gain is +14 dB
      b. at θ=0.9° gain is 0 dB
Definitely:
  a. at elevation=3°, Power density=+5 dBW−96.3 dB/m²+3+14 dB=−74.3 dBW/m²
  b. at elevation=0.9°, Power density=+5 dBW−96.3 dB/m²+3+0 dB=−88.3 dBW/m²

Figure 55:
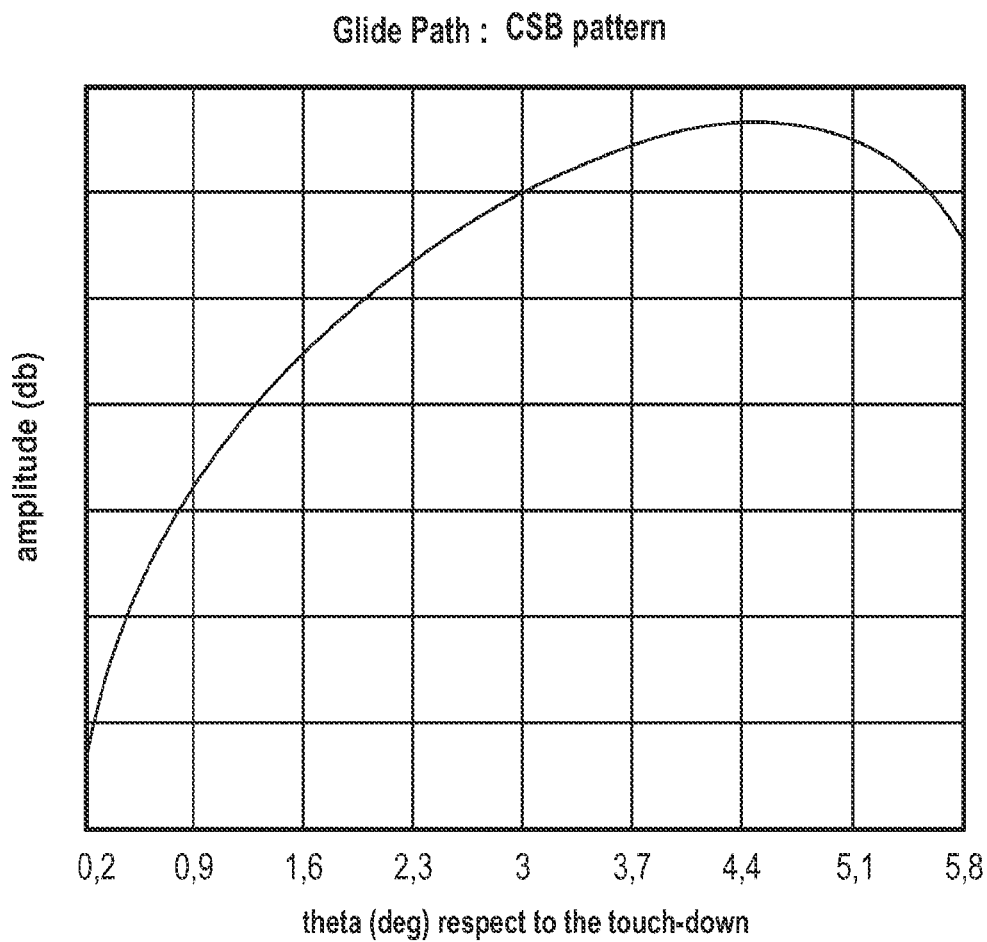
FIG. 55 is a graph illustrating the CSB pattern of the glide path, in accordance with some embodiments.

FIG. 55 is a graph illustrating the CSB pattern of the glide path. With 3.2 W transmitter power, the margin respect to the requirement is about 20 dB at the typical glide path angle, while it is about 7 dB at the lowest elevation angle.

If the margin is reduced to 15 dB at 3°, and to 2 dB at 0.9°, the carrier power required at the central antennas could be reduced to 1 W (course)+1 W (clearance), which are more reasonable values.

Glide path (vertical version: h=1 m, 3.5 m, 6 m)

Figure 56:
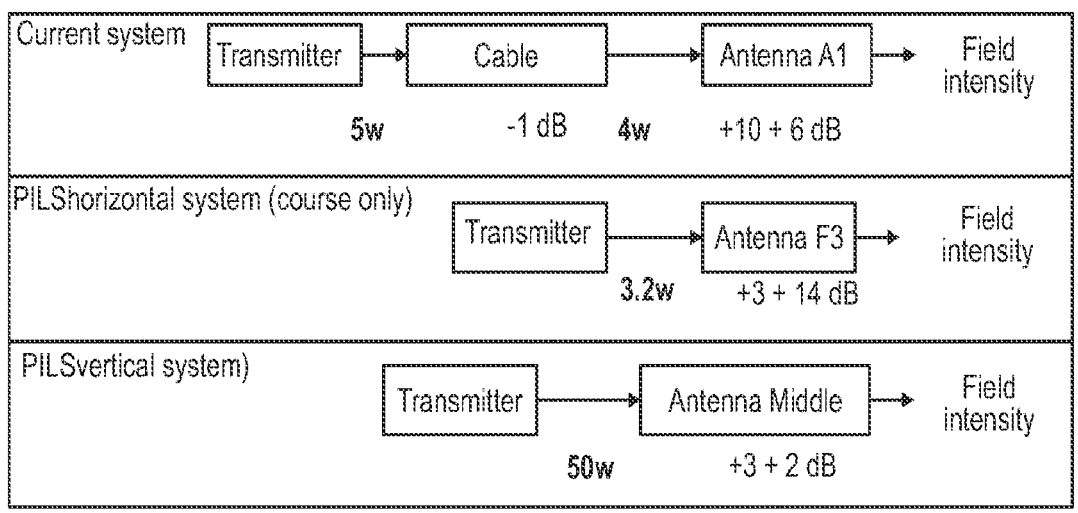
FIG. 56 illustrates the traditional system, the PIL horizontal system according to some embodiments, and the PILS vertical system according to some embodiments.

The array gain of the vertical version (+2 dB) is much lower than that of the horizontal version (+14 dB), due to the fewer number of antennas and to the specific power and phase distribution of the CSB signal. Therefore, if also the Vivaldi antennas (3 dB) are used instead of the Kathrein (10 dB), the transmitter power of the ARU connected to the middle antenna should be 50 W to achieve the same field intensity as with the traditional (also referred to as current) system at maximum power. FIG. 56 illustrates the traditional system, the PIL horizontal system according to some embodiments, and the PILS vertical system according to some embodiments.

This would be unacceptable under most requirements; therefore, it is needed to multiply the transmitters or better the antennas.

Figure 57:
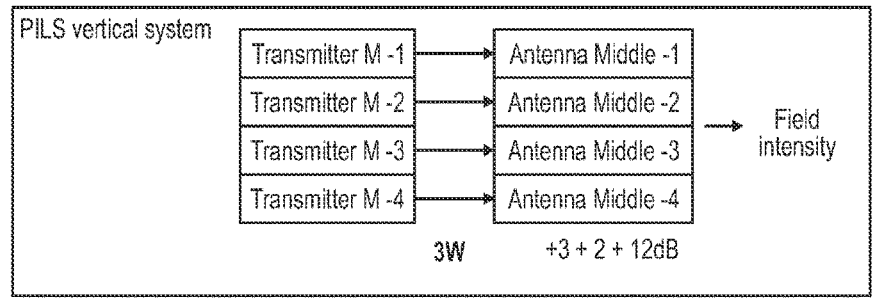
FIG. 57 illustrates a PILS vertical glide path system in accordance with some embodiments.

If four elements are mounted at the middle antenna height (and eventually only two for the lower and higher antennas, which require less CSB power), the azimuthal directivity is increased by 12 dB (at the expense of the lateral coverage, which is not an issue for large values of the azimuth), and the transmitter power can be reduced to 3 W, or to 2 W if a margin loss of only 2 dB is acceptable with respect to the null-reference is accepted. FIG. 57 illustrates the PILS vertical system according to some embodiments.

The individual antenna signals are arranged such that the depth of demodulation between the 90 Hz and 150 Hz signals becomes zero around the nominal glidepath. The upper antenna is fed with the 90 Hz and 150 Hz SBO with a first maximum at 1.5° and a null at 3°. The modulation depth is typically 0.4 for GP and 0.2 for LOC for each of the modulation signals 90 Hz and 150 Hz respectively at centerline and on the GP angle, where the two modulation depths are equal.

The difference in depth of demodulation (DDM) is the signal used by the aircraft for approach guidance. When centered on the approach path the difference between the 90 Hz modulation signal and the 150 Hz modulation is zero. Only upon deviation from the nominal course it becomes non-zero due pre-dominance of the 90 Hz on the left (LOC) or above (GP) and 150 Hz on the right (LOC) or below (GP) side.

The sum of depth of demodulation is typically 0.8 or 80% for GP and 0.4 or 40% for LOC since it is the sum of the 90 Hz and 150 Hz modulation when centered. SDM could differ from the nominal value due to transmitter failure or in the transition course-clearance, or to unexpected field effects. Since the sum is non-zero it is better suited as a monitoring signal when centered on the nominal path. When aside of the nominal path both SDM and DDM are non-zero and are suitable as a monitoring input. On the nominal path SDM=80% for GP (and 40% for LOC) and DDM=0%; aside the nominal path SDM is still 80% or 40% and DDM is not 0%. On the nominal path DDM is more important than SDM as monitoring signal.

In some embodiments, the glade path array comprises one of a null-reference and a m-type glide path array. For example, the Null-reference GP uses two vertically arranged antennas. The lower antenna is fed with the CSB reference signal equally modulated with the 90 Hz and 150 Hz tones. The ground surface is used as imaging surface (virtually four antennas provide the GP signal). Together with the imaging antenna a field with a first maximum at 3° and first null at 6° results (additional maxima and minima beyond).

In another example, the M-type (capture effect) GP is an imaging type of GP like the Null reference type. However, is somewhat less sensitive to the terrain compared to the Null-reference. The M-Type GP uses three vertically arranged antenna elements. All antennas are driven with the SBO signal. The lower and middle antennas are also driven with the CSB signal. The SBO signals for the upper and lower antennas have a negative phase angle while the SBO for the middle antenna has a phase shift of +180° in addition the amplitude is larger. The CSB for the middle antenna has nominal amplitude and no phase shift while the CSB for the lower antenna has an increased amplitude and +180° phase shift. The resulting filed after spatial modulation leads to reduced size of the imaging surface.

GLIDE PATH WITH LPD ELEMENTS (both horizontal and vertical version)

In the previous sections the Vivaldi antenna (which has 3 dB gain including the feeder and cable loss) has been considered as the element for the array. This antenna has a simulated directivity of about 5 dB, which corresponds to a gain equal to 3 dB if also the feeder loss (1.5 dB) and the cable loss (0.5 dB) are taken into account.

Figure 58:
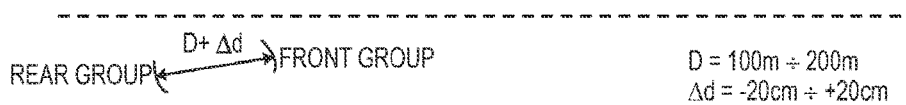
FIG. 58 illustrates a horizontal array position error adjustment, in accordance with some embodiments.

In case the LDP element (used in the Thales GP12 system) is considered, thanks to its greater directivity (9 dB), the power required to the ARUs is lower. With 2 dB loss, the element gain is 7 dB. Therefore, the transmit power is about 4 dB lower:

for the horizontal array: les than 0.5 W course+0.5 W clearance for the vertical array: les than 1 W or, alternatively, 2 W with 4 antennas instead of 8 antennas Horizontal Array Position Error Adjustment When the two array groups (distant more than 100 m) are positioned with a large static error (up to 20 cm) along the runway direction, the GP angle can be corrected with a phase adjustment of the transmitters, as illustrated in FIG. 58 in accordance with some embodiments.

Theoretical Explanation

Here below follows a brief explanation why the correction is feasible. The principle of working of the horizontal GP is that the front group and the rear group irradiate two SBO signals which are in opposite phase at the GP angle only, producing zero DDM at that angle. This can be achieved, for example, if the distance between the two arrays is an odd multiple of half wavelength divided by)cos(3°), and the SBO transmitters are in phase. In fact, in this case, the two signals coming from the two arrays arrive at the receiver in opposite phase (as shown in FIG. 59 top drawing for "no error").

Figure 59:
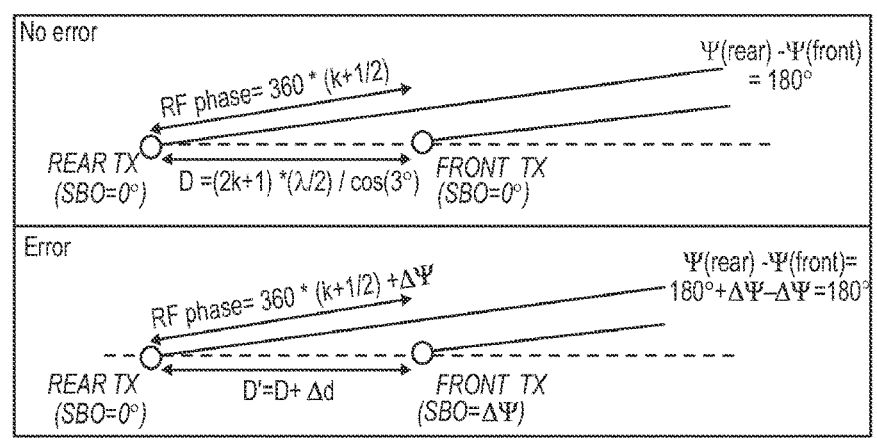
FIG. 59 illustrates an error adjustment for signals coming from two arrays of a horizontal glide path arriving at the receiver in opposite phase, in accordance with some embodiments.

Now, if the distance is not exactly the nominal value, at 3° the two rays coming from the two arrays arrive at the receiver with a phase displacement $\Delta\psi$, which can be easily compensated by de-phasing the transmitters of the two group by the same phase quantity $-\Delta\psi$ (as shown in FIG. 59 top drawing for "error").

Example of ±10 cm displacement with a (5+5) array

The following plots refer to a system composed of two 5-elements arrays distant about 120 m, offset 40 m from the centerline, but the same considerations apply whichever is the distance between the two groups, e.g. 160 m.

a) When the operating frequency is 332 MHz, the distance between the two arrays should be $$D=(2\times 66+1)*c/f\cos(3°)=121.16m$$

Figure 60:
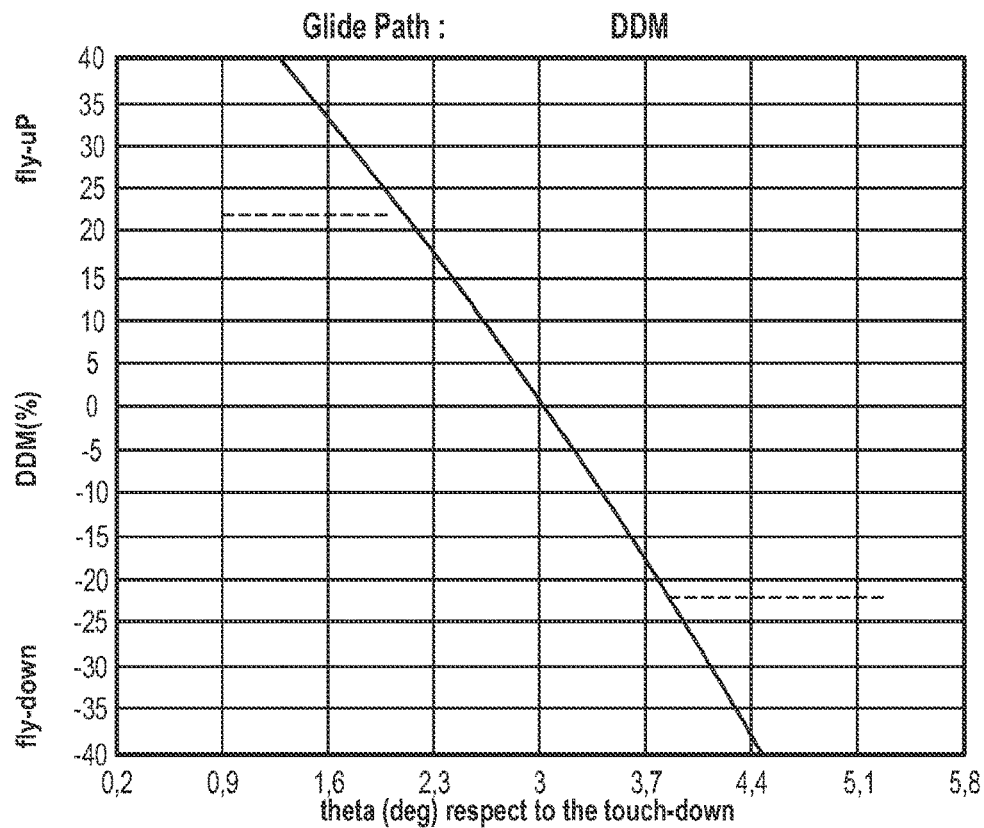
FIG. 60 illustrates a horizontal glide path array DDM vs. elevation angle without error, in accordance with some embodiments.
Figure 61:
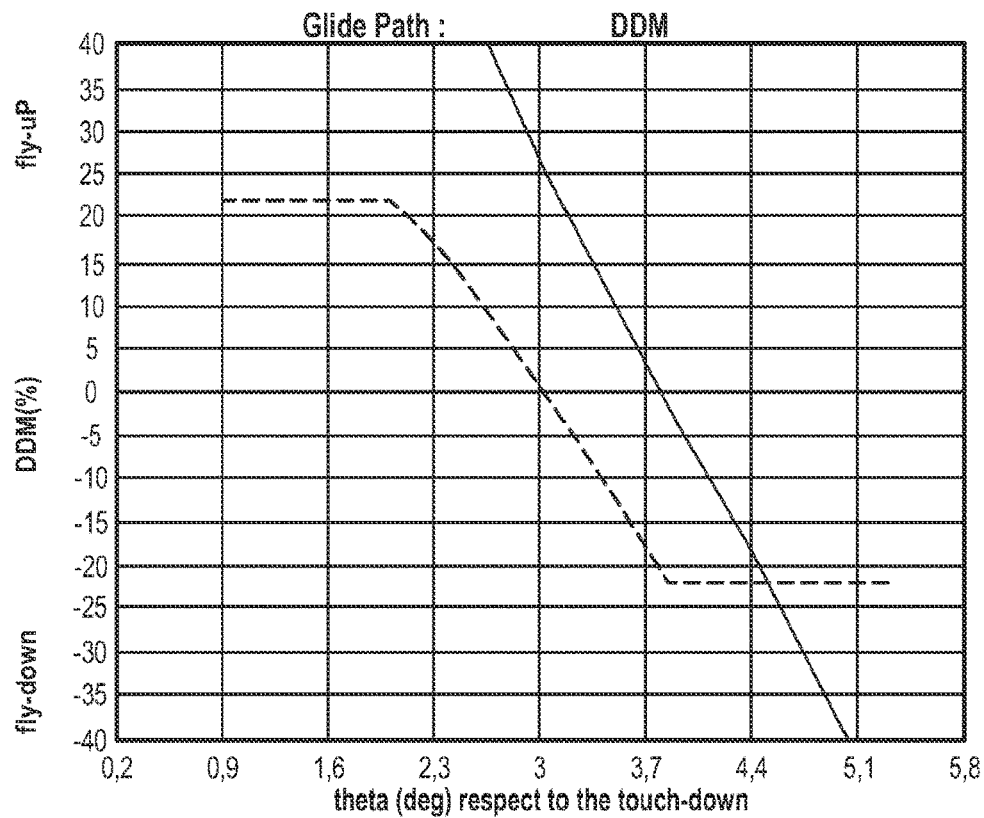
FIG. 61 illustrates a horizontal glide path array DDM vs. elevation angle with a 10 cm error, in accordance with some embodiments.
Figure 62:
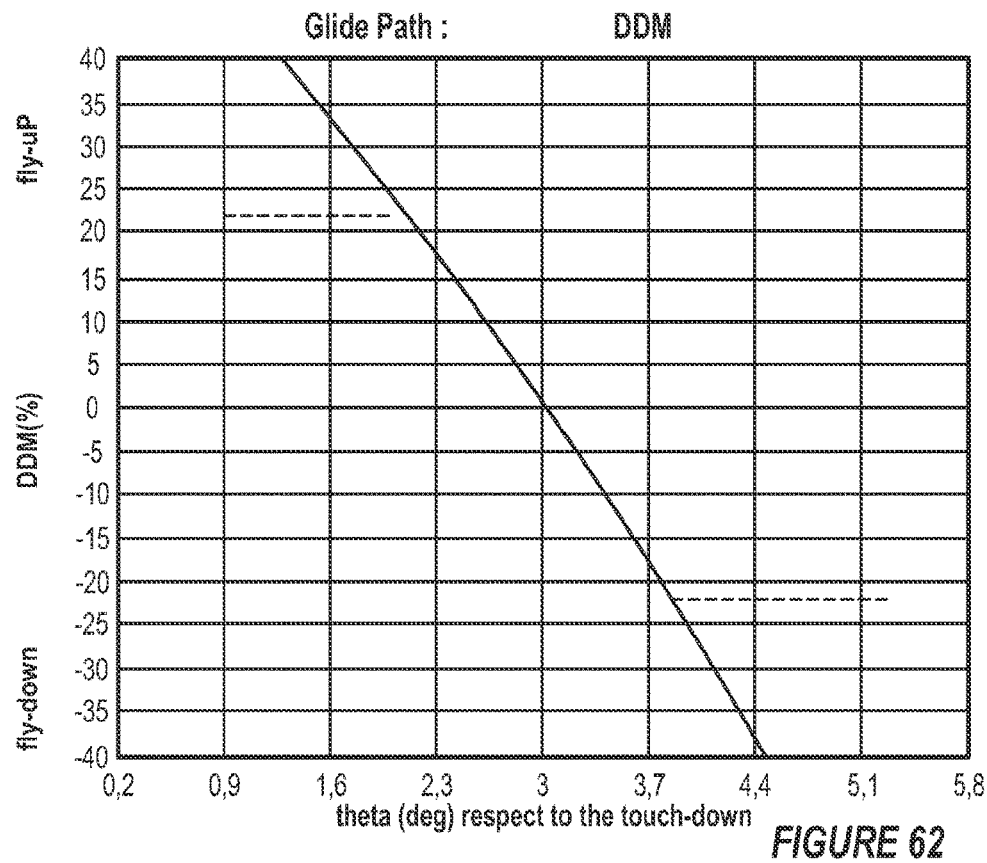
FIG. 62 illustrates a horizontal glide path array DDM in accordance with some embodiments.
Figure 63:
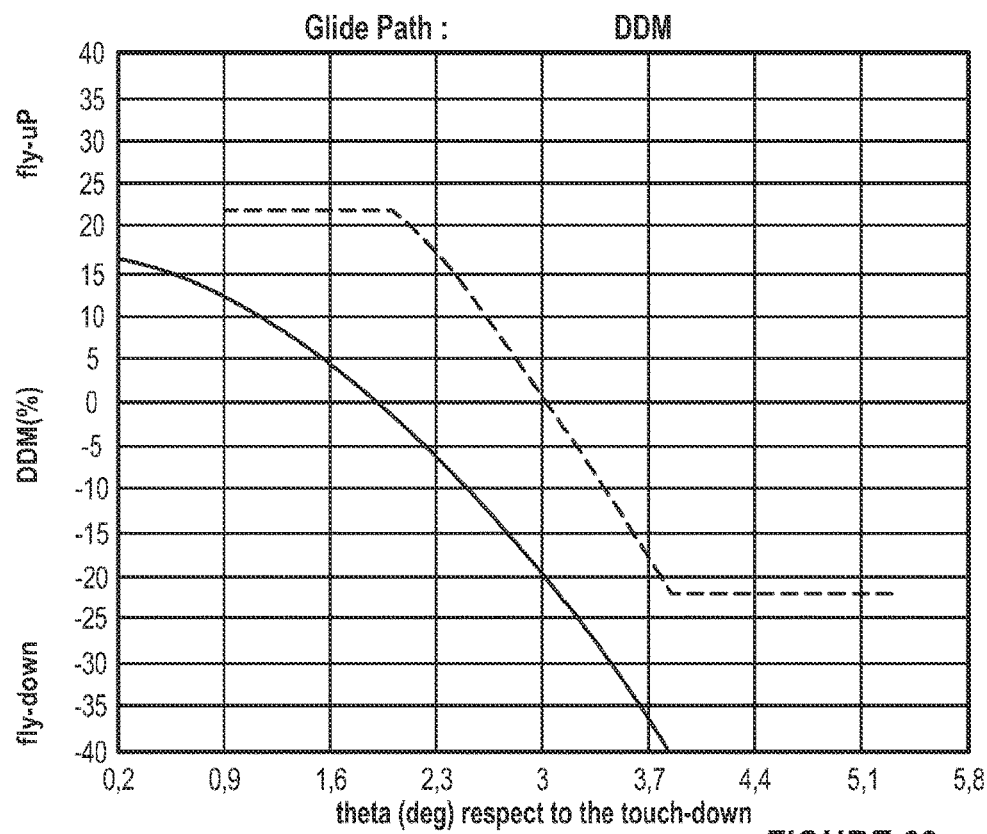
FIG. 63 illustrates a horizontal glide path array DDM in accordance with some embodiments.

In this ideal condition (without error) DDM is zero at 3° a shown in the graph of FIG. 60.

b) If the two groups are mounted with an error of 10 cm in the runway direction $$D'=121.16m+10cm$$

the DDM is zero at 3.8° instead of 3°. In case the new distance cannot be accurately measured, the position of the null gives an indication of direction and of the quantity of the displacement error, as explained later and illustrated in the graphs of FIG. 61.

c) When a phase correction $\Delta\psi$ is applied to the SBO of the rear group (and also to the CSB signal to maintain the width symmetry)

$$\Delta\psi(SBO)=+40°$$

the DDM is zero at 3°, as needed. The phase correction is proportional to the position error, as evident from the theoretical explanation (being $\Delta\psi=360*\Delta d/\lambda$) and explained later. This value can be directly applied if the position error is known, otherwise an iterative procedure is needed to find the zero DDM condition at the commissioned GP angle. However, this procedure is needed anyway, since the actual GP angle can differ respect to the theoretical value due to the real environment behavior. FIG. 62 illustrates a graph of DDM for a glide path.

d) At the contrary, in case the position error is in the opposite direction (i.e. the groups are closer)

$$D'=121.16m-10cm$$

the DDM zero angle is 1.9°, below 3° instead of above 3° (but the difference is not of the same quantity respect to the previous case). FIG. 63 illustrates DDM for a glide path according to some embodiments.

And the phase correction to be applied is in the opposite direction (and of the same quantity as the previous case)

$$\Delta\psi(SBO)=-40°$$

Summary

The example above shows that, if the position error is not known, a preliminary measurement of the angle where DDM is zero gives a very good indication of the sign and the quantity of the SBO phase correction to be applied. This knowledge can minimize the time required to fine adjust the GP angle, starting from a condition very far from the desired.

In fact, the following Table 5 summarizes, for each value of initial position error, at which angle DDM is zero, and which value of SBO (and CSB) phase must be applied to achieve zero DDM at 3°.

TABLE 5

Values of SBO (and CSB) Phases to Achieve Zero DDM

| position error (cm) | zero DDM angle (deg) | TX phase correction (deg) |
|---|---|---|
| −20 | 6.9 | −80 |
| −15 | 0.9 | −60 |
| −10 | 1.9 | −40 |
| −5 | 2.5 | −20 |
| −2 | 2.8 | −8 |
| −1 | 2.9 | −4 |
| 0 | 3 | 0 |
| +1 | 3.1 | +4 |
| +2 | 3.2 | +8 |
| +5 | 3.4 | +20 |
| +10 | 3.8 | +40 |
| +15 | 4.2 | +60 |
| +20 | 4.5 | +80 |

Figure 64:
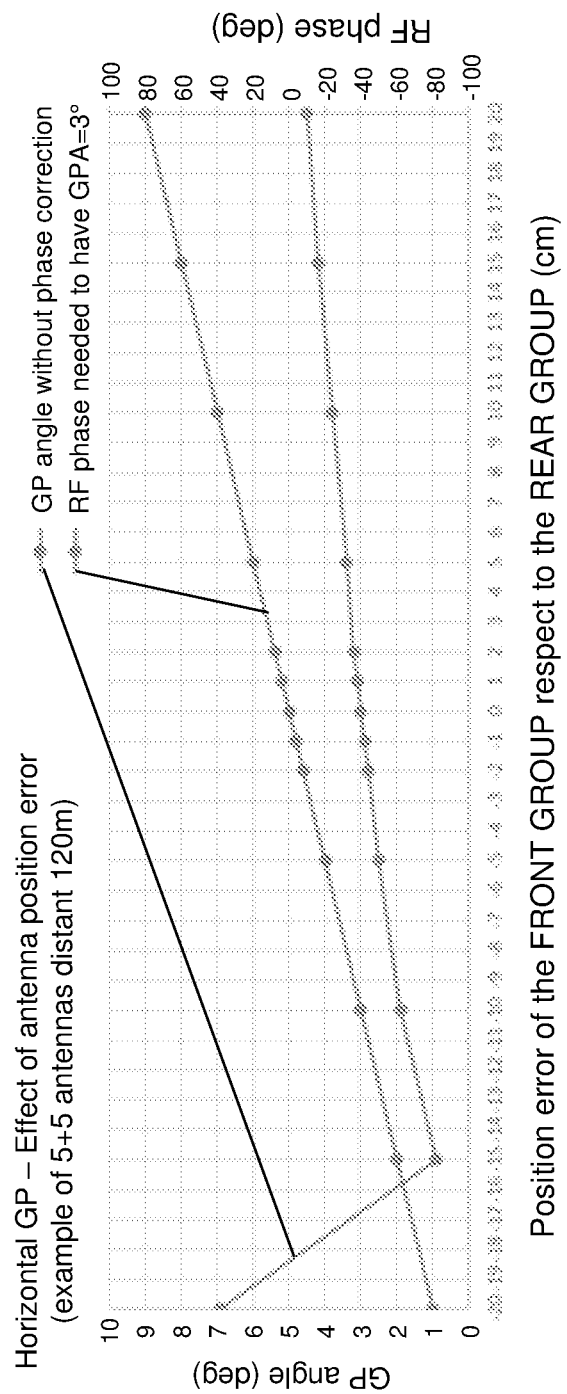
FIG. 64 illustrates an effect of antenna position error of the front group with respect to the rear group in cm units, in accordance with some embodiments.

The phase correction is linearly proportional to the position error, while the zero DDM angle is proportional but not exactly linear; further, in case the two groups are closer than the theoretical value more than 15 cm, the zero DDM falls under 0°, therefore the zero DDM condition must be searched in the second "SBO null" above 6°, which could be practically difficult. FIG. 64 illustrations example position error of the front group with respect to the rear group in cm units.

Finally, it can be easily demonstrated that a fixed position of all the antennas (with proper accuracy and stability defined in other papers) is able to produce an adequate signal in space for any frequency (from 328.6 MHz to 335.4 MHz) and for any glide path angle (from 2.5° to 3.5°).

Once the antenna positions have been fixed, in fact, it is possible to adjust the commissioned glide path angle at the site operating frequency by just choosing the most suitable phase (SBO and CSB, front and rear) of the transmitters, which are in-field programmable.

The determined values, once verified in field in the first prototypes, can be then stored in the EEPROM (either of the Control Unit or of the ARUs) as a function of the frequency and of the commissioned angle.

These values, then, will be then used as a starting point of the in-field tuning procedure, which is anyway required to fine tune the signal in space in the specific environment.

Localizer and Glidepath Mechanical Structures

In some embodiments, the localizer and glidepath use mechanical structures holding the individual antennas, the ARU close to the antennas the CU such that the elements are pre-cabled. For example, the mechanical structure holds all parts, including the antennas, ARUs, and the CU. The ARUs are close to, or directly coupled to, the antenna which the ARU drives. All elements on the structure are pre-cabled so that for transport no cabling at the structure needs to be removed. The mechanical structure itself is designed of lightweight materials using multiple nested short truss frames with a width reducing from center to the outside of the full structure. The truss frame can be compacted for transport by pushing short truss elements together and extracted on site by pulling them out. The extractable and re-tractable structure allows for very short set-up and tear-down times.

The truss frame is built to break into its elements when impacted with an excessive force to ensure frangibility. The truss frame is built to be rigid within the envelope of all forces in normal operational range including wind loads. The rigidity ensures a sufficiently low variation of the individual antenna phase centers such that the difference between the individual antenna phase centers in alongside direction of the runway is smaller than the maximum allowed to ensure synchronization of the carrier (e.g., 5 mm).

The LOC and GP antennas are mounted on the truss frame on poles with joints allowing them to collapse for transport. The antennas furthermore are mounted with adjustable tracks allowing adjustment of the position in runway alongside. The poles consist of nested tubes attached to the truss frame and allow for vertical adjustments of the antenna height. The mechanical adjustment of the antenna positions is performed to reduce the search space for the electronic synchronization calibration of the individual LOC and GP signals.

Further definitions and embodiments are explained below.

In the above description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, circuits or functions but does not preclude the presence or addition of one or more other features, integers, elements, steps, circuits, functions or groups thereof. Furthermore, as used herein, the common abbreviation "e.g.", which derives from the Latin phrase "exempli gratia," may be used to introduce or specify a general example or examples of a previously mentioned item and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits, implemented by analog circuits, and/or implement by hybrid digital and analog circuits. Computer program instructions may be provided to a processing circuit of a general purpose computer circuit, special purpose computer circuit, and/or other programmable data processing circuit to produce a machine, such that the instructions, which execute via the processing circuit of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processing circuit such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents and shall not be restricted or limited by the foregoing detailed description.

What is claimed is:

1. An instrument landing system, ILS, comprising:
   a plurality of antennas;
   a plurality of antenna radio units, ARUs, that each operates to generate a modulated Radio Frequency, RF, signal provided to a different one of the plurality of antennas for transmission; and
   a central processing unit operates to control the ARUs to adjust synchronization between the modulated RF signal provided by the ARUs to the plurality of antennas for transmission.

2. The ILS of claim 1, wherein the central processing unit operates to control the ARUs to adjust synchronization of carrier frequency and phase between the modulated RF signals provided by the ARUs to the plurality of antennas for transmission.

3. The ILS of claim 2, wherein the central processing unit operates to control the ARUs to adjust synchronization of carrier phase spread to have not more than a threshold RF deviation between the modulated RF signals provided by the ARUs to the plurality of antennas for transmission.

4. The ILS of any of claim 1, wherein each of the ARUs is directly connected to an antenna of the plurality of antennas to provide one of the modulated RF signals to only one of the plurality of antennas for transmission.

5. The ILS of claim 4, wherein each of the ARUs comprises a local RF oscillator circuit that operates to phase lock to a reference oscillator signal provided by the central processing unit.

6. The ILS of claim 5, wherein the central processing unit is connected through a plurality of cables each to different ones of the ARUs to provide signals through the cables for the ARUs to generate the modulated RF signals, wherein the central processing unit operates to measure cable signaling delays between the central unit and each of the ARUs, and to adjust synchronization between the modulated RF signal provided by the ARUs to the plurality of antennas for transmission based on the measurements of the cable signaling delays.

7. The ILS of claim 6, wherein the central processing unit operates to measure the cable signaling delays between the central processing unit and each of the ARUs based on comparison of phasing between the reference oscillator signal and signals of each of the local RF oscillator circuits.

8. The ILS of claim 1, wherein each of the ARUs comprises a local RF oscillator circuit that is driven by a Temperature Compensated Crystal Oscillator, TCXO, internal to each of the ARUs, which is controlled by a phase locked loop, PLL, locked to a synchronization signal broadcasted by the central unit from a TCXO internal to the central unit, wherein periodically the central processing unit operates to stop the TCXO of one ARU for a defined time slot duration during which the TCXO of the one ARU is frozen in a hold state, and while the TCXO of the one ARU is frozen the central unit operates to measure phase difference between the TCXO internal to the central processing unit and a signal from the TCXO internal to the one ARU sent through a cable to the central processing unit.

9. The ILS of claim 1, wherein each of the ARUs comprises a local RF oscillator circuit that operates to output a deterministic fractional multiplication of a carrier frequency that is locked to a common TCXO broadcast by the central processing unit.

10. The ILS of claim 1, wherein each of the ARUs comprise:
a transmitter circuit operative to transmit a modulated RF signal;
a transmitter synchronization circuit operative to control synchronization of the modulated RF signal transmitted by the transmitter circuit;
a receiver circuit operative to receive a modulated RF signal; and
a receiver synchronization circuit operative to control synchronization of the modulated RF signal received by the receiver circuit.

11. The ILS of claim 10, wherein the central processing unit is operative to adjust synchronization of carrier frequency and phase between the transmitter circuits within each of the ARUs.

12. The ILS of claim 1, wherein each of the ARUs are software defined radios operative to generate a modulated radio frequency signal at a programmable carrier frequency and programmable configuration values.

13. The ILS of claim 12, wherein the programmable configuration values comprise at least one of RF power, RF phase, modulation depths, and phases.

14. The ILS of claim 1, wherein each of the ARUs comprises a local RF oscillator circuit that is driven by a Temperature Compensated Crystal Oscillator, TCXO, internal to each of the ARUs, which is controlled by a phase locked loop, PLL, locked to a synchronization signal broadcasted by the central unit from a TCXO internal to the central unit, wherein periodically the central processing unit operates to stop the TCXO of one ARU for a defined time slot duration during which the TCXO of the one ARU is frozen in a hold state, and while the TCXO of the one ARU is frozen the central processing unit operates to measure phase difference between the TCXO internal to the central processing unit and a signal from the TCXO internal to the one ARU sent through a cable to the central processing unit.

15. The ILS of claim 1, wherein:
each of the ARUs comprises a local RF oscillator circuit;
the central processing unit provides each of the ARUs two frequency signals, the signals being provided through cables each of which respectively connects the central processing unit to a different one of the ARUs, the central processing unit combining the two frequency signals to provide an operating frequency signal at the central processing unit;
each of the ARUs mixes the two frequency signals together to obtain the operating frequency signal which is then divided by two to generate return signals that are provided back to the control unit through the respective cable;
for each for each of the ARUs, the control unit receives the return signals from the ARU and compares phase of the return signals from the ARU to the operating frequency signal at the central processing unit and adjusts synchronization of the ARU based on the phase comparison.

16. The ILS of claim 1, wherein:
the plurality of antennas comprise a glide path array of antennas and a localizer array of antennas; and
each antenna of the glide path array and each antenna of the localizer array is driven by a different one of the ARUs.

17. The ILS of claim 16, wherein:
each of the ARUs are software defined radios operative to generate a modulated radio frequency signal at a programmable carrier frequency and programmable configuration values.

18. The ILS of claim 17, wherein:
the programmable configuration values comprise at least one of RF power, RF phase, modulation depths, and phases.

19. The ILS of claim 16, wherein the glide path array of antennas comprises at least four antenna elements arranged spaced apart horizontally to provide at least a four element horizontal array.

20. The ILS of claim 19, wherein the outer pair of antennas of the glide path array are driven with carrier sideband only, SBO, signals, and the inner pair of antennas of the glide path array are driven with carrier plus sideband, CSB, signals.

21. The ILS of claim 19, wherein the glide path array of antennas has at least 10 antenna elements arranged spaced apart horizontally to provide at least 10 element horizontal array.

22. The ILS of claim 21, wherein the ARUs operate to drive the antennas using CSB and SBO powers and phases for each antenna that are controlled to provide a nearly flat glide path angle over an azimuth range.

23. The ILS of claim 16, wherein the ARUs operate to drive the antennas with clearance signal, CLR, that is a separate carrier signal, offset 5 kHz in frequency that is modulated with 150 Hz only, which produces a pure fly-up signal, wherein the central processing unit operates to individually adjust the CLR of each of the ARUs.

24. The ILS of claim 23, wherein the radiation pattern of the clearance signal, CLR, is shaped by control of the central processing unit so the CLR power is less than that of glide path course signal transmitted by the antennas of the glide path array for azimuth angles inside the azimuth range and greater than the glide path course signal for azimuth angle outside the azimuth range.

25. The ILS of claim 16, wherein the glide path array of antennas comprises at least three antenna elements arranged spaced apart vertically.

26. The ILS of claim 1, wherein the glide path array comprises one of a null-reference and m-type glide path array.

27. The ILS of claim 1, wherein the glide path array comprises a non-imaging glide path array.

28. The ILS of claim 1, wherein the central processing unit further operates to:
- synthesize a Depth of Modulation, DDM, signal and/or a Sum Depth of Modulation, SDM, as received by an airborne aircraft based on measured RF parameters received from one or more of the individual ARUs; and
- determine whether the synthesized DDM signal and/or SDM signal one of meets or exceeds a predetermined threshold based on a comparison of the DDM signal and/or SDM signal to one or more configured RF parameters of the individual ARUs.

29. The ILS of claim 28, wherein the central processing unit further operates to cease operation of the plurality of ARUs in response to a determination that the synthesized DDM signal and/or SDM signal one of meets or exceeds a predetermined threshold.

30. The ILS of claim 28, wherein the central processing unit further operates to continue operation of the plurality of ARUs in response to a determination that the synthesized DDM and/or SDM signal does not meet or exceed a predetermined threshold.

31. The ILS of claim 1, wherein each ARU of the plurality of ARUs further operate to:
- receive the modulated RF signal provided to an antenna of the plurality of antennas associated with the ARU; and
- determine whether the modulated RF signal one of meets or exceeds a predetermined threshold based on a comparison of the modulated RF signal to one or more signal parameters of the ARU.

32. The ILS of claim 31, wherein each ARU of the plurality of ARUs further operate to transmit a notification to the central processing unit including an indication that the modulated RF signal one of meets or exceeds a predetermined threshold based on a determination that the modulated RF signal one of meets or exceeds a predetermined threshold.

33. The ILS of claim 32, wherein central processing unit further operates to determine whether to continue operation of one or more of the plurality of ARUs based on the notification.

34. The ILS of claim 1, the ILS further comprising:
- a monitor ARU that operates to receive RF signals radiated by the plurality of antennas.

35. The ILS of claim 34, wherein the monitor ARU further operates to determine whether the RF signals radiated by the plurality of antennas is aligned with an expected DDM signal and/or SDM signal to be received by an airborne aircraft from the ILS system.

36. The ILS of claim 35, wherein the monitor ARU further operates to initiate ceasing radiation of the RF signals by the plurality of antennas in response to a determination that the RF signals radiated by the plurality of antennas is not aligned with an expected DDM signal and/or SDM signal to be received by an airborne aircraft from the ILS system.

37. The ILS of claim 35, wherein the monitor ARU further operates to initiate re-calibrating the radiation of the RF signals by the plurality of antennas in response to a determination that the RF signals radiated by the plurality of antennas deviate within a pre-defined threshold from previous RF signals radiated during a calibration process of the ILS system.

38. The ILS of claim 1, wherein the cables comprise optical fiber cables, and
- wherein the central processing unit further operates to control the ARUs to adjust synchronization between the modulated RF signal provided by the ARUs to the plurality of antennas for transmission using optical synchronization signals transmitted over the optical fiber cables.

39. The ILS of claim 38, wherein the central processing unit further operates to time multiplex the synchronization signals transmitted over the optical fiber cables by modulation of the intensity of the light of the optical fiber cables.

* * * * *